(12) United States Patent
Yadav et al.

(10) Patent No.: US 11,936,663 B2
(45) Date of Patent: *Mar. 19, 2024

(54) SYSTEM FOR MONITORING AND MANAGING DATACENTERS

(71) Applicant: Cisco Technology, Inc., San Jose, CA (US)

(72) Inventors: Navindra Yadav, Cupertino, CA (US); Abhishek Ranjan Singh, Pleasanton, CA (US); Shashidhar Gandham, Fremont, CA (US); Ellen Christine Scheib, Mountain View, CA (US); Omid Madani, San Carlos, CA (US); Ali Parandehgheibi, Sunnyvale, CA (US); Jackson Ngoc Ki Pang, Sunnyvale, CA (US); Vimalkumar Jeyakumar, Los Altos, CA (US); Michael Standish Watts, Los Altos, CA (US); Hoang Viet Nguyen, Pleasanton, CA (US); Khawar Deen, Sunnyvale, CA (US); Rohit Chandra Prasad, Sunnyvale, CA (US); Sunil Kumar Gupta, Milpitas, CA (US); Supreeth Hosur Nagesh Rao, Cupertino, CA (US); Anubhav Gupta, Fremont, CA (US); Ashutosh Kulshreshtha, Cupertino, CA (US); Roberto Fernando Spadaro, Milpitas, CA (US); Hai Trong Vu, San Jose, CA (US); Varun Sagar Malhotra, Sunnyvale, CA (US); Shih-Chun Chang, San Jose, CA (US); Bharathwaj Sankara Viswanathan, Mountain View, CA (US); Fnu Rachita Agasthy, Sunnyvale, CA (US); Duane Thomas Barlow, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,069

(22) Filed: Nov. 9, 2022

(65) Prior Publication Data
US 2023/0118563 A1 Apr. 20, 2023

Related U.S. Application Data

(63) Continuation of application No. 16/899,190, filed on Jun. 11, 2020, now Pat. No. 11,528,283, which is a
(Continued)

(51) Int. Cl.
*H04L 9/40* (2022.01)
*H04L 43/04* (2022.01)
(Continued)

(52) U.S. Cl.
CPC .......... *H04L 63/1408* (2013.01); *H04L 43/04* (2013.01); *H04L 43/0894* (2013.01);
(Continued)

(58) Field of Classification Search
CPC ..... H04L 43/04; H04L 43/0894; H04L 63/02; H04L 63/20; H04L 63/1408; H04L 63/0227; H04L 63/1425; H04L 43/062
See application file for complete search history.

(56) References Cited

U.S. PATENT DOCUMENTS

| 5,086,385 A | 2/1992 | Launey et al. |
| 5,319,754 A | 6/1994 | Meinecke et al. |

(Continued)

FOREIGN PATENT DOCUMENTS

| CN | 1486555 A | 3/2004 |
| CN | 101093452 A | 12/2007 |

(Continued)

OTHER PUBLICATIONS

Kraemer, Brian, "Get to know your data center with CMDB," TechTarget, Apr. 5, 2006, http://searchdatacenter_lechtarget.com/news/1178820/Get-to-know-your-data-center-with-C MDB.
(Continued)

*Primary Examiner* — Mohammad A Siddiqi
(74) *Attorney, Agent, or Firm* — Polsinelli PC

(57) ABSTRACT

An example method includes detecting, using sensors, packets throughout a datacenter. The sensors can then send
(Continued)

packet logs to various collectors which can then identify and summarize data flows in the datacenter. The collectors can then send flow logs to an analytics module which can identify the status of the datacenter and detect an attack.

20 Claims, 4 Drawing Sheets

Related U.S. Application Data continuation of application No. 16/179,027, filed on Nov. 2, 2018, now Pat. No. 10,686,804, which is a continuation of application No. 15/134,100, filed on Apr. 20, 2016, now Pat. No. 10,142,353.

(60) Provisional application No. 62/171,899, filed on Jun. 5, 2015.

(51) Int. Cl.
*H04L 43/0894* (2022.01)
*H04L 43/062* (2022.01)

(52) U.S. Cl.
CPC .......... *H04L 63/02* (2013.01); *H04L 63/1425* (2013.01); *H04L 43/062* (2013.01)

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,448,724 A | 9/1995 | Hayashi |
| 5,555,416 A | 9/1996 | Owens et al. |
| 5,726,644 A | 3/1998 | Jednacz et al. |
| 5,742,803 A | 4/1998 | Igarashi et al. |
| 5,742,829 A | 4/1998 | Davis et al. |
| 5,751,914 A | 5/1998 | Coley et al. |
| 5,794,047 A | 8/1998 | Meier |
| 5,822,731 A | 10/1998 | Schultz |
| 5,831,848 A | 11/1998 | Rielly et al. |
| 5,903,545 A | 5/1999 | Sabourin et al. |
| 5,949,974 A | 9/1999 | Ewing et al. |
| 6,012,096 A | 1/2000 | Link et al. |
| 6,026,362 A | 2/2000 | Kim et al. |
| 6,085,243 A | 7/2000 | Fletcher et al. |
| 6,115,462 A | 9/2000 | Servi et al. |
| 6,141,595 A | 10/2000 | Gloudeman et al. |
| 6,144,962 A | 11/2000 | Weinberg et al. |
| 6,192,402 B1 | 2/2001 | Iwase |
| 6,204,850 B1 | 3/2001 | Green |
| 6,215,898 B1 | 4/2001 | Woodfill et al. |
| 6,226,273 B1 | 5/2001 | Busuioc et al. |
| 6,230,312 B1 | 5/2001 | Hunt |
| 6,239,699 B1 | 5/2001 | Ronnen |
| 6,247,058 B1 | 6/2001 | Miller et al. |
| 6,249,241 B1 | 6/2001 | Jordan et al. |
| 6,279,035 B1 | 8/2001 | Brown et al. |
| 6,295,527 B1 | 9/2001 | McCormack et al. |
| 6,307,837 B1 | 10/2001 | Ichikawa et al. |
| 6,330,562 B1 | 12/2001 | Boden et al. |
| 6,338,131 B1 | 1/2002 | Dillon |
| 6,351,843 B1 | 2/2002 | Berkley et al. |
| 6,353,775 B1 | 3/2002 | Nichols |
| 6,381,735 B1 | 4/2002 | Hunt |
| 6,499,137 B1 | 12/2002 | Hunt |
| 6,525,658 B2 | 2/2003 | Streetman et al. |
| 6,546,420 B1 | 4/2003 | Lemler et al. |
| 6,546,553 B1 | 4/2003 | Hunt |
| 6,597,663 B1 | 7/2003 | Rekhter |
| 6,611,896 B1 | 8/2003 | Mason, Jr. et al. |
| 6,629,123 B1 | 9/2003 | Hunt |
| 6,633,909 B1 | 10/2003 | Barrett et al. |
| 6,654,750 B1 | 11/2003 | Adams et al. |
| 6,718,414 B1 | 4/2004 | Doggett |
| 6,728,779 B1 | 4/2004 | Griffin et al. |
| 6,751,663 B1 | 6/2004 | Farrell et al. |
| 6,774,899 B1 | 8/2004 | Ryall et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,965,861 B1 | 11/2005 | Dailey et al. |
| 6,983,323 B2 | 1/2006 | Cantrell et al. |
| 6,996,808 B1 | 2/2006 | Niewiadomski et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,036,049 B2 | 4/2006 | Ali et al. |
| 7,089,583 B2 | 8/2006 | Mehra et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,167,483 B1 | 1/2007 | Sharma et al. |
| 7,181,769 B1 | 2/2007 | Keanini et al. |
| 7,185,103 B1 | 2/2007 | Jain |
| 7,194,664 B1 | 3/2007 | Fung et al. |
| 7,203,740 B1 | 4/2007 | Putzolu et al. |
| 7,213,068 B1 | 5/2007 | Kohli et al. |
| 7,263,689 B1 | 8/2007 | Edwards et al. |
| 7,296,288 B1 | 11/2007 | Hill et al. |
| 7,302,487 B2 | 11/2007 | Ylonen et al. |
| 7,327,735 B2 | 2/2008 | Robotham et al. |
| 7,331,060 B1 | 2/2008 | Ricciulli |
| 7,337,206 B1 | 2/2008 | Wen et al. |
| 7,349,761 B1 | 3/2008 | Cruse |
| 7,353,507 B2 | 4/2008 | Gazdik et al. |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,453,879 B1 | 11/2008 | Lo |
| 7,454,486 B2 | 11/2008 | Kaler et al. |
| 7,466,681 B2 | 12/2008 | Ashwood-Smith et al. |
| 7,467,205 B1 | 12/2008 | Dempster et al. |
| 7,469,290 B1 | 12/2008 | Liubovich et al. |
| 7,496,040 B2 | 2/2009 | Seo |
| 7,496,575 B2 | 2/2009 | Buccella et al. |
| 7,496,661 B1 | 2/2009 | Morford et al. |
| 7,523,178 B2 | 4/2009 | Reeves et al. |
| 7,523,465 B2 | 4/2009 | Aamodt et al. |
| 7,523,493 B2 | 4/2009 | Liang et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,571,478 B2 | 8/2009 | Munson et al. |
| 7,606,203 B1 | 10/2009 | Shabtay et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,742,406 B1 | 6/2010 | Muppala |
| 7,742,413 B1 | 6/2010 | Bugenhagen |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,840,618 B2 | 11/2010 | Zhang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |

(56) References Cited

U.S. PATENT DOCUMENTS

| | | |
|---|---|---|
| 7,870,204 B2 | 1/2011 | LeVasseur et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 7,990,847 B1 | 8/2011 | Leroy et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,040,832 B2 | 10/2011 | Nishio et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,135,847 B2 | 3/2012 | Pujol et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,181,253 B1 | 5/2012 | Zaitsev et al. |
| 8,185,343 B1 | 5/2012 | Fitzgerald et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,280,683 B2 | 10/2012 | Finkler |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,312,540 B1 | 11/2012 | Kahn et al. |
| 8,339,959 B1 * | 12/2012 | Moisand ............... H04L 45/302 370/235 |
| 8,356,007 B2 | 1/2013 | Larson et al. |
| 8,365,005 B2 | 1/2013 | Bengtson et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,463,860 B1 | 6/2013 | Guruswamy et al. |
| 8,489,765 B2 | 7/2013 | Vasseur et al. |
| 8,494,985 B1 | 7/2013 | Keralapura et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,565,109 B1 | 10/2013 | Poovendran et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,578,491 B2 | 11/2013 | McNamee et al. |
| 8,588,081 B2 | 11/2013 | Salam et al. |
| 8,595,709 B2 | 11/2013 | Rao et al. |
| 8,600,726 B1 | 12/2013 | Varshney et al. |
| 8,612,530 B1 | 12/2013 | Sapovalovs et al. |
| 8,613,084 B2 | 12/2013 | Dalcher |
| 8,615,803 B2 | 12/2013 | Dacier et al. |
| 8,624,898 B1 | 1/2014 | Bugaj et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,689,172 B2 | 4/2014 | Amaral et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,779,921 B1 | 7/2014 | Curtiss |
| 8,793,255 B1 | 7/2014 | Bilinski et al. |
| 8,805,946 B1 | 8/2014 | Glommen |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,103 B2 | 9/2014 | Isaacson et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,887,285 B2 | 11/2014 | Jordan et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,924,941 B2 | 12/2014 | Krajec et al. |
| 8,931,043 B2 | 1/2015 | Cooper et al. |
| 8,954,546 B2 | 2/2015 | Krajec |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,063 B2 | 3/2015 | Krajec et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,043,905 B1 | 5/2015 | Allen et al. |
| 9,071,575 B2 | 6/2015 | Lemaster et al. |
| 9,088,598 B1 | 7/2015 | Zhang et al. |
| 9,104,543 B1 | 8/2015 | Cavanagh et al. |
| 9,110,905 B2 | 8/2015 | Polley et al. |
| 9,117,075 B1 | 8/2015 | Yeh |
| 9,122,599 B1 | 9/2015 | Jaladanki et al. |
| 9,130,836 B2 | 9/2015 | Kapadia et al. |
| 9,135,145 B2 | 9/2015 | Voccio et al. |
| 9,141,912 B2 | 9/2015 | Shircliff et al. |
| 9,141,914 B2 | 9/2015 | Viswanathan et al. |
| 9,146,820 B2 | 9/2015 | Alfadhly et al. |
| 9,152,789 B2 | 10/2015 | Natarajan et al. |
| 9,158,720 B2 | 10/2015 | Shirlen et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,179,058 B1 | 11/2015 | Zeira et al. |
| 9,185,127 B2 | 11/2015 | Neou et al. |
| 9,191,042 B2 | 11/2015 | Dhayni |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |

(56) References Cited

U.S. PATENT DOCUMENTS

| | | |
|---|---|---|
| 9,246,702 B1 | 1/2016 | Sharma et al. |
| 9,246,773 B2 | 1/2016 | Degioanni |
| 9,252,915 B1 | 2/2016 | Bakken |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,276,829 B2 | 3/2016 | Castro et al. |
| 9,281,940 B2 | 3/2016 | Matsuda et al. |
| 9,286,047 B1 | 3/2016 | Avramov et al. |
| 9,292,415 B2 | 3/2016 | Seto et al. |
| 9,294,486 B1 | 3/2016 | Chiang et al. |
| 9,294,498 B1 | 3/2016 | Yampolskiy et al. |
| 9,300,689 B2 | 3/2016 | Tsuchitoi |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,385,917 B1 | 7/2016 | Khanna et al. |
| 9,396,327 B2 | 7/2016 | Auger et al. |
| 9,397,902 B2 | 7/2016 | Dragon et al. |
| 9,405,903 B1 | 8/2016 | Xie et al. |
| 9,413,615 B1 | 8/2016 | Singh et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,483,334 B2 | 11/2016 | Walsh |
| 9,487,222 B2 | 11/2016 | Palmer et al. |
| 9,501,744 B1 | 11/2016 | Brisebois et al. |
| 9,531,589 B2 | 12/2016 | Clemm et al. |
| 9,536,084 B1 | 1/2017 | Lukacs et al. |
| 9,552,221 B1 | 1/2017 | Pora |
| 9,563,517 B1 | 2/2017 | Natanzon et al. |
| 9,575,869 B2 | 2/2017 | Pechanec et al. |
| 9,575,874 B2 | 2/2017 | Gautallin et al. |
| 9,576,240 B2 | 2/2017 | Jeong et al. |
| 9,582,669 B1 | 2/2017 | Shen et al. |
| 9,596,196 B1 | 3/2017 | Hills |
| 9,602,536 B1 | 3/2017 | Brown, Jr. et al. |
| 9,621,413 B1 | 4/2017 | Lee |
| 9,621,575 B1 | 4/2017 | Jalan et al. |
| 9,634,915 B2 | 4/2017 | Bley |
| 9,645,892 B1 | 5/2017 | Patwardhan |
| 9,658,942 B2 | 5/2017 | Bhat et al. |
| 9,665,474 B2 | 5/2017 | Li et al. |
| 9,678,803 B2 | 6/2017 | Suit |
| 9,684,453 B2 | 6/2017 | Holt et al. |
| 9,686,233 B2 | 6/2017 | Paxton |
| 9,697,033 B2 | 7/2017 | Koponen et al. |
| 9,727,394 B2 | 8/2017 | Xun et al. |
| 9,729,568 B2 | 8/2017 | Lefebvre et al. |
| 9,733,973 B2 | 8/2017 | Prasad et al. |
| 9,736,041 B2 | 8/2017 | Lumezanu et al. |
| 9,749,145 B2 | 8/2017 | Banavalikar et al. |
| 9,800,608 B2 | 10/2017 | Korsunsky et al. |
| 9,804,830 B2 | 10/2017 | Raman et al. |
| 9,804,951 B2 | 10/2017 | Liu et al. |
| 9,813,307 B2 | 11/2017 | Walsh et al. |
| 9,813,324 B2 | 11/2017 | Nampelly et al. |
| 9,813,516 B2 | 11/2017 | Wang |
| 9,825,911 B1* | 11/2017 | Brandwine ............. H04L 63/20 |
| 9,836,183 B1 | 12/2017 | Love et al. |
| 9,857,825 B1 | 1/2018 | Johnson et al. |
| 9,858,621 B1 | 1/2018 | Konrardy et al. |
| 9,860,208 B1 | 1/2018 | Ettema et al. |
| 9,904,584 B2 | 2/2018 | Konig et al. |
| 9,916,232 B2 | 3/2018 | Voccio et al. |
| 9,916,538 B2 | 3/2018 | Zadeh et al. |
| 9,935,851 B2 | 4/2018 | Gandham et al. |
| 9,967,158 B2 | 5/2018 | Pang et al. |
| 9,979,615 B2 | 5/2018 | Kulshreshtha et al. |
| 9,996,529 B2 | 6/2018 | McCandless et al. |
| 10,002,187 B2 | 6/2018 | McCandless et al. |
| 10,009,240 B2 | 6/2018 | Rao et al. |
| 10,116,531 B2 | 10/2018 | Attar et al. |
| 10,142,353 B2* | 11/2018 | Yadav ................. H04L 63/0227 |
| 10,171,319 B2 | 1/2019 | Yadav et al. |
| 10,243,862 B2 | 3/2019 | Cafarelli et al. |
| 10,394,692 B2 | 8/2019 | Liu et al. |
| 10,447,551 B1 | 10/2019 | Zhang et al. |
| 10,454,793 B2 | 10/2019 | Deen et al. |
| 10,454,999 B2 | 10/2019 | Eder |
| 10,476,982 B2 | 11/2019 | Tarre et al. |
| 10,516,586 B2 | 12/2019 | Gandham et al. |
| 10,652,225 B2 | 5/2020 | Koved et al. |
| 10,686,804 B2* | 6/2020 | Yadav ................. H04L 63/0227 |
| 10,749,890 B1 | 8/2020 | Aloisio et al. |
| 10,944,683 B1 | 3/2021 | Roskind |
| 11,368,378 B2 | 6/2022 | Gandham et al. |
| 11,516,098 B2 | 11/2022 | Spadaro et al. |
| 11,528,283 B2* | 12/2022 | Yadav ..................... H04L 43/04 |
| 11,556,808 B1 | 1/2023 | Kim et al. |
| 2001/0028646 A1 | 10/2001 | Arts et al. |
| 2002/0023210 A1 | 2/2002 | Tuomenoksa et al. |
| 2002/0053033 A1 | 5/2002 | Cooper et al. |
| 2002/0083175 A1 | 6/2002 | Afek et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0107875 A1 | 8/2002 | Seliger et al. |
| 2002/0141343 A1 | 10/2002 | Bays |
| 2002/0169739 A1 | 11/2002 | Carr et al. |
| 2002/0184393 A1 | 12/2002 | Leddy et al. |
| 2002/0196292 A1 | 12/2002 | Itoh et al. |
| 2003/0005145 A1 | 1/2003 | Bullard |
| 2003/0016627 A1 | 1/2003 | MeLampy et al. |
| 2003/0023600 A1 | 1/2003 | Nagamura et al. |
| 2003/0023601 A1 | 1/2003 | Fortier, Jr. et al. |
| 2003/0035140 A1 | 2/2003 | Tomita et al. |
| 2003/0046388 A1 | 3/2003 | Milliken |
| 2003/0065986 A1 | 4/2003 | Fraenkel et al. |
| 2003/0069953 A1 | 4/2003 | Bottom et al. |
| 2003/0072269 A1 | 4/2003 | Teruhi et al. |
| 2003/0084158 A1 | 5/2003 | Saito et al. |
| 2003/0086425 A1 | 5/2003 | Bearden et al. |
| 2003/0097439 A1 | 5/2003 | Strayer et al. |
| 2003/0105976 A1 | 6/2003 | Copeland, III |
| 2003/0126242 A1 | 7/2003 | Chang |
| 2003/0133443 A1 | 7/2003 | Klinker et al. |
| 2003/0145232 A1 | 7/2003 | Poletto et al. |
| 2003/0149888 A1 | 8/2003 | Yadav |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2003/0206205 A1 | 11/2003 | Kawahara et al. |
| 2004/0019676 A1 | 1/2004 | Iwatsuki et al. |
| 2004/0030776 A1 | 2/2004 | Cantrell et al. |
| 2004/0036478 A1 | 2/2004 | Logvinov et al. |
| 2004/0046787 A1 | 3/2004 | Henry et al. |
| 2004/0049698 A1 | 3/2004 | Ott et al. |
| 2004/0054680 A1 | 3/2004 | Kelley et al. |
| 2004/0111679 A1 | 6/2004 | Subasic et al. |
| 2004/0133640 A1 | 7/2004 | Yeager et al. |
| 2004/0133690 A1 | 7/2004 | Chauffour et al. |
| 2004/0137908 A1 | 7/2004 | Sinivaara et al. |
| 2004/0167921 A1 | 8/2004 | Carson et al. |
| 2004/0205536 A1 | 10/2004 | Newman et al. |
| 2004/0213221 A1 | 10/2004 | Civanlar et al. |
| 2004/0218532 A1 | 11/2004 | Khirman |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0060403 A1 | 3/2005 | Bernstein et al. |
| 2005/0063377 A1 | 3/2005 | Bryant et al. |
| 2005/0068907 A1 | 3/2005 | Garg et al. |
| 2005/0083933 A1 | 4/2005 | Fine et al. |
| 2005/0104885 A1 | 5/2005 | Jager et al. |
| 2005/0108331 A1 | 5/2005 | Osterman |

(56) References Cited

U.S. PATENT DOCUMENTS

| | | |
|---|---|---|
| 2005/0122325 A1 | 6/2005 | Twait |
| 2005/0138157 A1 | 6/2005 | Jung et al. |
| 2005/0154625 A1 | 7/2005 | Chua et al. |
| 2005/0166066 A1 | 7/2005 | Ahuja et al. |
| 2005/0177829 A1 | 8/2005 | Vishwanath |
| 2005/0177871 A1 | 8/2005 | Roesch et al. |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0210331 A1 | 9/2005 | Connelly et al. |
| 2005/0210533 A1 | 9/2005 | Copeland et al. |
| 2005/0228885 A1 | 10/2005 | Winfield et al. |
| 2005/0237948 A1 | 10/2005 | Wan et al. |
| 2005/0257244 A1 | 11/2005 | Joly et al. |
| 2005/0289244 A1 | 12/2005 | Sahu et al. |
| 2006/0004758 A1 | 1/2006 | Teng et al. |
| 2006/0026669 A1 | 2/2006 | Zakas |
| 2006/0048218 A1 | 3/2006 | Lingafelt et al. |
| 2006/0058218 A1 | 3/2006 | Syud et al. |
| 2006/0075396 A1 | 4/2006 | Surasinghe |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0098625 A1 | 5/2006 | King et al. |
| 2006/0101516 A1 | 5/2006 | Sudaharan et al. |
| 2006/0106550 A1 | 5/2006 | Morin et al. |
| 2006/0143432 A1 | 6/2006 | Rothman et al. |
| 2006/0156408 A1 | 7/2006 | Himberger et al. |
| 2006/0158266 A1 | 7/2006 | Yonekawa et al. |
| 2006/0158354 A1 | 7/2006 | Aberg et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0212556 A1 | 9/2006 | Yacoby et al. |
| 2006/0224398 A1 | 10/2006 | Lakshman et al. |
| 2006/0253566 A1 | 11/2006 | Stassinopoulos et al. |
| 2006/0265713 A1 | 11/2006 | Depro et al. |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0010898 A1 | 1/2007 | Hosek et al. |
| 2007/0014275 A1 | 1/2007 | Bettink et al. |
| 2007/0019618 A1 | 1/2007 | Shaffer et al. |
| 2007/0025306 A1 | 2/2007 | Cox et al. |
| 2007/0044147 A1 | 2/2007 | Choi et al. |
| 2007/0067756 A1 | 3/2007 | Garza |
| 2007/0074288 A1 | 3/2007 | Chang et al. |
| 2007/0097976 A1 | 5/2007 | Wood et al. |
| 2007/0118654 A1 | 5/2007 | Jamkhedkar et al. |
| 2007/0124376 A1 | 5/2007 | Greenwell |
| 2007/0127491 A1 | 6/2007 | Verzijp et al. |
| 2007/0140131 A1 | 6/2007 | Malloy et al. |
| 2007/0150568 A1 | 6/2007 | Ruiz |
| 2007/0162420 A1 | 7/2007 | Ou et al. |
| 2007/0169179 A1 | 7/2007 | Narad |
| 2007/0177626 A1 | 8/2007 | Kotelba |
| 2007/0180526 A1 | 8/2007 | Copeland |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0199060 A1 | 8/2007 | Touboul |
| 2007/0201474 A1 | 8/2007 | Isobe |
| 2007/0209074 A1 | 9/2007 | Coffman |
| 2007/0211637 A1 | 9/2007 | Mitchell |
| 2007/0214348 A1 | 9/2007 | Danielsen |
| 2007/0220159 A1 | 9/2007 | Choi et al. |
| 2007/0223388 A1 | 9/2007 | Arad et al. |
| 2007/0230415 A1 | 10/2007 | Malik |
| 2007/0232265 A1 | 10/2007 | Park et al. |
| 2007/0250640 A1 | 10/2007 | Wells |
| 2007/0250930 A1 | 10/2007 | Aziz et al. |
| 2007/0280108 A1 | 12/2007 | Sakurai |
| 2007/0300061 A1 | 12/2007 | Kim et al. |
| 2008/0002697 A1 | 1/2008 | Anantharamaiah et al. |
| 2008/0013532 A1 | 1/2008 | Garner et al. |
| 2008/0017619 A1 | 1/2008 | Yamakawa et al. |
| 2008/0022385 A1 | 1/2008 | Crowell et al. |
| 2008/0028389 A1 | 1/2008 | Genty et al. |
| 2008/0040088 A1 | 2/2008 | Vankov et al. |
| 2008/0046708 A1 | 2/2008 | Fitzgerald et al. |
| 2008/0049633 A1 | 2/2008 | Edwards et al. |
| 2008/0052387 A1 | 2/2008 | Heinz et al. |
| 2008/0056124 A1 | 3/2008 | Nanda et al. |
| 2008/0066009 A1 | 3/2008 | Gardner et al. |
| 2008/0082662 A1 | 4/2008 | Dandliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0181100 A1 | 7/2008 | Yang et al. |
| 2008/0185621 A1 | 8/2008 | Yi et al. |
| 2008/0201109 A1 | 8/2008 | Zill et al. |
| 2008/0208367 A1 | 8/2008 | Koehler et al. |
| 2008/0222352 A1 | 9/2008 | Booth et al. |
| 2008/0232358 A1 | 9/2008 | Baker et al. |
| 2008/0247539 A1 | 10/2008 | Huang et al. |
| 2008/0250122 A1 | 10/2008 | Zsigmond et al. |
| 2008/0250128 A1 | 10/2008 | Sargent |
| 2008/0262990 A1 | 10/2008 | Kapoor et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0298271 A1 | 12/2008 | Morinaga et al. |
| 2008/0301755 A1 | 12/2008 | Sinha et al. |
| 2008/0301765 A1 | 12/2008 | Nicol et al. |
| 2008/0320592 A1 | 12/2008 | Suit et al. |
| 2009/0019026 A1 | 1/2009 | Valdes-Perez et al. |
| 2009/0059934 A1 | 3/2009 | Aggarwal et al. |
| 2009/0064332 A1 | 3/2009 | Porras et al. |
| 2009/0077097 A1 | 3/2009 | Lacapra et al. |
| 2009/0077543 A1 | 3/2009 | Siskind et al. |
| 2009/0077666 A1 | 3/2009 | Chen et al. |
| 2009/0106646 A1 | 4/2009 | Mollicone et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0158432 A1 | 6/2009 | Zheng et al. |
| 2009/0161658 A1 | 6/2009 | Danner et al. |
| 2009/0164565 A1 | 6/2009 | Underhill |
| 2009/0177484 A1 | 7/2009 | Davis et al. |
| 2009/0180393 A1 | 7/2009 | Nakamura |
| 2009/0192847 A1 | 7/2009 | Lipkin et al. |
| 2009/0193495 A1 | 7/2009 | McAfee et al. |
| 2009/0241170 A1 | 9/2009 | Kumar et al. |
| 2009/0249302 A1 | 10/2009 | Xu et al. |
| 2009/0252181 A1 | 10/2009 | Desanti |
| 2009/0260083 A1 | 10/2009 | Szeto et al. |
| 2009/0271412 A1 | 10/2009 | Lacapra et al. |
| 2009/0271504 A1 | 10/2009 | Ginter et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0310485 A1 | 12/2009 | Averi et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0005478 A1 | 1/2010 | Helfman et al. |
| 2010/0042716 A1 | 2/2010 | Farajidana et al. |
| 2010/0049839 A1 | 2/2010 | Parker et al. |
| 2010/0054241 A1 | 3/2010 | Shah et al. |
| 2010/0070647 A1 | 3/2010 | Irino et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |

(56) References Cited

U.S. PATENT DOCUMENTS

| | | |
|---|---|---|
| 2010/0095377 A1 | 4/2010 | Krywaniuk |
| 2010/0128598 A1 | 5/2010 | Gandhewar et al. |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0157809 A1 | 6/2010 | Duffield et al. |
| 2010/0161817 A1 | 6/2010 | Xiao et al. |
| 2010/0174813 A1 | 7/2010 | Hildreth et al. |
| 2010/0180016 A1 | 7/2010 | Bugwadia et al. |
| 2010/0185901 A1 | 7/2010 | Hirsch |
| 2010/0188989 A1 | 7/2010 | Wing et al. |
| 2010/0188995 A1 | 7/2010 | Raleigh |
| 2010/0194741 A1 | 8/2010 | Finocchio |
| 2010/0220584 A1 | 9/2010 | DeHaan et al. |
| 2010/0226373 A1 | 9/2010 | Rowell et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0246432 A1 | 9/2010 | Zhang et al. |
| 2010/0287266 A1 | 11/2010 | Asati et al. |
| 2010/0303240 A1 | 12/2010 | Beachem et al. |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055382 A1 | 3/2011 | Narasimhan |
| 2011/0055388 A1 | 3/2011 | Yumerefendi et al. |
| 2011/0060704 A1 | 3/2011 | Rubin et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083124 A1 | 4/2011 | Moskal et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0125894 A1 | 5/2011 | Anderson et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0158112 A1 | 6/2011 | Finn et al. |
| 2011/0158410 A1 | 6/2011 | Falk et al. |
| 2011/0167435 A1 | 7/2011 | Fang |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0191465 A1 | 8/2011 | Hofstaedter et al. |
| 2011/0196957 A1 | 8/2011 | Ayachitula et al. |
| 2011/0202655 A1 | 8/2011 | Sharma et al. |
| 2011/0202761 A1 | 8/2011 | Sarela et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0231510 A1 | 9/2011 | Korsunsky et al. |
| 2011/0238793 A1 | 9/2011 | Bedare et al. |
| 2011/0239058 A1 | 9/2011 | Umezuki |
| 2011/0239194 A1 | 9/2011 | Braude |
| 2011/0246663 A1 | 10/2011 | Melsen et al. |
| 2011/0267952 A1 | 11/2011 | Ko et al. |
| 2011/0276951 A1* | 11/2011 | Jain .................. G06F 11/301 718/1 |
| 2011/0277034 A1 | 11/2011 | Hanson |
| 2011/0283266 A1 | 11/2011 | Gallagher et al. |
| 2011/0283277 A1 | 11/2011 | Castillo et al. |
| 2011/0289122 A1 | 11/2011 | Grube et al. |
| 2011/0289301 A1 | 11/2011 | Allen et al. |
| 2011/0302295 A1 | 12/2011 | Westerfeld et al. |
| 2011/0302652 A1 | 12/2011 | Westerfeld |
| 2011/0310892 A1 | 12/2011 | DiMambro |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0011153 A1 | 1/2012 | Buchanan et al. |
| 2012/0016972 A1 | 1/2012 | Tamura |
| 2012/0017262 A1 | 1/2012 | Kapoor et al. |
| 2012/0047394 A1 | 2/2012 | Jain et al. |
| 2012/0075999 A1 | 3/2012 | Ko et al. |
| 2012/0079592 A1 | 3/2012 | Pandrangi |
| 2012/0089664 A1 | 4/2012 | Igelka |
| 2012/0096394 A1 | 4/2012 | Balko et al. |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0144030 A1 | 6/2012 | Narasimhan |
| 2012/0167057 A1 | 6/2012 | Schmich et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0216282 A1 | 8/2012 | Pappu et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0255875 A1 | 10/2012 | Vicente et al. |
| 2012/0260135 A1 | 10/2012 | Beck et al. |
| 2012/0260227 A1 | 10/2012 | Shukla et al. |
| 2012/0260236 A1 | 10/2012 | Basak et al. |
| 2012/0268405 A1 | 10/2012 | Ferren et al. |
| 2012/0278021 A1 | 11/2012 | Lin et al. |
| 2012/0281700 A1 | 11/2012 | Koganti et al. |
| 2012/0287815 A1 | 11/2012 | Attar |
| 2012/0300628 A1 | 11/2012 | Prescott et al. |
| 2013/0003538 A1 | 1/2013 | Greenberg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0019008 A1 | 1/2013 | Jorgenson et al. |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0055145 A1 | 2/2013 | Antony et al. |
| 2013/0055373 A1 | 2/2013 | Beacham et al. |
| 2013/0064096 A1 | 3/2013 | Degioanni et al. |
| 2013/0080375 A1 | 3/2013 | Viswanathan et al. |
| 2013/0085889 A1 | 4/2013 | Fitting et al. |
| 2013/0086272 A1 | 4/2013 | Chen et al. |
| 2013/0094372 A1 | 4/2013 | Boot |
| 2013/0094376 A1 | 4/2013 | Reeves |
| 2013/0097706 A1 | 4/2013 | Titonis et al. |
| 2013/0103827 A1 | 4/2013 | Dunlap et al. |
| 2013/0107709 A1 | 5/2013 | Campbell et al. |
| 2013/0114598 A1 | 5/2013 | Schrum et al. |
| 2013/0117748 A1 | 5/2013 | Cooper et al. |
| 2013/0117847 A1 | 5/2013 | Friedman et al. |
| 2013/0122854 A1 | 5/2013 | Agarwal et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0160128 A1 | 6/2013 | Dolan-Gavitt et al. |
| 2013/0166730 A1 | 6/2013 | Wilkinson |
| 2013/0173784 A1 | 7/2013 | Wang et al. |

(56) References Cited

U.S. PATENT DOCUMENTS

| | | |
|---|---|---|
| 2013/0173787 A1 | 7/2013 | Tateishi et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198509 A1* | 8/2013 | Buruganahalli .... H04L 63/1408 713/151 |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205137 A1 | 8/2013 | Farrugia et al. |
| 2013/0205293 A1 | 8/2013 | Levijarvi et al. |
| 2013/0219161 A1 | 8/2013 | Fontignie et al. |
| 2013/0219263 A1 | 8/2013 | Abrahami |
| 2013/0219500 A1 | 8/2013 | Lukas et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283240 A1 | 10/2013 | Krajec et al. |
| 2013/0283281 A1 | 10/2013 | Krajec et al. |
| 2013/0283374 A1 | 10/2013 | Zisapel et al. |
| 2013/0290521 A1 | 10/2013 | Labovitz et al. |
| 2013/0297771 A1 | 11/2013 | Osterloh et al. |
| 2013/0298244 A1 | 11/2013 | Kumar et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0308468 A1 | 11/2013 | Cowie |
| 2013/0312097 A1 | 11/2013 | Turnbull |
| 2013/0318357 A1 | 11/2013 | Abraham et al. |
| 2013/0322441 A1 | 12/2013 | Anumala |
| 2013/0326623 A1 | 12/2013 | Kruglick |
| 2013/0326625 A1 | 12/2013 | Anderson et al. |
| 2013/0332773 A1 | 12/2013 | Yuan et al. |
| 2013/0333029 A1 | 12/2013 | Chesla et al. |
| 2013/0335219 A1 | 12/2013 | Malkowski |
| 2013/0336164 A1 | 12/2013 | Yang et al. |
| 2013/0343207 A1 | 12/2013 | Cook et al. |
| 2013/0346054 A1 | 12/2013 | Mumtaz |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0009338 A1 | 1/2014 | Lin et al. |
| 2014/0012562 A1 | 1/2014 | Chang et al. |
| 2014/0012814 A1 | 1/2014 | Bercovici et al. |
| 2014/0019972 A1 | 1/2014 | Yahalom et al. |
| 2014/0020099 A1 | 1/2014 | Vaidyanathan et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047274 A1 | 2/2014 | Lumezanu et al. |
| 2014/0047372 A1 | 2/2014 | Gnezdov et al. |
| 2014/0050222 A1 | 2/2014 | Lynar et al. |
| 2014/0053226 A1* | 2/2014 | Fadida ................ H04L 63/1408 726/1 |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0075048 A1 | 3/2014 | Yuksel et al. |
| 2014/0075336 A1 | 3/2014 | Curtis et al. |
| 2014/0081596 A1 | 3/2014 | Agrawal et al. |
| 2014/0089494 A1 | 3/2014 | Pasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0108665 A1 | 4/2014 | Arora et al. |
| 2014/0115219 A1 | 4/2014 | Ajanovic et al. |
| 2014/0115403 A1 | 4/2014 | Rhee et al. |
| 2014/0115654 A1 | 4/2014 | Rogers et al. |
| 2014/0122656 A1 | 5/2014 | Baldwin et al. |
| 2014/0129942 A1 | 5/2014 | Rathod |
| 2014/0130039 A1 | 5/2014 | Chaplik et al. |
| 2014/0136680 A1 | 5/2014 | Joshi et al. |
| 2014/0137109 A1 | 5/2014 | Sharma et al. |
| 2014/0137180 A1 | 5/2014 | Lukacs et al. |
| 2014/0140213 A1 | 5/2014 | Raleigh et al. |
| 2014/0140244 A1 | 5/2014 | Kapadia et al. |
| 2014/0141524 A1 | 5/2014 | Keith |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0173723 A1 | 6/2014 | Singla et al. |
| 2014/0192639 A1 | 7/2014 | Smirnov |
| 2014/0201717 A1 | 7/2014 | Mascaro et al. |
| 2014/0201838 A1 | 7/2014 | Varsanyi et al. |
| 2014/0208296 A1 | 7/2014 | Dang et al. |
| 2014/0210616 A1 | 7/2014 | Ramachandran |
| 2014/0215443 A1 | 7/2014 | Voccio et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0230062 A1 | 8/2014 | Kumaran |
| 2014/0233387 A1 | 8/2014 | Zheng et al. |
| 2014/0247206 A1 | 9/2014 | Grokop et al. |
| 2014/0258310 A1 | 9/2014 | Wong et al. |
| 2014/0269777 A1 | 9/2014 | Rothstein et al. |
| 2014/0280499 A1 | 9/2014 | Basavaiah et al. |
| 2014/0280892 A1 | 9/2014 | Reynolds et al. |
| 2014/0280908 A1 | 9/2014 | Rothstein et al. |
| 2014/0281030 A1 | 9/2014 | Cui et al. |
| 2014/0286174 A1 | 9/2014 | Iizuka et al. |
| 2014/0286354 A1 | 9/2014 | Van De Poel et al. |
| 2014/0289418 A1 | 9/2014 | Cohen et al. |
| 2014/0289854 A1 | 9/2014 | Mahvi |
| 2014/0297357 A1 | 10/2014 | Zeng et al. |
| 2014/0298461 A1 | 10/2014 | Hohndel et al. |
| 2014/0301213 A1 | 10/2014 | Khanal et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0321290 A1 | 10/2014 | Jin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0344438 A1 | 11/2014 | Chen et al. |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2014/0363076 A1 | 12/2014 | Han et al. |
| 2014/0376379 A1 | 12/2014 | Fredette et al. |
| 2015/0006689 A1 | 1/2015 | Szilagyi et al. |
| 2015/0006714 A1 | 1/2015 | Jain |
| 2015/0007317 A1 | 1/2015 | Jain |
| 2015/0009840 A1 | 1/2015 | Pruthi et al. |
| 2015/0019140 A1 | 1/2015 | Downey et al. |
| 2015/0019569 A1 | 1/2015 | Parker et al. |
| 2015/0023170 A1 | 1/2015 | Kakadia et al. |
| 2015/0026794 A1 | 1/2015 | Zuk et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0039757 A1 | 2/2015 | Petersen et al. |
| 2015/0043351 A1 | 2/2015 | Ohkawa et al. |
| 2015/0046882 A1 | 2/2015 | Menyhart et al. |
| 2015/0047032 A1 | 2/2015 | Hannis et al. |
| 2015/0052441 A1 | 2/2015 | Degioanni |

(56) References Cited

U.S. PATENT DOCUMENTS

| | | |
|---|---|---|
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0089614 A1* | 3/2015 | Mathew .............. H04L 65/1069 726/7 |
| 2015/0095332 A1 | 4/2015 | Beisiegel et al. |
| 2015/0112933 A1 | 4/2015 | Satapathy |
| 2015/0113063 A1 | 4/2015 | Liu et al. |
| 2015/0113133 A1 | 4/2015 | Srinivas et al. |
| 2015/0117624 A1 | 4/2015 | Rosenshine |
| 2015/0124608 A1 | 5/2015 | Agarwal et al. |
| 2015/0124652 A1 | 5/2015 | Dharmapurikar et al. |
| 2015/0128133 A1 | 5/2015 | Pohlmann |
| 2015/0128205 A1 | 5/2015 | Mahaffey et al. |
| 2015/0128246 A1 | 5/2015 | Feghali et al. |
| 2015/0134801 A1 | 5/2015 | Walley et al. |
| 2015/0138993 A1 | 5/2015 | Forster et al. |
| 2015/0142962 A1 | 5/2015 | Srinivas et al. |
| 2015/0147973 A1 | 5/2015 | Williams et al. |
| 2015/0156118 A1 | 6/2015 | Madani et al. |
| 2015/0170213 A1 | 6/2015 | O'Malley |
| 2015/0195291 A1 | 7/2015 | Zuk et al. |
| 2015/0199254 A1 | 7/2015 | Vesepogu et al. |
| 2015/0215334 A1 | 7/2015 | Bingham et al. |
| 2015/0222516 A1 | 8/2015 | Deval et al. |
| 2015/0222939 A1 | 8/2015 | Gallant et al. |
| 2015/0227396 A1 | 8/2015 | Nimmagadda et al. |
| 2015/0227598 A1 | 8/2015 | Hahn et al. |
| 2015/0244617 A1 | 8/2015 | Nakil et al. |
| 2015/0244739 A1 | 8/2015 | Ben-Shalom et al. |
| 2015/0245248 A1 | 8/2015 | Shudark et al. |
| 2015/0249622 A1 | 9/2015 | Phillips et al. |
| 2015/0254330 A1 | 9/2015 | Chan et al. |
| 2015/0256413 A1 | 9/2015 | Du et al. |
| 2015/0256555 A1 | 9/2015 | Choi et al. |
| 2015/0256587 A1 | 9/2015 | Walker et al. |
| 2015/0261842 A1 | 9/2015 | Huang et al. |
| 2015/0261886 A1 | 9/2015 | Wu et al. |
| 2015/0261887 A1 | 9/2015 | Joukov |
| 2015/0271008 A1 | 9/2015 | Jain et al. |
| 2015/0271255 A1 | 9/2015 | Mackay et al. |
| 2015/0278273 A1 | 10/2015 | Wigington et al. |
| 2015/0281116 A1 | 10/2015 | Ko et al. |
| 2015/0281277 A1 | 10/2015 | May et al. |
| 2015/0281407 A1 | 10/2015 | Raju et al. |
| 2015/0294212 A1 | 10/2015 | Fein |
| 2015/0295945 A1 | 10/2015 | Canzanese, Jr. et al. |
| 2015/0304346 A1 | 10/2015 | Kim |
| 2015/0312233 A1 | 10/2015 | Graham, III |
| 2015/0336016 A1 | 11/2015 | Chaturvedi |
| 2015/0341376 A1 | 11/2015 | Nandy et al. |
| 2015/0341379 A1 | 11/2015 | Lefebvre et al. |
| 2015/0341383 A1 | 11/2015 | Reddy et al. |
| 2015/0347554 A1 | 12/2015 | Vasantham et al. |
| 2015/0356297 A1 | 12/2015 | Guri et al. |
| 2015/0358287 A1 | 12/2015 | Caputo, II et al. |
| 2015/0358352 A1 | 12/2015 | Chasin et al. |
| 2015/0379278 A1 | 12/2015 | Thota et al. |
| 2015/0381409 A1 | 12/2015 | Margalit et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0028605 A1* | 1/2016 | Gil ..................... H04W 4/38 709/224 |
| 2016/0030683 A1 | 2/2016 | Taylor et al. |
| 2016/0034560 A1 | 2/2016 | Setayesh et al. |
| 2016/0035787 A1 | 2/2016 | Matsuda |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0036838 A1 | 2/2016 | Jain et al. |
| 2016/0050128 A1 | 2/2016 | Schaible et al. |
| 2016/0050132 A1 | 2/2016 | Zhang |
| 2016/0072638 A1* | 3/2016 | Amer .................... F24F 11/62 398/106 |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0094657 A1 | 3/2016 | Vieira et al. |
| 2016/0094994 A1 | 3/2016 | Kirkby et al. |
| 2016/0103692 A1 | 4/2016 | Guntaka et al. |
| 2016/0105333 A1 | 4/2016 | Lenglet et al. |
| 2016/0105350 A1 | 4/2016 | Greifeneder et al. |
| 2016/0112269 A1 | 4/2016 | Singh et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0148251 A1 | 5/2016 | Thomas et al. |
| 2016/0150060 A1 | 5/2016 | Meng et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191362 A1 | 6/2016 | Hwang et al. |
| 2016/0191466 A1 | 6/2016 | Pernicha |
| 2016/0191469 A1 | 6/2016 | Zatko et al. |
| 2016/0191476 A1 | 6/2016 | Schutz et al. |
| 2016/0196374 A1 | 7/2016 | Bar et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0218933 A1 | 7/2016 | Porras et al. |
| 2016/0234083 A1 | 8/2016 | Ahn et al. |
| 2016/0248794 A1 | 8/2016 | Cam |
| 2016/0248813 A1 | 8/2016 | Byrnes |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0277272 A1 | 9/2016 | Peach et al. |
| 2016/0277435 A1 | 9/2016 | Salajegheh et al. |
| 2016/0283307 A1 | 9/2016 | Takeshima et al. |
| 2016/0285730 A1 | 9/2016 | Ohkawa et al. |
| 2016/0292065 A1 | 10/2016 | Thangamani et al. |
| 2016/0294691 A1 | 10/2016 | Joshi |
| 2016/0306550 A1 | 10/2016 | Liu et al. |
| 2016/0308908 A1 | 10/2016 | Kirby et al. |
| 2016/0321452 A1 | 11/2016 | Richardson et al. |
| 2016/0321455 A1 | 11/2016 | Deng et al. |
| 2016/0330097 A1 | 11/2016 | Kim et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parandehgheibi et al. |
| 2016/0359680 A1 | 12/2016 | Parandehgheibi et al. |
| 2016/0359686 A1 | 12/2016 | Parandehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parandehgheibi et al. |

(56) References Cited

U.S. PATENT DOCUMENTS

| | | |
|---|---|---|
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0378978 A1 | 12/2016 | Singla et al. |
| 2016/0380865 A1 | 12/2016 | Dubal et al. |
| 2016/0380869 A1 | 12/2016 | Shen et al. |
| 2017/0006141 A1 | 1/2017 | Bhadra |
| 2017/0024453 A1 | 1/2017 | Raja et al. |
| 2017/0032122 A1 | 2/2017 | Thakar et al. |
| 2017/0032310 A1 | 2/2017 | Mimnaugh |
| 2017/0034018 A1 | 2/2017 | Parandehgheibi et al. |
| 2017/0048121 A1 | 2/2017 | Hobbs et al. |
| 2017/0054643 A1 | 2/2017 | Fraser |
| 2017/0059353 A1 | 3/2017 | Madine et al. |
| 2017/0070582 A1 | 3/2017 | Desai et al. |
| 2017/0075710 A1 | 3/2017 | Prasad et al. |
| 2017/0085483 A1 | 3/2017 | Mihaly et al. |
| 2017/0091204 A1 | 3/2017 | Minwalla et al. |
| 2017/0093910 A1 | 3/2017 | Gukal et al. |
| 2017/0118244 A1 | 4/2017 | Bai et al. |
| 2017/0163502 A1 | 6/2017 | Macneil et al. |
| 2017/0187733 A1 | 6/2017 | Ahn et al. |
| 2017/0201448 A1 | 7/2017 | Deval et al. |
| 2017/0208487 A1 | 7/2017 | Ratakonda et al. |
| 2017/0214708 A1 | 7/2017 | Gukal et al. |
| 2017/0222909 A1 | 8/2017 | Sadana et al. |
| 2017/0223052 A1 | 8/2017 | Stutz |
| 2017/0250880 A1 | 8/2017 | Akens et al. |
| 2017/0250951 A1 | 8/2017 | Wang et al. |
| 2017/0257424 A1* | 9/2017 | Neogi ............ H04L 47/781 |
| 2017/0284839 A1 | 10/2017 | Ojala |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0324518 A1 | 11/2017 | Meng et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0005427 A1 | 1/2018 | Marvie et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0032905 A1 | 2/2018 | Abercrombie |
| 2018/0098123 A1 | 4/2018 | Larson et al. |
| 2018/0145906 A1 | 5/2018 | Yadav et al. |
| 2018/0191617 A1 | 7/2018 | Caulfield et al. |
| 2020/0225110 A1 | 7/2020 | Knauss et al. |
| 2020/0273040 A1 | 8/2020 | Novick et al. |
| 2020/0279055 A1* | 9/2020 | Nambiar ............ G06F 21/6245 |
| 2020/0396129 A1 | 12/2020 | Tedaldi et al. |
| 2022/0141103 A1 | 5/2022 | Gandham et al. |

FOREIGN PATENT DOCUMENTS

| | | |
|---|---|---|
| CN | 101465763 A | 6/2009 |
| CN | 101667935 A | 3/2010 |
| CN | 101770551 A | 7/2010 |
| CN | 102142009 A | 8/2011 |
| CN | 102204170 A | 9/2011 |
| CN | 102521537 A | 6/2012 |
| CN | 103023970 A | 4/2013 |
| CN | 103699664 A | 4/2014 |
| CN | 103716137 A | 4/2014 |
| CN | 104065518 A | 9/2014 |
| CN | 107196807 A | 9/2017 |
| EP | 0811942 A2 | 12/1997 |
| EP | 1039690 A2 | 9/2000 |
| EP | 1069741 A1 | 1/2001 |
| EP | 1076848 B1 | 7/2002 |
| EP | 1383261 A1 | 1/2004 |
| EP | 1450511 A1 | 8/2004 |
| EP | 2043320 A1 | 4/2009 |
| EP | 2045974 A1 | 4/2009 |
| EP | 2427022 A1 | 3/2012 |
| EP | 2723034 A1 | 4/2014 |
| EP | 2860912 A1 | 4/2015 |
| EP | 2887595 A1 | 6/2015 |
| EP | 3069241 B1 | 8/2018 |
| EP | 3793166 A1 | 3/2023 |
| JP | 2009016906 A | 1/2009 |
| KR | 101394338 B1 | 5/2014 |
| WO | 0145370 A1 | 6/2001 |
| WO | 2006045793 A1 | 5/2006 |
| WO | 2007014314 A2 | 2/2007 |
| WO | 2007042171 A1 | 4/2007 |
| WO | 2007070711 A2 | 6/2007 |
| WO | 2007139842 A2 | 12/2007 |
| WO | 2008069439 A1 | 6/2008 |
| WO | 2010048693 A1 | 5/2010 |
| WO | 2010059972 A2 | 5/2010 |
| WO | 2012139288 A1 | 10/2012 |
| WO | 2013030830 A1 | 3/2013 |
| WO | 2013055812 A1 | 4/2013 |
| WO | 2013126759 A2 | 8/2013 |
| WO | 2014127008 A1 | 8/2014 |
| WO | 2015042171 A1 | 3/2015 |
| WO | 2015099778 A1 | 7/2015 |
| WO | 2015118454 A1 | 8/2015 |
| WO | 2016004075 A1 | 1/2016 |
| WO | 2016019523 A1 | 2/2016 |

OTHER PUBLICATIONS

O'Donnell, Glenn, et al._, "The CMDB Imperative: How to Realize the Dream and Avoid the Nightmares," Prentice Hall, Feb. 19, 2009.

Cisco Systems, Inc., "Cisco Application Dependency Mapping Service," 2009.

Lachance, Michael, "Dirty Little Secrets of Application Dependency Mapping," Dec. 26, 2007.

Matteson, Ryan, "Depmap: Dependency Mapping of Applications Using Operating System Events: a Thesis," Master's Thesis, California Polytechnic State University, 2010.

Thomas Sandholm and Kevin Lai, "MapReduce Optimization Using Regulated Dynamic Prioritization," ACM, 2009, pp. 299-310.

Diaz J.M., et al., "A Simple Closed-Form Approximation for the Packet Loss Rate of a TCP Connection Over Wireless Links," IEEE Communications Letters, Sep. 2014, vol. 18, No. 9, 4 Pages.

Duan Y., et al., "Detective: Automatically Identify and Analyze Malware Processes in Forensic Scenarios via DLLs," IEEE ICC—Next Generation Networking Symposium, 2015, pp. 5691-5696.

"Effective use of Reputation Intelligence in a Security Operations Center: Tailoring HP Reputation Security Monitor to your Needs," HP Technical White Paper, Copyright, Jul. 2013, Rev. 1, pp. 1-6.

Extended European Search Report for European Application No. 19215055.5, dated Jan. 17, 2020, 9 Pages.

Extended European Search Report for European Application No. 20165008.2, dated May 25, 2020, 6 pages.

(56) References Cited

OTHER PUBLICATIONS

Extended European Search Report for European Application No. 21150804.9, dated May 6, 2021, 8 Pages.
Extended European Search Report for European Application No. 21156151.9, dated May 25, 2021, 8 pages.
Extended European Search Report for European Application No. 21190461.0, dated Mar. 1, 2022, 10 Pages.
Feinstein L., et al., "Statistical Approaches to DDoS Attack Detection and Response," Proceedings of the DARPA Information Survivability Conference and Exposition, Apr. 22-24, 2003, vol. 1, pp. 303-314.
Foundation for Intelligent Physical Agents, "FIPA Agent Message Transport Service Specification," Dec. 3, 2002, 15 Pages, Retrieved from the Internet: URL: http://www.fiDa.org.
George A., et al., "NetPal: A Dynamic Network Administration Knowledge Base," In proceedings of the 2008 Conference of the Center for Advanced Studies on Collaborative Research: Meeting of Minds (CASCON '08), Marsha Chechik, Mark Vigder, and Darlene Stewart Editions, ACM, NewYork, United States of America, Article 20, 2008, 14 Pages.
Gia T.N., et al., "Fog Computing in Healthcare Internet of Things: A Case Study on ECG Feature Extraction," IEEE International Conference on Computer and Information Technology, Ubiquitous Computing and Communications, Dependable, Autonomic and Secure Computing, Pervasive Intelligence and Computing, Oct. 26, 2015, pp. 356-363.
Github, "OpenTracing," 10 pages, Retrieved on Jul. 5, 2023, from URL: https://github.com/opentracing/specification/blob/master/specification.md.
Goins A., et al., "Diving Deep into Kubernetes Networking," Rancher, Jan. 2019, 42 pages.
Goldsteen A., et al., "A Tool for Monitoring and Maintaining System Trustworthiness at RunTime," REFSQ, 2015, pp. 142-147.
Grove D., et al., "Call Graph Construction in Object-Oriented Languages," ACM Object-oriented Programming, Systems, Languages, and Applications—OOPSLA '97 Conference Proceedings, Oct. 1997, 18 pages.
Hamadi S., et al., "Fast Path Acceleration for Open vSwitch in Overlay Networks," Global Information Infrastructure and Networking Symposium (GIIS), Montreal, QC, Sep. 15-19, 2014, 5 pages.
Heckman S., et al., "On Establishing a Benchmark for Evaluating Static Analysis Alert Prioritization and Classification Techniques," IEEE, Oct. 9-10, 2008, 10 Pages.
Henke C., et al., "Evaluation of Header Field Entropy forHash-Based Packet Selection," based on Search String from Google: "entropy header fields," Obtained on: Nov. 12, 2019, Passive and Active Network Measurement—PAM, 2008, vol. 4979, pp. 82-91.
Hideshima Y., et al., "STARMINE: A Visualization System for Cyber Attacks," Australian Computer Society, Inc., Jan. 2006, Asia-Pacific Symposium on Information Visualization (APVIS 2006), Tokyo, Japan, Feb. 2006, pp. 1-9, Retrieved from the Internet: URL: htps://www.researchgate.net/publication/221536306.
Hogg S., "Not your Father's Flow Export Protocol (Part 2), What is AppFlow and how does it Differ From Other Flow Analysis Protocols?," Core Networking, Mar. 19, 2014, 6 pages.
Huang D-J., et al., "Clock Skew Based Node Identification in Wireless Sensor Networks," IEEE Globecom, 2008, 5 Pages.
Ihler A., et al., "Learning to Detect Events With Markov-Modulated Poisson Processes," ACM Transactions on Knowledge Discovery From Data, Dec. 2007, vol. 1, No. 3, Article 13, pp. 13:1 to 13:23.
International Search Report and Written Opinion for International Application No. PCT/US2016/035348, dated Jul. 27, 2016, 8 pages.
International Search Report and Written Opinion for International Application No. PCT/US2016/035349, dated Jul. 27, 2016, 8 pages.
International Search Report and Written Opinion for International Application No. PCT/US2016/035350, dated Aug. 17, 2016, 13 pages.
International Search Report and Written Opinion for International Application No. PCT/US2016/035351, dated Aug. 10, 2016, 15 pages.
Internetperils, Inc., "Control Your Internet Business Risk," 2003-2015, 3 Pages, [Retrieved on Apr. 21, 2016], Retrieved from the Internet: URL: https://www.internetperils.com.
Ives H.E., et al., "An Experimental Study of the Rate of a Moving Atomic Clock," Journal of the Optical Society of America, Jul. 1938, vol. 28, No. 7, pp. 215-226.
Janoff, Christian, et al., "Cisco Compliance Solution for HIPAA Security Rule Design and Implementation Guide," Cisco Systems, Inc., Updated Nov. 14, 2015, 938 Pages.
Joseph D., et al., "Modeling Middleboxes," IEEE Network, Sep./Oct. 2008, pp. 20-25.
Juels A., "RFID Security and Privacy: A Research Survey," Feb. 2006, IEEE Journal on Selected Areas in Communications, vol. 24, No. 2, pp. 381-394.
Kalyanasundaram B., et al., "Using Mobile Data Collectors to Federate Clusters of Disjoint Sensor Network Segments," IEEE, International Conference on Communications, Department of Computer Science and Electrical Engineering, University of Maryland Baltimore County, 2013, pp. 1496-1500.
Kent S., et al., "Security Architecture for the Internet Protocol," Network Working Group, Nov. 1998, 67 Pages.
Kerrison A., et al., "Four Steps to Faster, Better Application Dependency Mapping—Laying the Foundation for Effective Business Service Models," BMCSoftware, 2011, 12 Pages.
Kim M-S., et al., "A Flow-based Method for Abnormal Network Traffic Detection," Institute of Electrical and Electronics Engineers—IEEE, 2004, pp. 599-612.
Kubernetes Blog, "Borg: The Predecessor to Kubernetes," Apr. 23, 2015, 2 pages, Retrieved from URL: https://kubernetes.io/blog/2015/04/borg-predecessor-to-kubernetes/.
Kubernetes IO, "Kubernetes Components," Aug. 28, 2020, 4 pages, Retrieved from URL: https://kubernetes.io/docs/concepts/overview/components/.
Kubernetes IO, "Nodes," Jan. 12, 2021, 6 pages, Retrieved from URL: https://kubernetes.io/docs/concepts/architecture/nodes/.
Kubernetes IO, "Pods," Jan. 12, 2021, 5 pages, Retrieved from URL: https://kubernetes.io.docs/concepts/workloads/pods/pod/.
Kubernetes IO, "What is Kubernetes?," Oct. 22, 2020, 3 pages, Retrieved from URL: https://kubernetes.io/docs/concepts/overview/what-is-kubernetes/.
Lab SKU: "VMware Hands-on Labs—HOL-SDC-1301," Lab Overview, 2013, [Version Mar. 21, 2014-Jul. 9, 2016] Retrieved from URL: http://docs.hol.vmware.com/HOL-2013/hol-sdc-1301_html_en/, Uploaded in 2 Parts, 118 Pages.
Landman Y., et al., "Dependency Analyzer," JFrog Wiki, Feb. 14, 2008, 1 Page, [Retrieved on Apr. 22, 2016] Retrieved from URL: http://frog.com/confluence/display/DA/Home.
Lee S., "Reducing Complexity of Large-Scale Network Configuration Management," Ph.D. Dissertation, Carniege Mellon University, Pittsburg, PA, May 2010, 200 Pages.
Li A., et al., "Fast Anomaly Detection for Large Data Centers," IEEE Global Telecommunications Conference (GLOBECOM), Dec. 2010, 6 Pages.
Li B., et al., "A Supervised Machine Learning Approach to Classify Host Roles on Line Using Sflow," In Proceedings of the First Edition Workshop on High Performance and Programmable Networking, Association for Computing Machinery—ACM, New York, USA, Jun. 18, 2013, pp. 53-60, Provided in IDS dated Apr. 27, 2016.
Liu T., et al., "Impala: A Middleware System for Managing Autonomic, Parallel Sensor Systems," In Proceedings of the Ninth ACM SIGPLAN Symposium on Principles and Practice of Parallel Programming, ACM, New York, United States of America, Jun. 11-13, 2003, 12 Pages.
Lorenzo G.D., et al., "EXSED: An Intelligent Tool for Exploration of Social Events Dynamics from Augmented Trajectories," IEEE 14th International Conference on Mobile Data Management (MDM), Jun. 3-6, 2013, vol. 1, pp. 323-330.

(56) References Cited

OTHER PUBLICATIONS

Lu Z., et al., "Cluster-based Simulated Annealing for Mapping Cores onto 2D Mesh Networks on Chip," IEEE Workshop on Design and Diagnostics of Electronic Circuits and Systems, Apr. 16-18, 2008, 6 Pages.
Merriam-Webster, "Definition of Database," Merriam-Webster Dictionary, 2018, 4 Pages.
Miller N., et al., "Collecting Network Status Information for Network-Aware Applications," International Conference on Computer Communications IEEE (INFOCOM), 2000, pp. 1-10.
Moe J., et al., "Understanding Distributed Systems Via Execution Trace Data," Proceedings of the 9th International Workshop on Program Comprehension, Toronto, Canada, May 12-13, 2001, 8 Pages.
Nagarajan R., et al., "Approximation Techniques for Computing Packet Loss in Finite-buffered Voice Multiplexers," IEEE Journal on Selected Areas in Communications, Apr. 1991, vol. 9, No. 3, pp. 368-377.
Natarajan A., et al., "NSDMiner: Automated Discovery of Network Service Dependencies," Proceedings IEEE INFOCOM, Orlando, FL, 2012, 9 Pages.
Navaz A.S.S., et al., "Entropy Based Anomaly Detection System to Prevent DDoS Attacks in Cloud," International Journal of Computer Applications (0975-8887), Jan. 2013, vol. 62, No. 15, pp. 42-47.
Neverfail, "Neverfail IT Continuity Architect," 2015, 6 Pages, Retrieved on [Apr. 22, 2016], Retrieved from the Internet: URL: https://web.archive.org/web/20150908090456/ http://www.neverfallgroup.com/products/it-continuity-architect.
Nilsson D.K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Notification Concerning Transmittal of Copy of International Preliminary Report on Patentability for International Application No. PCT/US2016/035348, dated Dec. 14, 2017, 7 pages.
Notification Concerning Transmittal of Copy of International Preliminary Report on Patentability for International Application No. PCT/US2016/035349, dated Dec. 14, 2017, 7 pages.
Notification Concerning Transmittal of Copy of International Preliminary Report on Patentability for International Application No. PCT/US2016/035350, dated Dec. 14, 2017, 11 pages.
Notification Concerning Transmittal of Copy of International Preliminary Report on Patentability for International Application No. PCT/US2016/035351, dated Dec. 14, 2017, 11 pages.
Nunnally T., et al., "P3D: A Parallel 3D Coordinate Visualization for Advanced Network Scans," IEEE International Conference on Communications (ICC), Jun. 9-13, 2013, pp. 1-6, Retrieved from the Internet: URL: www2.ece.gatech.edu.
Ohta K., et al., "Detection, Defense, and Tracking of Internet-Wide Illegal Access in a Distributed Manner," 2000, 16 bages, [Retrieved on May 9, 2016], Retrieved from Internet: URL: https://www.isoc.org/inet2000/cdproceedings/1f/1f_2.htm.
Online Collins English Dictionary: "Precede Definition and Meaning," 1 Page, [Retrieved on Apr. 9, 2018].
Opentracing IO, "The OpenTracing Semantic Specification," 8 pages, Retrieved on Jul. 5, 2023, from URL: https://opentracing.io/docs/.
Pathway Systems International Inc., "How Blueprints does Integration," Apr. 15, 2014, 9 Pages, [Retrieved on Apr. 27, 2016], Retrieved from the Internet: URL: http://pathwaysystems.com/company-blog/.
Pathway Systems International Inc., "What is Blueprints?," 2010-2016, 1 Page, [Retrieved on Apr. 27, 2016], Retrieved from the Internet: URL: http://pathwavsystems.com/blueprints-about/.
Popa L., et al., "Macroscope: End-Point Approach to Networked Application Dependency Discovery," CoNEXT'09, Dec. 1-4, 2009, Rome, Italy, 12 pages.
Prasad K.M., et al., "An Efficient Detection of Flooding Attacks to Internet Threat Monitors (ITM) using Entropy Variations under Low Traffic," Computing Communication Networking Technologies (ICCCNT 12), Jul. 26-28, 2012, 11 Pages.
Sachan M., et al., "Solving Electrical Networks to Incorporate Supervision in Random Walks," In Proceedings of the 22nd International Conference on World Wide Web Companion (WWW '13 Companion), International World Wide Web Conferences Steering Committee, Republic and Canton of Geneva, Switzerland, May 13-17, 2013, pp. 109-110.
Sammarco M., et al., "Trace Selection for Improved WLAN Monitoring," In Proceedings of the 5th ACM Workshop on HotPlanet (HotPlanet '13), ACM, New York, NY, USA, Aug. 16, 2013, pp. 9-14.
Sardella A., "Securing Service Provider Networks: Protecting Infrastructure and Managing Customer Security," Juniper Networks, Inc., White Paper, Dec. 2006, pp. 1-19.
Senel F., et al., "Optimized Interconnection of Disjoint Wireless Sensor Network Segments Using K Mobile Data Collectors," IEEE International Conference on Communications (ICC), Jun. 2012, pp. 497-501.
Sherri S., et al., "A Chipset Level Network Backdoor: Bypassing Host-Based Firewall IDS," ACM 2009, pp. 125-134.
Shneiderman B., "Network Visualization by Semantic Substrates," Visualization and Computer Graphics, IEEE Transactions on Visualization and Computer Graphics, Sep./Oct. 2006, vol. 12 (5), pp. 733-740.
Sigelman B.H., et al., "Dapper, A Large-Scale Distributed Systems Tracing Infrastructure," Google Technical Report dapper-2010-1, Apr. 2010, 14 Pages, Retrieved from the Internet: URL: https://research.google/pubs/pub36356/.
Templeton S.J., et al., "Detecting Spoofed Packets," IEEE, Proceedings of the DARPA Information Survivability Conference and Exposition (DISCEX'03), 2003, pp. 1-12.
Theodorakopoulos G., et al., "On Trust Models and Trust Evaluation Metrics for Ad Hoc Networks," IEEE Journal on Selected Areas in Communications, Feb. 2006, vol. 24, No. 2, pp. 318-328.
Thomas R., "Bogon Dotted Decimal List," Version 7.0, Team Cymru NOC, Apr. 27, 2012, 5 Pages.
"Top 4 Strategies to Mitigate Targeted Cyber Intrusions," Cyber Security Operations Centre, Australian Government Department of Defence, Intelligence and Security, Jul. 2013, Retrieved from URL: http://www.asd.aov.au/infosec/tom-mitiqations/top-4-strategies-exolained.html, 42 Pages.
Voris J., et al., "Bait and Snitch: Defending Computer Systems with Decoys," Columbia University Libraries, Department of Computer Science, 2013, 25 pages.
Wang R., et al., "Learning Directed Acyclic Graphs Via Bootstrap Aggregating," Jun. 9, 2014, 47 pages, Retrieved from Internet: URL: http://arxiv.org/abs/1406.2098.
Wang Y., et al., "A Network Gene-Based Framework for Detecting Advanced Persistent Threats," 2014 Ninth International Conference on P2P, Parallel, Grid, Cloud and Internet Computing, Nov. 2014, IEEE, pp. 97-102.
Witze A., "Special Relativity Aces Time Trial, Time Dilation Predicted by Einstein Confirmed by Lithium Ion Experiment," Nature, Sep. 19, 2014, 3 Pages.
Woodberg B., "Snippet from Juniper SRX Series," O'Reilly Media, Inc, Rob Cameron Publisher, Jun. 17, 2013, 1 page.
Zatrochova B.Z., "Analysis and Testing of Distributed NoSQL Datastore Riak," Brno, May 28, 2015, 2 Pages.
Patrochova B.Z., "Analysis and Testing of Distributed NoSQL Datastore Riak," Masaryk University, Faculty of Informatics, Brno, Spring, 2015, 76 Pages.
Zeng S., et al., "Managing Risk in Multi-node Automation of Endpoint Management," IEEE Network Operations and Management Symposium (NOMS), 2014, 6 Pages, Retrieved from URL: https://ieeexplore.ieee.org/stamp/stamp.jsp?tp=&arnumber=6838295.
Zhang D., et al., "Packet Loss Measurement and Control for VPN based Services," Proceedings of IEEE Instrumentation and Measurement Technology Conference, May 17-19, 2005, vol. 3, 5 Pages.
Zhang Y., et al., "Cantina: A Content-Based Approach to Detecting Phishing Web Sites," May 8-12, 2007, pp. 639-648.

(56) References Cited

OTHER PUBLICATIONS

"A Cisco Guide to Defending Against Distributed Denial of Service Attacks," Cisco Systems Incorporated, San Jose, California, [Last Visited May 3, 2016] Retrieved from URL: http://www.cisco.com/web/about/security/intelligence/guide_ddos_defense.html, 34 Pages.

Al-Fuqaha A., et al., "Internet of Things: A Survey on Enabling Technologies, Protocols, and Applications, " IEEE Communication Surveys Tutorials, Fourth Quarter, Nov. 18, 2015, vol. 17, No. 4, pp. 2347-2376.

Ananthanarayanan R., et al., "Photon: Fault-tolerant and Scalable Joining of Continuous Data Streams," Proceedings of the ACM SIGMOD International Conference on Management of Data, New York, USA, Jun. 22-27, 2013, pp. 577-588.

Aniszczyk C., "Distributed Systems Tracing with Zipkin," Twitter Blog, Jun. 7, 2012, 3 Pages, [Retrieved on Jan. 26, 2021] Retrieved from URL: https://blog.twitter.com/engineering/en_us/a/2012/distributed-systems-tracing-with-zipkin.html.

Arista Networks, Inc., "Application Visibility and Network Telemtry Using Splunk," Arista White Paper, Nov. 2013, 9 Pages.

Author Unknown, "Blacklists Dynamic Blacklists Reputation: Understanding Why the Evolving Threat Eludes Blacklists," Retrieved on Aug. 31, 2017, Dambala, Atlanta, GA 30308, USA, 9 Pages.

Aydin G., et al., "Architecture and Implementation of a Scalable Sensor Data Storage and Analysis System Using Cloud Computing and Big Data Technologies," Journal of Sensors, vol. 2015, Article 834217, Feb. 2015, 11 Pages.

Ayers A., et al., "TraceBack: First Fault Diagnosis by Reconstruction of Distributed Control Flow," Proceedings of the 2009 ACM SIGPLAN Conference on Programming Language Design and Implementation-PLDI '09, Jun. 12-15, 2005, vol. 40, No. 6, 13 pages.

Baah G.K., et al., "The Probabilistic Program Dependence Graph and Its Application to Fault Diagnosis," IEEE Transactions on Software Engineering, IEEE Service Center, Los Alamitos, CA, US, Jul./Aug. 2010, vol. 36, No. 4, pp. 528-545, ISSN 0098-5589, XP011299543.

Backes M., et al., "Data Lineage in Malicious Environments," IEEE, 2015, pp. 1-13.

Baek K-H., et al., "Preventing Theft of Quality of Service on Open Platforms," Workshop of the 1st International Conference on Security and Privacy for Emerging Areas in Communication Networks, 2005, 12 Pages, Retrieved from URL: https://ieeexplore.ieee.org/stamp/stamp.jsp?tp=&arnumber=1588319.

Bayati M., et al., "Message-Passing Algorithms for Sparse Network Alignment," ACM Transactions on Knowledge Discovery from Data, vol. 7, No. 1, Article 3, Mar. 2013, 31 Pages.

Berezinski P., et al., "An Entropy-Based Network Anomaly Detection Method," Entropy, vol. 17, Apr. 20, 2015, Retrieved from URL: www.mdpi.com/journal/entropy, pp. 2367-2408.

Berthier R., et al., "Nfsight: Netflow-based Network Awareness Tool," In Proceedings of the 24th International Conference on Large Installation System Administration, USENIX Association, Berkeley, CA, USA, 2010, 16 Pages.

Bhuyan D., "Fighting Bots and Botnets," In Proceedings of the International Conference on i-Warfare and Security, Academic Conferences Limited, 2006, pp. 23-28.

Blair D., et al., U.S. Appl. No. 62/106,006, filed Jan. 21, 2015, entitled "Monitoring Network Policy Compliance," 22 Pages.

Bosch G., "Virtualization," Modified on Apr. 2010 by Davison B., 33 Pages.

Brahmi H.I., et al., "Improving Emergency Messages Transmission Delay in Road Monitoring Based WSNs," 6th Joint FIP Wireless and Mobile Networking Conference (WMNC), 2013, 8 Pages, [Retrieved on Aug. 31, 2021].

Breen C., "MAC 911: How to Dismiss Mac App Store Notifications," Macworld, Mar. 24, 2014, 3 Pages.

Brocade Communications Systems, Inc., "Chapter 5 Configuring Virtual LANs (VLANs)," Jun. 2009, 38 pages.

Chandran M., et al., "Monitoring in a Virtualized Environment," GSTF International Journal on Computing, Aug. 2010, vol. 1, No. 1, 6 Pages.

Chari S., et al., "Ensuring Continuous Compliance Through Reconciling Policy with Usage," Proceedings of the 18th ACM Symposium on Access Control Models andTechnologies, NewYork, United States of America, Jun. 12-14, 2013, pp. 49-60.

Chen X., et al., "Automating Network Application Dependency Discovery: Experiences, Limitations, and New Solutions," 8th USENIX Symposium on Operating Systems Design and Implementation (OSDI'08), Usenix Association, Berkeley, California, United States of America, retrieved Aug. 30, 2017, pp. 117-130.

Choi C.H., et al., "CSMonitor: A Visual Client/Server Monitor for CORBA-based Distributed Applications," Proceedings of 1998 Asia Pacific Software Engineering Conference, Taipei, Taiwan, Los Alamitos, CA, USA, Dec. 2-4, 1998, 8 Pages, DOI:10.1109/APSEC. 1998.733738, ISBN 978-0-8186-9183-6, XP010314829.

Chou C.W., et al., "Optical Clocks and Relativity," Science, vol. 329, Sep. 24, 2010, pp. 1630-1633.

Cisco Systems, "Cisco Network Analysis Modules (NAM) Tutorial," Cisco Systems, Inc., Version: 3.5, Accessed web bage Oct. 13, 2015, 2006, 320 pages.

Cisco Systems Inc: "Addressing Compliance from One Infrastructure: Cisco Unified Compliance Solution Framework," 2014, 3 Pages.

Cisco Systems, Inc., "CCNA2 v3.1 Module 1 WANs and Routers," Cisco.com, May 14, 2018, 26 pages.

Cisco Systems, Inc., "CCNA2 v3.1 Module 2 Introduction to Routers," Cisco.com, Jan. 18, 2018, 23 pages.

Cisco Systems Inc: "Cisco 4710 Application Control Engine Appliance Hardware Installation Guide," Nov. 2007, 66 Pages.

Cisco Systems, Inc., "Cisco Application Control Engine (ACE) Troubleshooting Guide—Understanding the ACE Module Architecture and Traffic Flow," Mar. 11, 2011, 6 Pages.

Cisco Systems Inc: "Cisco Application Visibility and Control," At-A-Glance, Oct. 2011, 2 Pages.

Cisco Systems Inc: "Cisco Data Center Network Architecture and Solutions Overview," Feb. 2006, 19 Pages.

Cisco Systems, Inc., "Cisco IOS Configuration Fundamentals Configuration Guide: Using Autoinstall and Setup," Release 12.2, first published Apr. 2001, last updated Sep. 2003, 32 pages.

Cisco Systems Inc: "Cisco, Nexus 3000 Series NX-OS Release Notes, Release 5.0(3)U3(1)," Feb. 29, 2012, 16 Pages, Part No. OL-26631 -01.

Cisco Systems, Inc., "Cisco, Nexus 5000 Series and Cisco Nexus 2000 Series Release Notes," Cisco NX-OS Release 5.1 (3)N2(1b), NX-OS Release 5.1(3)N2(1a) and NX-OS Release 5.1 (3)N2(1), Sep. 5, 2012, Part No. OL-26652-03 CO, Current Release: NX-OS Release 5.1(3)N2(1b), 24 pages.

Cisco Systems Inc: "Cisco Remote Integrated Service Engine for Citrix NetScaler Appliances and Cisco Nexus 7000 Series Switches Configuration Guide," Last modified Apr. 29, 2014, 78 Pages.

Cisco Systems Inc., "Cisco Tetration Platform Data Sheet," Cisco, Updated Mar. 5, 2018, 21 Pages.

Cisco Systems, Inc., "Cisco VN-Link: Virtualization-Aware Networking," A Technical Primer, 2009, 9 Pages.

Cisco Systems, Inc., "Cisco VPN Client User Guide for Windows," Release 4.6, Aug. 2004, 148 pages.

Cisco Systems Inc: "New Cisco Technologies Help Customers Achieve Regulatory Compliance," White Paper, 1992-2008, retrieved on Aug. 31, 2017, 9 Pages.

Cisco Systems Inc: "Nexus 3000 Series NX-OS Fundamentals Configuration Guide, Release 5.0(3)U3(1): Using PowerOn Auto Provisioning," Feb. 29, 2012, 10 Pages, Part No. OL-26544-01.

Cisco Systems Inc: "Quick Start Guide, Cisco ACE 4700 Series Application Control Engine Appliance," Software Version A5(1.0), Sep. 2011, 138 Pages.

Cisco Systems Inc: "Routing And Bridging Guide, Cisco ACE Application Control Engine," Software Version A5 (1.0), Sep. 2011, 248 Pages.

Cisco Systems, Inc., "VMWare and Cisco Virtualization Solution: Scale Virtual Machine Networking," Jul. 2009, pp. 1-4.

(56) References Cited

OTHER PUBLICATIONS

Cisco Technology Inc: "Cisco IOS Software Release 12.4T Features and Hardware Support," Feb. 2009, 174 Pages, Retrieved from URL: http://www.cisco.com/c/en/us/Qroducts/collateralhos-nx-os-softwarehossoftware-releases-12-4-t/product bulletin_c25-409474.html.
Cisco Technology Inc., "Lock-and-Key: Dynamic Access Lists," Updated Jul. 12, 2006, Retrieved from URL: http://www/cisco.com/c/en/us/suppor/docs/security-ypn/lock-key/7604-13.html, 16 Pages.
Citirx, "AppFlow: Next-Generation Application Performance Monitoring," Citirx.com, 2011, pp. 1-8.
Costa R., et al., "An Intelligent Alarm Management System for Large-Scale Telecommunication Companies," In Portuguese Conference on Artificial Intelligence, Oct. 2009, 14 Pages, Retrieved from the Internet: URL: https://repositorium.sdum.uminho.Pt/bitstream/1822/11357/1/154-2.pdf.
De Carvalho T.F.R., "Root Cause Analysis in Large and Complex Networks," Mestrado Em Seguranca Informatica, Dec. 2008, 66 Pages.
Crisan D., et al., "Datacenter Applications in Virtualized Networks: A Cross-Layer Performance Study", IEEE Journal on Selected Areas in Communications, vol. 32, No. 1, Retrieved on Oct. 1, 2023, Published on Jan. 1, 2014, pp. 77-87.
European Search Report in European Patent Application No. 23176492.9, dated Oct. 6, 2023, 5 Pages.
Wang J.Y., et al., "Continuous Data Collection in Wireless Sensor Networks through PNC and Distributed Storage", 2007 International Conference on Wireless Communications, Networking and Mobile Computing, 2007, pp. 2568-2571.

\* cited by examiner

SYSTEM FOR MONITORING AND MANAGING DATACENTERS

RELATED APPLICATIONS

This application is a Continuation of U.S. application Ser. No. 16/899,190, filed on Jun. 11, 2020, which in turn, is a Continuation of U.S. application Ser. No. 16/179,027, filed on Nov. 2, 2018, now U.S. Pat. No. 10,686,804, which in turn, is a Continuation of U.S. application Ser. No. 15/134,100, filed on Apr. 20, 2016, now U.S. Pat. No. 10,142,353, which in turn, claims priority to U.S. Provisional Application No. 62/171,899, filed Jun. 5, 2015, all of which are incorporated herein by reference in their entirety.

TECHNICAL FIELD

The present technology pertains to network monitoring and more specifically pertains to analyzing network traffic based on data retrieved throughout a datacenter.

BACKGROUND

As data centers grow in size and complexity, the tools that manage them must be able to effectively identify inefficiencies while implementing appropriate security policies. Traditionally, network administrators have to manually implement security policies, manage access control lists (ACLs), configure firewalls, identify misconfigured or infected machines, etc. These tasks can become exponentially more complicated as a network grows in size and require an intimate knowledge of a large number of data center components. Furthermore, malicious attacks or misconfigured machines can shut down a data center within minutes while it could take a network administrator hours or days to determine the root problem and provide a solution

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Contents

Figure 1:
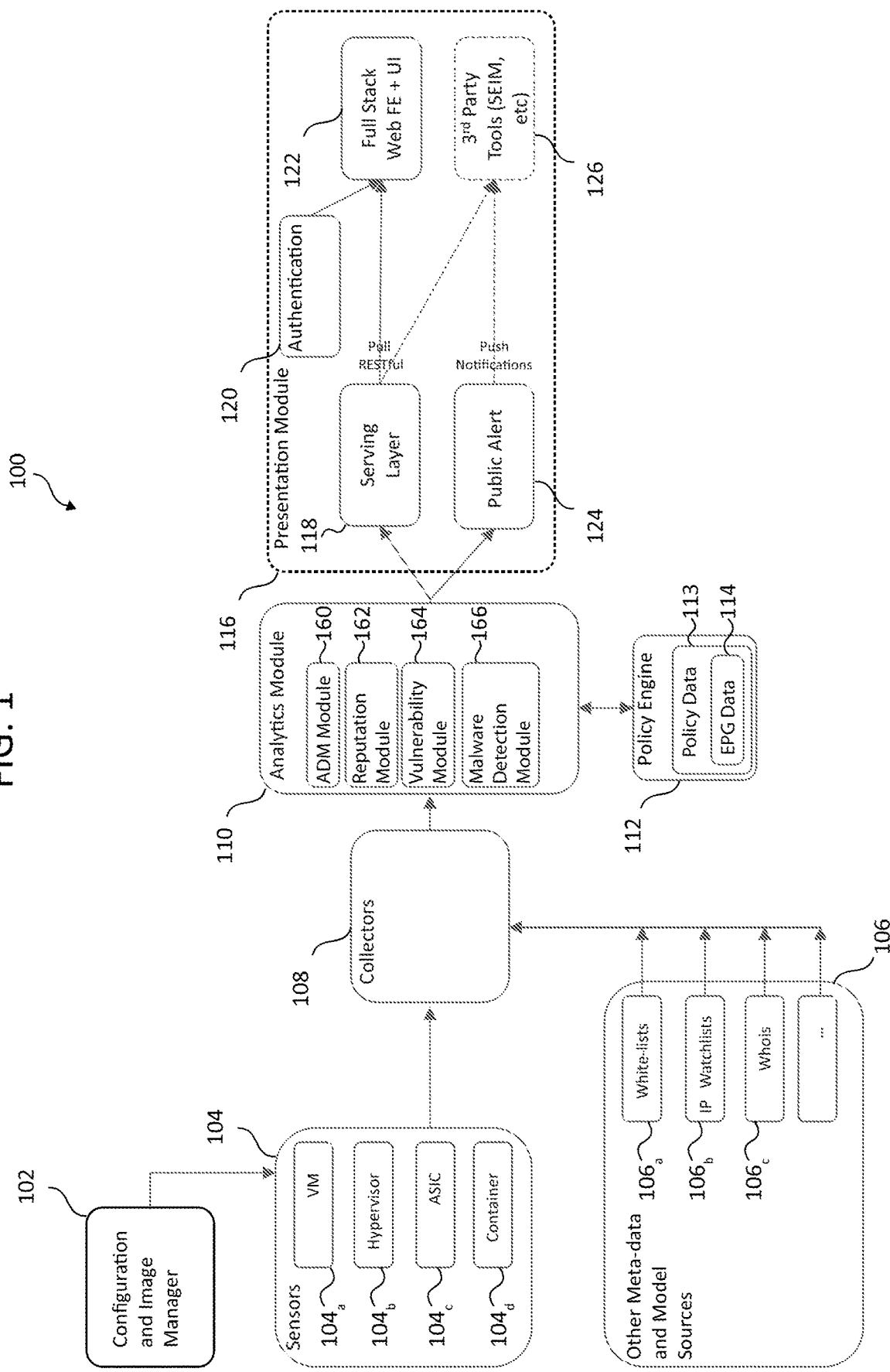
FIG. 1 shows an example network traffic monitoring system according to some example embodiments.

System in General 7
Automatic download and launch new software version on a sensor of a computing network 25
Sensor upgrade path—detect non critical time 26
Aggregation of Data Flows 27
Detecting Sensor Type in Traffic monitoring system 27
Auto update of Configuration in Sensors 28
Detecting virtual switching devices and forwarding models used by Hypervisors in Traffic monitoring system 29
Self Policing of Resources Used by Sensors in VMs and Hypervisors 31
Dealing with Compromised Sensors in VMs and Hypervisors 32
Collector High Availability 35
Identifying Bogon Address Spaces 36
Hierarchical Sharding of Flows from Sensors to Collectors 37
Data Aggregator at Collector 39
Detecting a Compromised Collector 44
Detecting Compromised Sensors 45
Directed Acyclic Graph of Down Services to Prioritize Repair 47
Synthetic Traffic Flows for Pipeline Health Check 48
Enforcing network policies using sensors 48
Differential Analysis for Detecting Hidden 49
Differential Analysis for Detecting Hidden Flows 52
Late Data Detection in Data Center 54
Determining Causality of Events 60
Custom Events Processor for Network Event 63
Spoof Detection Based on Distributed Topology Mapping and Traffic History 65
Determining Packet Loss at Different Points in a Distributed Sensor-Collector Architecture 67
Detecting Sensor-Collector Topology 69
Creating a Host Reputation Score 73
Using Host Reputation Data 74
Determining network graph, and annotating with latency 75
Detecting network anomaly/faults using above graph and latency 76
Detecting clock offsets nodes 76
Detecting application latency 77
Conditional Policies 77
Robust Host Reputation Based On External Sources 78
Policy Utilization (and Garbage Collection) 79
Policy Simulation 81
Policy Utilization (and Garbage Collection) 83
Policy Compliance 84
Network Vulnerability Quantification and Visualization 86
Flow rank on a flow search page 87
Parallel coordinate charts for flow exploration 89
Flow Annotation 90
Overcoming an Attack on DDOS Detection Software 92
Smart Enforcement of Policies 93
Intra-datacenter DDOS Detection 94
Network Vulnerability Quantification and Visualization 96
Microburst Detection 98
Measurements Based on Sequence Number 98
Header field entropy 100
TTL changed 101
Profiling a Host Based on Sent Packets Histogram 102
Flow Anti-Aliasing 103
TCP State Tracking Outside of a Host Device 104
Flow De-duplication 104
Selective Packet Capture 105
Unique Sensor ID Creation 106
Analyze DHCP for flow analysis 107
Analyze multicast for flow analysis 107
Collapsing and placement of applications 108
Collapsing and placement of attack neighbors 109
GEO with network database and GEO visualization 110
Network Monitoring and Analytics System 111
An ADM pipeline to generate communication graph 112

Generating vectors for nodes in a computing network 112
Generate vectors based on processes running on computing nodes 114
Improved ADM pipeline 114
Generating an optimized number of clusters using a minimum description length (MDL) approach 115
Generating an optimized number of clusters using a Silhouette score 118
Extracting and displaying informative summaries on a UI 119
Fusion of multiple signals for clustering 120
Automated naming of clusters generated in a computing network 121
Re-generate ADM Pipeline incorporating user feedback and corrections 123
Server-Client determination 123
Discovering causal temporal patterns 124
UI-ADM: Parallel Collapsible Chord Chart for ADM 125
Business criticality based on network usage 126
Determining Application Disruption Likelihood Using Net 127

DESCRIPTION OF EXAMPLE EMBODIMENTS

Overview

An example method includes detecting, using sensors, packets throughout a datacenter. The sensors can then send packet logs to various collectors which can then identify and summarize data flows in the datacenter. The collectors can then send flow logs to an analytics module which can identify the status of the datacenter and detect an attack.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

System

FIG. 1 shows an example network traffic monitoring system 100 according to some example embodiments. Network traffic monitoring system 100 can include configuration and image manager 102, sensors 104, external data sources 106, collectors 108, analytics module 110, policy engine 112, and presentation module 116. These modules may be implemented as hardware and/or software components. Although FIG. 1 illustrates an example configuration of the various components of network traffic monitoring system 100, those of skill in the art will understand that the components of network traffic monitoring system 100 or any system described herein can be configured in a number of different ways and can include any other type and number of components. For example, sensors 104 and collectors 108 can belong to one hardware and/or software module or multiple separate modules. Other modules can also be combined into fewer components and/or further divided into more components.

Configuration and image manager 102 can provision and maintain sensors 104. In some example embodiments, sensors 104 can reside within virtual machine images, and configuration and image manager 102 can be the component that also provisions virtual machine images.

Configuration and image manager 102 can configure and manage sensors 104. When a new virtual machine is instantiated or when an existing one is migrated, configuration and image manager 102 can provision and configure a new sensor on the machine. In some example embodiments configuration and image manager 102 can monitor the health of sensors 104. For instance, configuration and image manager 102 may request status updates or initiate tests. In some example embodiments, configuration and image manager 102 can also manage and provision virtual machines.

In some example embodiments, configuration and image manager 102 can verify and validate sensors 104. For example, sensors 104 can be provisioned a unique ID that is created using a one-way hash function of its basic input/output system (BIOS) universally unique identifier (UUID) and a secret key stored on configuration and image manager 102. This UUID can be a large number that is difficult for an imposter sensor to guess. In some example embodiments, configuration and image manager 102 can keep sensors 104 up to date by installing new versions of their software and applying patches. Configuration and image manager 102 can obtain these updates automatically from a local source or the Internet.

Sensors 104 can reside on nodes of a data center network (e.g., virtual partition, hypervisor, physical server, switch, router, gateway, other network device, other electronic device, etc.). In general, a virtual partition may be an instance of a virtual machine (VM) (e.g., VM 104a), sandbox, container (e.g., container 104c), or any other isolated environment that can have software operating within it. The software may include an operating system and application software. For software running within a virtual partition, the virtual partition may appear to be a distinct physical server. In some example embodiments, a hypervisor (e.g., hypervisor 104b) may be a native or "bare metal" hypervisor that runs directly on hardware, but that may alternatively run under host software executing on hardware. Sensors 104 can monitor communications to and from the nodes and report on environmental data related to the nodes (e.g., node IDs, statuses, etc.). Sensors 104 can send their records over a high-speed connection to collectors 108 for storage. Sensors 104 can comprise a piece of software (e.g., running on a VM, container, virtual switch, hypervisor, physical server, or other device), an application-specific integrated circuit (ASIC) (e.g., a component of a switch, gateway, router, standalone packet monitor, or other network device including a packet capture (PCAP) module or similar technology), or an independent unit (e.g., a device connected to a network device's monitoring port or a device connected in series along a main trunk of a datacenter). It should be understood that various software and hardware configurations can be used as sensors 104. Sensors 104 can be lightweight, thereby minimally impeding normal traffic and compute resources in a datacenter. Sensors 104 can "sniff" packets being sent over its host network interface card (NIC) or individual processes can be configured to report traffic to sensors 104. This sensor structure allows for robust capture of granular (i.e., specific) network traffic data from each hop of data transmission.

As sensors 104 capture communications, they can continuously send network traffic data to collectors 108. The network traffic data can relate to a packet, a collection of packets, a flow, a group of flows, etc. The network traffic data can also include other details such as the VM BIOS ID, sensor ID, associated process ID, associated process name, process user name, sensor private key, geo-location of a sensor, environmental details, etc. The network traffic data can include information describing the communication on all layers of the Open Systems Interconnection (OSI) model. For example, the network traffic data can include signal strength (if applicable), source/destination media access control (MAC) address, source/destination internet protocol (IP) address, protocol, port number, encryption data, requesting process, a sample packet, etc.

In some example embodiments, sensors 104 can preprocess network traffic data before sending to collectors 108. For example, sensors 104 can remove extraneous or duplicative data or they can create a summary of the data (e.g., latency, packets and bytes sent per flow, flagged abnormal activity, etc.). In some example embodiments, sensors 104 can be configured to only capture certain types of connection information and disregard the rest. Because it can be overwhelming for a system to capture every packet in a network, in some example embodiments, sensors 104 can be configured to capture only a representative sample of packets (e.g., every 1,000th packet or other suitable sample rate).

Sensors 104 can send network traffic data to one or multiple collectors 108. In some example embodiments, sensors 104 can be assigned to a primary collector and a secondary collector. In other example embodiments, sensors 104 are not assigned a collector, but can determine an optimal collector through a discovery process. Sensors 104 can change where they send their network traffic data if their environments change, such as if a certain collector experiences failure or if a sensor is migrated to a new location and becomes closer to a different collector. In some example embodiments, sensors 104 can send different types of network traffic data to different collectors. For example, sensors 104 can send network traffic data related to one type of process to one collector and network traffic data related to another type of process to another collector.

Collectors 108 can serve as a repository for the data recorded by sensors 104. In some example embodiments, collectors 108 can be directly connected to a top of rack switch. In other example embodiments, collectors 108 can be located near an end of row switch. Collectors 108 can be located on or off premises. It will be appreciated that the placement of collectors 108 can be optimized according to various priorities such as network capacity, cost, and system responsiveness. In some example embodiments, data storage of collectors 108 is located in an in-memory database, such as dashDB by International Business Machines. This approach benefits from rapid random access speeds that typically are required for analytics software. Alternatively, collectors 108 can utilize solid state drives, disk drives, magnetic tape drives, or a combination of the foregoing according to cost, responsiveness, and size requirements. Collectors 108 can utilize various database structures such as a normalized relational database or NoSQL database.

In some example embodiments, collectors 108 may only serve as network storage for network traffic monitoring system 100. In other example embodiments, collectors 108 can organize, summarize, and preprocess data. For example, collectors 108 can tabulate how often packets of certain sizes or types are transmitted from different nodes of a data center. Collectors 108 can also characterize the traffic flows going to and from various nodes. In some example embodiments, collectors 108 can match packets based on sequence numbers, thus identifying traffic flows and connection links. In some example embodiments, collectors 108 can flag anomalous data. Because it would be inefficient to retain all data indefinitely, in some example embodiments, collectors 108 can periodically replace detailed network traffic flow data with consolidated summaries. In this manner, collectors 108 can retain a complete dataset describing one period (e.g., the past minute or other suitable period of time), with a smaller dataset of another period (e.g., the previous 2-10 minutes or other suitable period of time), and progressively consolidate network traffic flow data of other periods of time (e.g., day, week, month, year, etc.). By organizing, summarizing, and preprocessing the network traffic flow data, collectors 108 can help network traffic monitoring system 100 scale efficiently. Although collectors 108 are generally referred to herein in the plurality, it will be appreciated that collectors 108 can be implemented using a single machine, especially for smaller datacenters.

In some example embodiments, collectors 108 can receive data from external data sources 106, such as security reports, white-lists (106a), IP watchlists (106b), who is data (106c), or out-of-band data, such as power status, temperature readings, etc.

In some example embodiments, network traffic monitoring system 100 can include a wide bandwidth connection between collectors 108 and analytics module 110. Analytics module 110 can include application dependency (ADM) module 160, reputation module 162, vulnerability module 164, malware detection module 166, etc., to accomplish various tasks with respect to the flow data collected by sensors 104 and stored in collectors 108. In some example embodiments, network traffic monitoring system 100 can automatically determine network topology. Using network traffic flow data captured by sensors 104, network traffic monitoring system 100 can determine the type of devices existing in the network (e.g., brand and model of switches, gateways, machines, etc.), physical locations (e.g., latitude and longitude, building, datacenter, room, row, rack, machine, etc.), interconnection type (e.g., 10 Gb Ethernet, fiber-optic, etc.), and network characteristics (e.g., bandwidth, latency, etc.). Automatically determining the network topology can assist with integration of network traffic monitoring system 100 within an already established datacenter. Furthermore, analytics module 110 can detect changes of network topology without the need of further configuration.

Analytics module 110 can determine dependencies of components within the network using ADM module 160. For example, if component A routinely sends data to component B but component B never sends data to component A, then analytics module 110 can determine that component B is dependent on component A, but A is likely not dependent on component B. If, however, component B also sends data to component A, then they are likely interdependent. These components can be processes, virtual machines, hypervisors, virtual local area networks (VLANs), etc. Once analytics module 110 has determined component dependencies, it can then form a component ("application") dependency map. This map can be instructive when analytics module 110 attempts to determine a root cause of a failure (because failure of one component can cascade and cause failure of its dependent components). This map can also assist analytics module 110 when attempting to predict what will happen if a component is taken offline. Additionally, analytics module 110 can associate edges of an application dependency map with expected latency, bandwidth, etc. for that individual edge.

Analytics module 110 can establish patterns and norms for component behavior. For example, it can determine that certain processes (when functioning normally) will only send a certain amount of traffic to a certain VM using a small set of ports. Analytics module can establish these norms by analyzing individual components or by analyzing data coming from similar components (e.g., VMs with similar configurations). Similarly, analytics module 110 can determine expectations for network operations. For example, it can determine the expected latency between two components, the expected throughput of a component, response times of a component, typical packet sizes, traffic flow signatures, etc. In some example embodiments, analytics module 110 can combine its dependency map with pattern analysis to create reaction expectations. For example, if traffic increases with one component, other components may predictably increase traffic in response (or latency, compute time, etc.).

In some example embodiments, analytics module 110 can use machine learning techniques to identify security threats to a network using malware detection module 166. For example, malware detection module 166 can be provided with examples of network states corresponding to an attack and network states corresponding to normal operation. Malware detection module 166 can then analyze network traffic flow data to recognize when the network is under attack. In some example embodiments, the network can operate within a trusted environment for a time so that analytics module 110 can establish baseline normalcy. In some example embodiments, analytics module 110 can contain a database of norms and expectations for various components. This database can incorporate data from sources external to the network (e.g., external sources 106). Analytics module 110 can then create access policies for how components can interact using policy engine 112. In some example embodiments, policies can be established external to network traffic monitoring system 100 and policy engine 112 can detect the policies and incorporate them into analytics module 110. A network administrator can manually tweak the policies. Policies can dynamically change and be conditional on events. These policies can be enforced by the components depending on a network control scheme implemented by a network. Policy engine 112 can maintain these policies and receive user input to change the policies.

Policy engine 112 can configure analytics module 110 to establish or maintain network policies. For example, policy engine 112 may specify that certain machines should not intercommunicate or that certain ports are restricted. A network and security policy controller (not shown) can set the parameters of policy engine 112. In some example embodiments, policy engine 112 can be accessible via presentation module 116. In some example embodiments, policy engine 112 can include policy data 112. In some example embodiments, policy data 112 can include endpoint group (EPG) data 114, which can include the mapping of EPGs to IP addresses and/or MAC addresses. In some example embodiments, policy data 112 can include policies for handling data packets.

In some example embodiments, analytics module 110 can simulate changes in the network. For example, analytics module 110 can simulate what may result if a machine is taken offline, if a connection is severed, or if a new policy is implemented. This type of simulation can provide a network administrator with greater information on what policies to implement. In some example embodiments, the simulation may serve as a feedback loop for policies. For example, there can be a policy that if certain policies would affect certain services (as predicted by the simulation) those policies should not be implemented. Analytics module 110 can use simulations to discover vulnerabilities in the datacenter. In some example embodiments, analytics module 110 can determine which services and components will be affected by a change in policy. Analytics module 110 can then take necessary actions to prepare those services and components for the change. For example, it can send a notification to administrators of those services and components, it can initiate a migration of the components, it can shut the components down, etc.

In some example embodiments, analytics module 110 can supplement its analysis by initiating synthetic traffic flows and synthetic attacks on the datacenter. These artificial actions can assist analytics module 110 in gathering data to enhance its model. In some example embodiments, these synthetic flows and synthetic attacks are used to verify the integrity of sensors 104, collectors 108, and analytics module 110. Over time, components may occasionally exhibit anomalous behavior. Analytics module 110 can analyze the frequency and severity of the anomalous behavior to determine a reputation score for the component using reputation module 162. Analytics module 110 can use the reputation score of a component to selectively enforce policies. For example, if a component has a high reputation score, the component may be assigned a more permissive policy or more permissive policies; while if the component frequently violates (or attempts to violate) its relevant policy or policies, its reputation score may be lowered and the component may be subject to a stricter policy or stricter policies. Reputation module 162 can correlate observed reputation score with characteristics of a component. For example, a particular virtual machine with a particular configuration may be more prone to misconfiguration and receive a lower reputation score. When a new component is placed in the network, analytics module 110 can assign a starting reputation score similar to the scores of similarly configured components. The expected reputation score for a given component configuration can be sourced outside of the datacenter. A network administrator can be presented with expected reputation scores for various components before installation, thus assisting the network administrator in choosing components and configurations that will result in high reputation scores.

Some anomalous behavior can be indicative of a misconfigured component or a malicious attack. Certain attacks may be easy to detect if they originate outside of the datacenter, but can prove difficult to detect and isolate if they originate from within the datacenter. One such attack could be a distributed denial of service (DDOS) where a component or group of components attempt to overwhelm another component with spurious transmissions and requests. Detecting an attack or other anomalous network traffic can be accomplished by comparing the expected network conditions with actual network conditions. For example, if a traffic flow varies from its historical signature (packet size, transport control protocol header options, etc.) it may be an attack.

In some cases, a traffic flow may be expected to be reported by a sensor, but the sensor may fail to report it. This situation could be an indication that the sensor has failed or become compromised. By comparing the network traffic flow data from multiple sensors 104 spread throughout the datacenter, analytics module 110 can determine if a certain sensor is failing to report a particular traffic flow.

Presentation module 116 can include serving layer 118, authentication module 120, web front end 122, public alert module 124, and third party tools 126. In some example embodiments, presentation module 116 can provide an external interface for network monitoring system 100. Using presentation module 116, a network administrator, external software, etc. can receive data pertaining to network monitoring system 100 via a webpage, application programming interface (API), audiovisual queues, etc. In some example embodiments, presentation module 116 can preprocess and/or summarize data for external presentation. In some example embodiments, presentation module 116 can generate a webpage. As analytics module 110 processes network traffic flow data and generates analytic data, the analytic data may not be in a human-readable form or it may be too large for an administrator to navigate. Presentation module 116 can take the analytic data generated by analytics module 110 and further summarize, filter, and organize the analytic data as well as create intuitive presentations of the analytic data.

Serving layer 118 can be the interface between presentation module 116 and analytics module 110. As analytics module 110 generates reports, predictions, and conclusions, serving layer 118 can summarize, filter, and organize the information that comes from analytics module 110. In some example embodiments, serving layer 118 can also request raw data from a sensor or collector.

Web frontend 122 can connect with serving layer 118 to present the data from serving layer 118 in a webpage. For example, web frontend 122 can present the data in bar charts, core charts, tree maps, acyclic dependency maps, line graphs, tables, etc. Web frontend 122 can be configured to allow a user to "drill down" on information sets to get a filtered data representation specific to the item the user wishes to drill down to. For example, individual traffic flows, components, etc. Web frontend 122 can also be configured to allow a user to filter by search. This search filter can use natural language processing to analyze the user's input. There can be options to view data relative to the current second, minute, hour, day, etc. Web frontend 122 can allow a network administrator to view traffic flows, application dependency maps, network topology, etc.

In some example embodiments, web frontend 122 may be solely configured to present information. In other example embodiments, web frontend 122 can receive inputs from a network administrator to configure network traffic monitoring system 100 or components of the datacenter. These instructions can be passed through serving layer 118 to be sent to configuration and image manager 102 or policy engine 112. Authentication module 120 can verify the identity and privileges of users. In some example embodiments, authentication module 120 can grant network administrators different rights from other users according to established policies.

Public alert module 124 can identify network conditions that satisfy specified criteria and push alerts to third party tools 126. Public alert module 124 can use analytic data generated or accessible through analytics module 110. One example of third party tools 126 is a security information and event management system (SIEM). Third party tools 126 may retrieve information from serving layer 118 through an API and present the information according to the SIEM's user interfaces.

Figure 2:
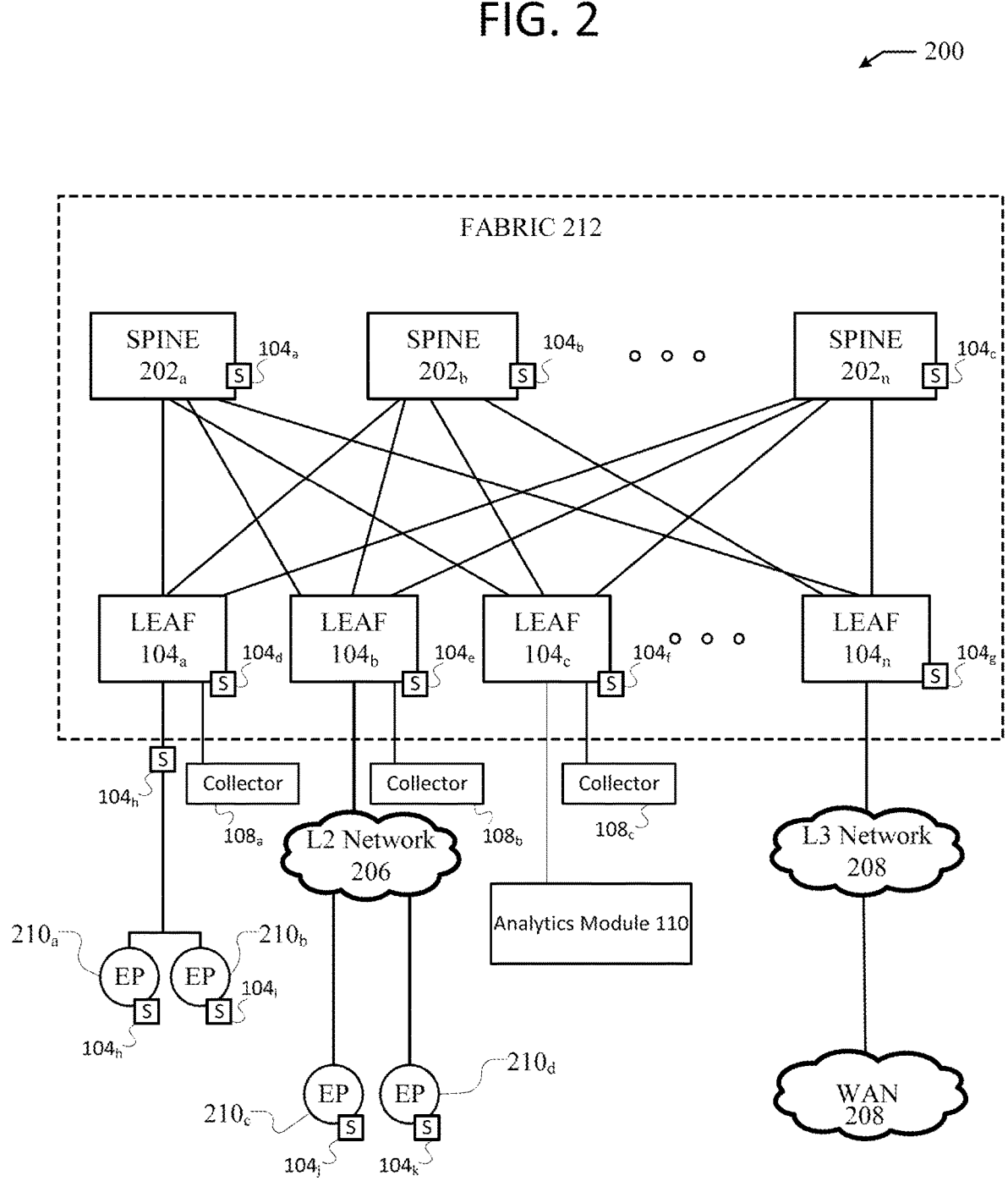
FIG. 2 illustrates an example network environment according to some example embodiments.

FIG. 2 illustrates an example network environment 200 according to some example embodiments. It should be understood that, for the network environment 100 and any environment discussed herein, there can be additional or fewer nodes, devices, links, networks, or components in similar or alternative configurations. Example embodiments with different numbers and/or types of clients, networks, nodes, cloud components, servers, software components, devices, virtual or physical resources, configurations, topologies, services, appliances, deployments, or network devices are also contemplated herein. Further, network environment 200 can include any number or type of resources, which can be accessed and utilized by clients or tenants. The illustrations and examples provided herein are for clarity and simplicity.

Network environment 200 can include network fabric 212, layer 2 (L2) network 206, layer 3 (L3) network 208, endpoints 210a, 210b, . . . , and 210d (collectively, "204").

Network fabric 212 can include spine switches 202a, 202b, . . . , 202n (collectively, "202") connected to leaf switches 204a, 204b, 204c, . . . , 204n (collectively, "204"). Spine switches 202 can connect to leaf switches 204 in network fabric 212. Leaf switches 204 can include access ports (or non-fabric ports) and fabric ports. Fabric ports can provide uplinks to spine switches 202, while access ports can provide connectivity for devices, hosts, endpoints, VMs, or other electronic devices (e.g., endpoints 204), internal networks (e.g., L2 network 206), or external networks (e.g., L3 network 208).

Leaf switches 204 can reside at the edge of network fabric 212, and can thus represent the physical network edge. In some cases, leaf switches 204 can be top-of-rack switches configured according to a top-of-rack architecture. In other cases, leaf switches 204 can be aggregation switches in any particular topology, such as end-of-row or middle-of-row topologies. Leaf switches 204 can also represent aggregation switches, for example.

Network connectivity in network fabric 212 can flow through leaf switches 204. Here, leaf switches 204 can provide servers, resources, VMs, or other electronic devices (e.g., endpoints 210), internal networks (e.g., L2 network 206), or external networks (e.g., L3 network 208), access to network fabric 212, and can connect leaf switches 204 to each other. In some example embodiments, leaf switches 204 can connect endpoint groups (EPGs) to network fabric 212, internal networks (e.g., L2 network 206), and/or any external networks (e.g., L3 network 208). EPGs can be used in network environment 200 for mapping applications to the network. In particular, EPGs can use a grouping of application endpoints in the network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries. For example, each EPG can connect to network fabric 212 via leaf switches 204.

Endpoints 210 can connect to network fabric 212 via leaf switches 204. For example, endpoints 210a and 210b can connect directly to leaf switch 204a, which can connect endpoints 210a and 210b to network fabric 212 and/or any other one of leaf switches 204. Endpoints 210c and 210d can connect to leaf switch 204b via L2 network 206. Endpoints 210c and 210d and L2 network 206 are examples of LANs. LANs can connect nodes over dedicated private communications links located in the same general physical location, such as a building or campus.

Wide area network (WAN) 212 can connect to leaf switches 204c or 204d via L3 network 208. WANs can connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. Endpoints 210 can include any communication device or component, such as a computer, server, hypervisor, virtual machine, container, process (e.g., running on a virtual machine), switch, router, gateway, host, device, external network, etc. In some example embodiments, endpoints 210 can include a server, hypervisor, process, or switch configured with virtual tunnel endpoint (VTEP) functionality which connects an overlay network with network fabric 212. The overlay network may allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), can provide a traffic encapsulation scheme which allows network traffic to be carried across L2 and L3 networks over a logical tunnel. Such logical tunnels can be originated and terminated through VTEPs. The overlay network can host physical devices, such as servers, applications, endpoint groups, virtual segments, virtual workloads, etc. In addition, endpoints 210 can host virtual workload(s), clusters, and applications or services, which can connect with network fabric 212 or any other device or network, including an internal or external network. For example, endpoints 210 can host, or connect to, a cluster of load balancers or an EPG of various applications.

Network environment 200 can also integrate a network traffic monitoring system, such as the one shown in FIG. 1. For example, as shown in FIG. 2, the network traffic monitoring system can include sensors 104a, 104b, . . . , 104n (collectively, "104"), collectors 108a, 108b, . . . 108n (collectively, "108"), and analytics module 110. In some example embodiments, spine switches 202 do not have sensors 104. Analytics module 110 can receive and process network traffic data collected by collectors 108 and detected by sensors 104 placed on nodes located throughout network environment 200. In some example embodiments, analytics module 110 can be implemented in an active-standby model to ensure high availability, with a first analytics module functioning in a primary role and a second analytics module functioning in a secondary role. If the first analytics module fails, the second analytics module can take over control. Although analytics module 110 is shown to be a standalone network appliance in FIG. 2, it will be appreciated that analytics module 110 can also be implemented as a VM image that can be distributed onto a VM, a cluster of VMs, a software as a service (SaaS), or other suitable distribution model in various other example embodiments. In some example embodiments, sensors 104 can run on endpoints 210, leaf switches 204, spine switches 202, in-between network elements (e.g., sensor 104h), etc. In some example embodiments, leaf switches 204 can each have an associated collector 108. For example, if leaf switch 204 is a top of rack switch then each rack can contain an assigned collector 108.

Although network fabric 212 is illustrated and described herein as an example leaf-spine architecture, one of ordinary skill in the art will readily recognize that the subject technology can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. It should be understood that sensors and collectors can be placed throughout the network as appropriate according to various architectures.

Figure 3:
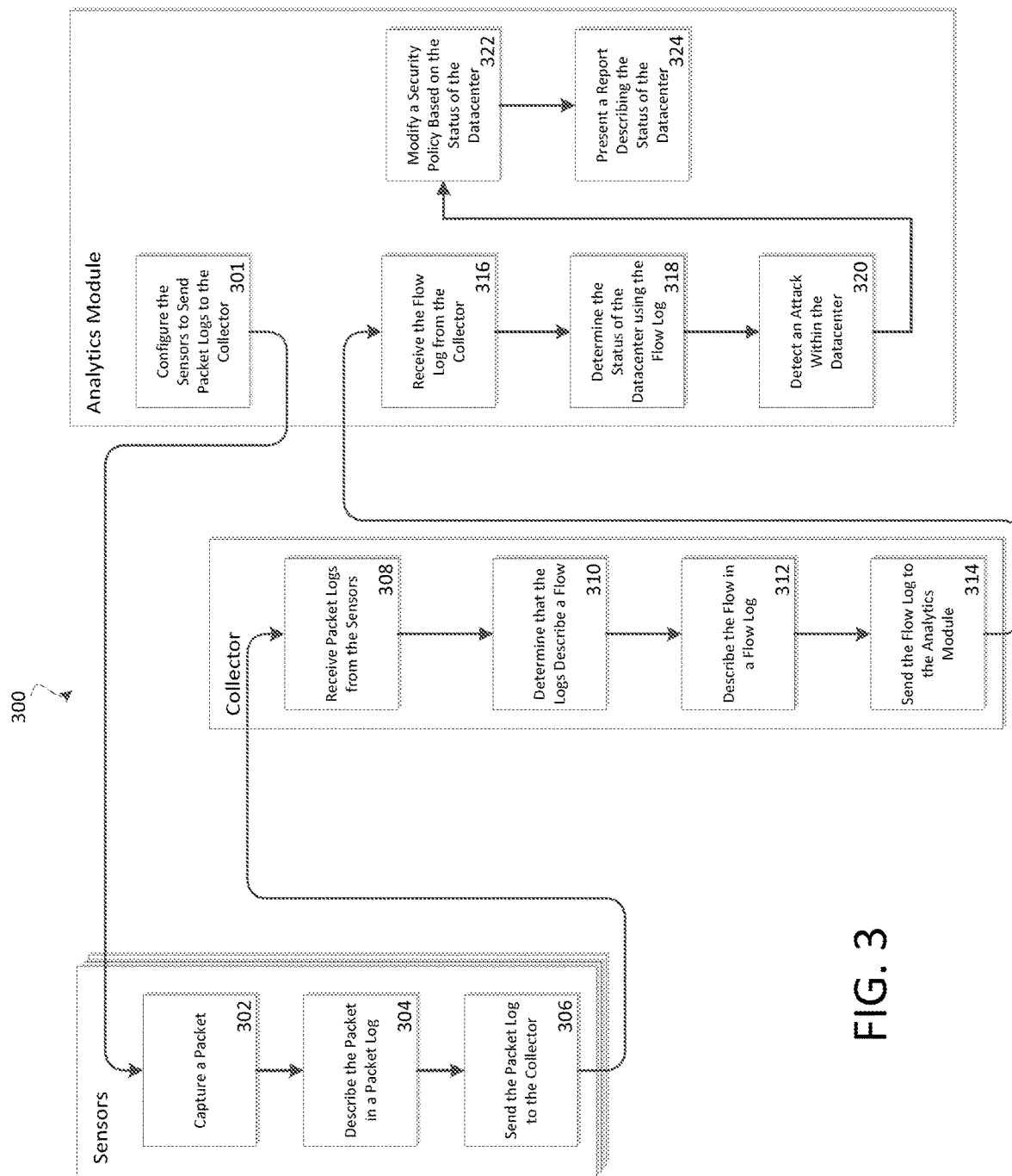
FIG. 3 shows an example method according to some embodiments.

FIG. 3 shows an example method 300 according to some embodiments. Example method 300 example interactions between analytics module 110, sensors 104 and a collector 108. Example method 300 can begin with analytics module configuring the sensors to send packet logs to the collector (step 301). This can include identifying a collector or plurality of collectors and instructing the sensors to send packet logs to the identified collectors based on a predefined rule or formula. Various sensors can be configured differently; for example, one sensor can be configured to send packet logs to one collector and another sensor can be configured to send its packet logs to a different collector. A sensor can then capture a packet (step 302). The sensor can then describe the packet in a packet log (step 304). For example, the packet log can contain the packet, metadata/header info of the packet (e.g., source address, destination address, size, protocol, sequence number, etc.), a summary of the packet (outgoing, incoming, packet type), etc. In some embodiments, a packet log can describe multiple packets, even unrelated packets. In some embodiments, the sensor can capture frames or other network items following the principles related to packets. The sensor can then send the packet log to the collector (step 306). In some embodiments, the sensor sends the packet log to the appropriate collector as configured by the analytics module in step 301. It should be understood that the various sensors in example method 300 can perform steps 302-306 independently and related to different packets, packet logs, and collectors where appropriate.

Although the principles of example method 300 can be applied to a system with only one sensor, it can be preferred to have two or more sensors.

The collector can then receive the packet logs (step 308) sent from multiple sensors, including the packet log described above. The collector can then determine that the log describes a flow (step 310). A flow can be a connection between two endpoints in a datacenter. Step 310 can be achieved by comparing the description of the packets in the packet logs; for example, determining that the source address, destination address, size, sequence number, protocol, timestamps, etc. are similar. The collector can then describe the flow in a flow log (step 312). This flow log can identify a source and destination host (e.g., address, name, location, etc.), a protocol, a time period, bandwidth utilized, etc. The collector can then send the flow log to the analytics module (step 314).

The analytics module can then receive the flow log from the collector (step 316) and determine the status of the datacenter using the flow log (step 318). In some embodiments, step 318 utilizes other flow logs from the above referenced collector in addition to flow logs from other collectors in the datacenter. In some embodiments, step 318 includes: creating summary statistics related to the datacenter, identifying components or hosts that are at capacity, identifying components or hosts that are under-utilized or incapacitated, comparing current activity to historical or expected activity, etc. The analytics module can then detect an attack within the datacenter (step 320). An attack can include a misconfigured component that disrupts datacenter operations. In some embodiments, step 320 is informed by the status of the datacenter and the flow log(s) received from collector(s). The analytics module can then modify a security policy based on the status of the datacenter (step 322). For example, the analytics module can modify an access control list, a firewall, subnet assignments, etc. The analytics module can then present a report describing the status of the datacenter (step 324), e.g., to an administrator. Step 324 can include creating charts, graphs, illustrations, tables, notifications, etc. and presenting such aforementioned report via a web-interface, message (e.g., email, SMS, instant message, etc.), other audio-visual means, application program interface, etc. to a user, administrator, customer, client, program, etc.

In some embodiments, example method 300 can be performed by a network monitoring system 100 within a datacenter, wherein the datacenter is protected from a wide area network by a firewall.

Example Devices

Figure 4A:
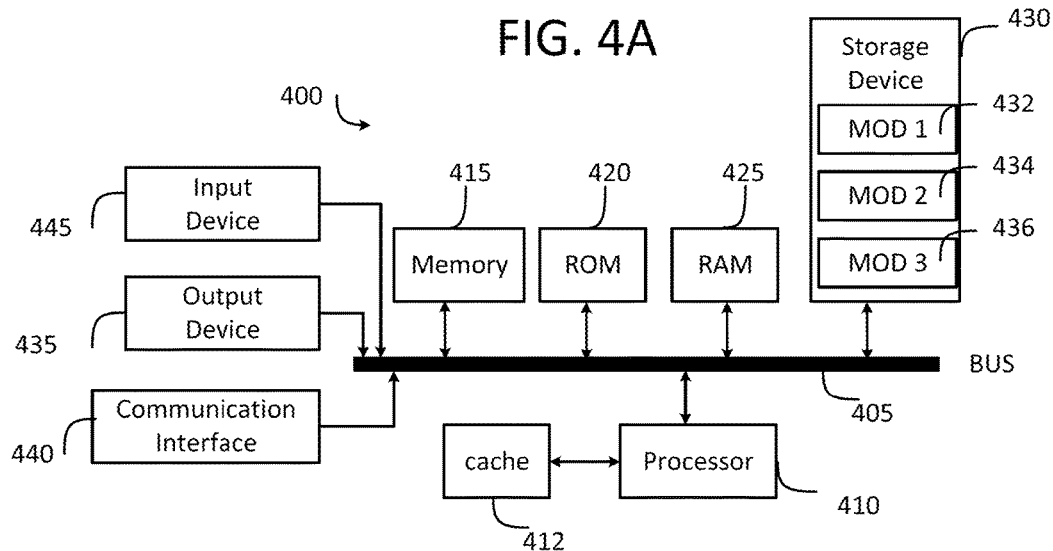
FIGS. 4A and 4B illustrate example system embodiments.
Figure 4B:
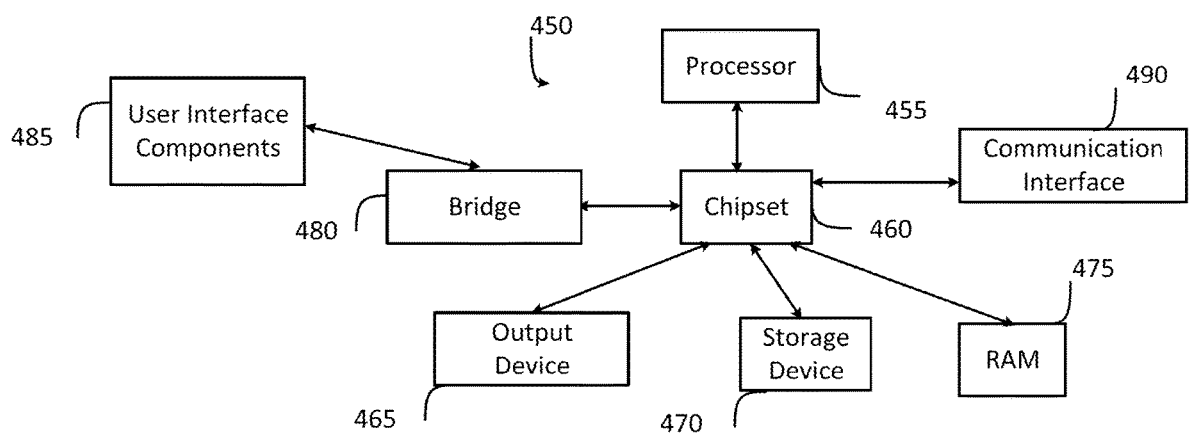

FIG. 4A and FIG. 4B illustrate example system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 470 and random access memory (RAM) 475, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 437, module 7 434, and module 3 436 stored in storage device 430, configured to control the processor 910 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 475, read only memory (ROM) 470, and hybrids thereof.

The storage device 430 can include software modules 437, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates an example computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

Automatic Download and Launch New Software Version on a Sensor of a Computing Network
Summary Each software package installed on a sensor of a computing node can contain a real software packet and a control engine. The control engine can be configured to operate on various operating systems and communicate with an upgrade server to control installation, launch, or uninstallation of the software packet on a corresponding sensor.
Detailed Description Each software package installed on a sensor of a computing node can contain a real software packet and a control engine. The control engine can be configured to operate on various operating systems and communicate with an upgrade server to control installation, launch, or uninstallation of the software packet on a corresponding sensor.

The control engine can track software version installed on the corresponding sensor. In response to a newer version of the software packet becoming available, the control engine can download and launch the new version of the software. If the newer version is running stably over a period of time, the control engine can complete the upgrade of the software and remove the older version on the corresponding sensor. If the new version is not running stably or having some issues, the control engine can uninstall the newer version, restore the old version of the software on the corresponding sensor, and report the issues to the upgrade server.

In some embodiments, based upon feedback from sensors in a computing network, an upgrade server can authorize or reject upgrade requests from control engines of similar sensors in the network. Further, the upgrade server may determine root causes of software issues on a sensor based upon feedbacks from similar sensors.

In some embodiments, an upgrade server can determine suitable software to be installed on each sensor of a computing network. The upgrade server can also keep an identification of each sensor in the computing network, together with software and its corresponding version on a corresponding sensor.

In some embodiments, a control engine can verify authentication of software to be uploaded onto a corresponding sensor. A newer version of the software can be uploaded only if it is authenticated by the control engine. For example, the control engine can keep a security key of corresponding software and use the security key to verify different versions of the software.

Sensor Upgrade Path—Detect Non Critical Time
Summary

The present technology provides a control engine on each node of a computing network to automatically download a new version of software installed on a corresponding node. The control engine can be configured to detect traffic in and out of a corresponding node, and system status of the node, and determine non-critical time on the corresponding node to launch downloaded software version.
Detailed Description The present technology provides a control engine on each node of a computing network to automatically download a new version of software installed on a corresponding node. The control engine can be configured detect traffic in and out of a corresponding node, and system status of the node, and determine non-critical time on the corresponding node to launch downloaded software version.

In some embodiments, in response to a new version of software becoming available on an upgrade server of a computing network, control engines or sensors of the computing network can determine non-critical time to launch the new version of software on their corresponding nodes. Control engines or sensors of the computing network may communicate with each other to take turns to launch the new software version such that a threshold number of sensors are active to detect any abnormal activities and a threshold number of nodes are active to support traffics or loading of the computing network.

Aggregation of Data Flows
Summary

Packets pass through various nodes as they travel from a host to a client machine; in order to get an accurate understanding of the traffic flow, it is helpful to monitor traffic at various nodes in the network. This setup can be effective at finding problems, but it can generate a large amount of data, much of which may be duplicative. For example, reports from a host, hypervisor, switch and router may all include a record of an individual packet as it moves through the network. These reports would likely include records of the response moving back again through the network. It can be beneficial to select an optimal report and discard the rest.

Detailed Description

The first node in the flow can be considered the optimal report to save. Because the some nodes may not be efficient at monitoring traffic that passes through it, another node may be selected as the optimal node. For example, a virtual machine may not be as efficient as an ASIC on a switch at recording these data flows. An alternative approach can include a system that takes a small sampling of reports from various nodes and select the reports that include the most "packets seen." In other words, records from a node that has seen the most traffic from a specific host can be preserved. The system can initially capture all reports of traffic flows and then discard duplicate reports.

Detecting Sensor Type

Summary

In some embodiments, it can be important to be able to detect the characteristics and context of each sensor as this information can be used as part of the analytics. For example, when analyzing and collecting data from a sensor, it would be very helpful to know if the sensor resides in a VM, hypervisor, or switch, and what OS and environment is running on the sensor's system.

Detecting sensor type can provide essential information that drives the traffic monitoring system. For example, the sensors in the VMs, hypervisors, and switches provide important analytics for the network. Elements of this disclosure can help us better understand the analytics data collected by the sensors. This information can be used for security, planning, deployment, determining dependencies, and troubleshooting.

Detailed Description

The current disclosure can be used to identify the characteristics and context of each sensor within the traffic monitoring system. Specifically, this disclosure can be used to determine whether a sensor resides in a VM, hypervisor, or switch, and which OS or environment is running on the system where the sensor resides.

For example, a sensor can monitor and analyze the system where the sensor resides and any traffic associated with that system in order to determine whether the sensor is in a VM or hypervisor, and identify the underlying environment (e.g., OS). By determining whether the sensor is in a VM or hypervisor, we can make various types of inferences about the traffic collected and monitored by the sensor as well as the statistics and activity at each hop. This information can also help us identify the structure or topology of the network, the communication path of traffic, and the security conditions of the network. Thus, this disclosure provides very important information that drives the traffic monitoring system.

Auto Update of Configuration in Sensors

Summary

The present disclosure provides a centralized mechanism which tracks collector information, such as status, location, and collector-to-sensor mappings, as well as sensor information, such as location of specific sensors, and updates the configuration settings of sensors as necessary to maintain accurate and up-to-date collector-to-sensor mappings.

This disclosure can detect current collector and sensor status, conditions, and updates to dynamically update and maintain proper collector-to-sensor mappings from a centralized location. This disclosure can thus provide a feasible solution for ensuring that collectors and sensors are always functioning properly.

Detailed Description

Sensors need to have certain configuration settings to run in the traffic monitoring system, such as where their corresponding collectors are located. Elements of this disclosure can provide a centralized mechanism which tracks collector information, such as status, location, and collector-to-sensor mappings, as well as sensor information, such as location of specific sensors, and updates the configuration settings of sensors as necessary to maintain accurate and up-to-date collector-to-sensor mappings. For example, if a sensor is configured to send traffic data to a specific collector and that collector goes down, the centralized system can detect that the collector is down and the sensor needs updated configuration settings. The centralized system can then determine which collector should be assigned to that sensor, and dynamically update the configuration settings of the sensor to point the sensor to the new collector. In this way, the centralized system can maintain the accuracy of the configuration settings of the sensors and ensure that the sensors are always connected to a collector even when an assigned collector goes down or the sensor otherwise experiences problems contacting its assigned collector.

To identify if there are changes on collectors, we run analytics on the collectors. The analytics can help identify which collectors are functioning and which are non-functioning. The analytics are based on data pushed from the collectors to a monitoring system, which can be the centralized system. In some cases, the trigger to switch from a collector to another collector can be based on health, where health can include memory usage, CPU utilization, bandwidth, or errors. In mapping collectors to sensors, the centralized system can use the analytics to load balance collectors.

Detecting Virtual Switching Devices and Forwarding Models Used by Hypervisors

Summary

In some embodiments, a hypervisor may host multiple VMs which can communicate with each other and the Internet. The hypervisor will also include virtual switching devices. The virtual switching devices send and transmit the data between VMs and the Internet. When handling or forwarding packets, the virtual switching devices typically use different forwarding models depending on the type of virtual switching device, such as Linux bridge, Open vSwitch, vNic, or other software switch. It is important to understand what type of switching device and forwarding model is used by a hypervisor in order to optimize connections and properly attach VMs to the virtual switching device.

Elements of this disclosure can provide a mechanism for identifying the type of virtual switching devices and forwarding models used by hypervisors and VMs in the traffic monitoring system.

By identifying the type of virtual switching device used by the hypervisor and VMs, the sensor can determine the forwarding model used by the particular virtual switching device(s). This information can be used to determine how a component such as a VM should attach to the virtual switching device(s). Thus, the device type information can help optimize the connections between VMs, hypervisors, and virtual switching devices. In addition, by knowing the forwarding model used by a virtual switching device, the sensors and collectors in the traffic monitoring system can determine how to collect data and which data to collect or ignore. This can be determined based on known behavior of a particular forwarding model.

Detailed Description

The current disclosure provides sensors on the hypervisors in the traffic monitoring system, which can capture and analyze packets to and from the virtual switching devices on the hypervisors. The data extracted from the captured packets can be used to determine what type of virtual switching device(s) are used by the hypervisors. For example, a sensor in a hypervisor can analyze traffic to determine if a virtual switching device used by the hypervisor is a Linux bridge, an open vSwitch, or a vNic. By identifying the type of virtual switching device used by the hypervisor and VMs, the sensor can determine the forwarding model used by the particular virtual switching device(s). This information can then be used to determine how a component such as a VM should attach to the virtual switching device(s). Thus, the device type information can help optimize the connections between VMs, hypervisors, and virtual switching devices. In addition, by knowing the forwarding model used by a virtual switching device, which can be ascertained from the device type, the sensors and collectors can determine how to collect data and which data to collect or ignore. For example, by knowing the forwarding model of the virtual switching device, the sensor can ensure that it does not collect redundant data as it can determine what data may be redundant based on the known behavior of the virtual switching device(s) identified from the forwarding model.

Self Policing of Resources Used by Sensors in Vms and Hypervisors

Summary

The traffic monitoring system can implement sensors in the VMs, hypervisors, and switches in the ACI in order to perform analytics and collect information for troubleshooting, planning, deployment, and security. As the amount of traffic seen by the sensors grows and events such as errors or even potential attacks occur, the sensors can begin to consume more resources, such as bandwidth, memory, CPU utilization, network traffic, etc. However, it is important to monitor and manage the amount of resources used by the sensors to ensure that the sensors themselves do not become a bottleneck or negatively impact the system's or network's performance.

Elements of this disclosure can allow sensors to track and monitor themselves inside of the system (i.e., the hypervisor or VM) to identify activity and resource usage. The sensors can detect high resource usage and take corrective actions. The sensors can be designed with a core layer running the sensor logic and an outer shell running the monitoring logic.

The implementation of sensors in VMs, hypervisors, and switches can be very useful for analytics, management, and troubleshooting. The self-monitoring mechanism allows the sensors to run properly and efficiently and avoid creating unnecessary burdens on the network and systems.

Detailed Description

Elements of this disclosure can allow sensors to track and monitor themselves inside of the system (i.e., the hypervisor or VM). The sensors can continuously monitor themselves. In some cases, the sensors can perform synchronistic monitoring. Moreover, the sensor can track its usage of resources, such as bandwidth, memory, CPU utilization, network traffic, etc. The sensor can then detect resource usage above a particular threshold, which can be predetermined or configured, and take corrective actions or develop a plan. Thresholds can be based on rules which can be specific for a context, service, device, or performance requirement. In some cases, the sensor can relaunch itself if resource usage is above a threshold, as a mechanism of corrective action.

To implement this self-monitoring concept, the sensors can have a particular architecture with two layers. The first layer can be a core layer which corresponds to the sensor's logic. The second layer can correspond to an outer layer which contains the logic for performing the self-monitoring and policing.

In some embodiments, detected resource usage over a threshold can also be used to identify potential issues or threats in the system or network. For example, collected resource usage statistics of a sensor can identify normal or expected consumption of the sensor. If the sensor detects a large spike in the amount of resources used by a sensor, this abnormal resource consumption can be used to detect a threat or attach, such as a DDoS attack, as the number of hits and consequently the number of used resources would be expected to spike significantly during an attack.

Further, the actions taken by a sensor can be based on the amount of resource usage detected, the type of resource usage or pattern, prior resource usage information, predefined rules, a current context, and other factors. The actions can include rebooting or relaunching the sensor, turning off the sensor, sensing an alert, limiting usage of the sensor, or turning off or systems, components, services, or even network segments.

The conditions detected by the self-monitoring of the sensors can also be used to guide what information should be reported by a sensor. For example, if the amount of resources used by a sensor are determined to be excessive, the sensor can then be instructed to limit the amount of information it reports to lower its consumption of resources through the reporting process.

Dealing with Compromised Sensors in Vms and Hypervisors

Summary

Elements of this disclosure can allow for detection of compromised sensors in VMs and hypervisors in a tenant space, and provides various mechanisms of correction for the compromised sensors. The data from the compromised sensors can be manipulated to limit the impact on the network and infer additional attacks or threats on other devices.

Elements of this disclosure can provide a mechanism for quick and accurate detection and correction of compromised sensors in VMs and hypervisors. This provides numerous performance and security advantages when running sensors for analytics.

Detailed Description

Elements of this disclosure can allow for detection and correction of compromised sensors in the VMs and hypervisors. Below we describe the detection aspect of this disclosure, followed by corrective actions.

Detection:

Detection can be performed using two checkpoints. The first checkpoint can be based on the data reported to the collector by the sensors. For example, the collector can collect historical statistics and usage information to determine what amount of usage and what types of behaviors are considered normal. Accordingly, as the collector receives data from the sensors, it can compare the reported data with previous data to determine if there is abnormal activity or behavior. For example, based on data and statistics reported by sensors to the collector, the collector can determine one thousand hits to a mysql database associated with a sensor is the average or expected amount of activity reported by the sensor. If the sensor suddenly reports a million hits to the mysql database, the collector can determine that this amount of activity is abnormal, which would raise a flag at the first checkpoint.

The second checkpoint can be a comparison of data reported by the sensor in the hypervisor with data reported by the sensor in the hardware switch. For example, if the sensor in the hypervisor reports one million hits to the mysql database, then the sensor on the hardware switch should also report one million hits. Thus, if the sensor on the hardware switch otherwise reports a significantly different amount of hits, such as one thousand hits, then the collector can infer that this discrepancy is a result of the sensor in the hypervisor being compromised.

The first and second checkpoints can be used together as multiple layers of detection to verify or confirm suspicious activity. However, in some cases, the disclosure can limit the detection to one checkpoint or detection mechanism, which can be selected based on a context, rule, or needs and requirements.

Corrective Actions:

When a sensor is identified as being compromised, the flows from the sensor can be annotated to indicate such data is not reliable. The annotation can ensure that the collector does not rely on the data and statistics from the compromised sensor, or otherwise performs a verification procedure.

In addition, when a sensor is compromised, the data from the sensor can be aggregated or summarized and the amount of data retained can be limited.

Moreover, when a sensor is compromised, the snapshots or time frames of data reported by the sensor can be modified. For example, the time frames can be increased so the compromised sensor is forced to report data at larger intervals. This can reduce the amount of data reported and collected, and the amount of bandwidth and resources used by the compromised sensor in reporting data. In some cases, the reporting of data by a compromised sensor can be stopped altogether for a period of time or indefinitely until the sensor is fixed. The larger time frames or snapshots can also ensure that the amount of data from the compromised sensor is less granular to reduce unnecessary or false/incorrect data reported by the compromised sensor and collected by the collector.

The data from a compromised sensor can also be analyzed to infer additional statistics or details. For example, by detecting that a sensor is compromised, the system can also infer that other sensors in the tenant space are also compromised. This can be based on the structure of the tenant space, the topology, and the relationships between sensors, for example. Moreover, the data from the compromised sensor can be analyzed to determine a state or condition of the compromised sensor and system, and other sensors or systems.

In some cases, corrective actions can be taken when either a sensor is detected as being compromised and/or when a server is compromised. To protect the pipeline, the sensors can be instructed to stop reporting flows or limit the amount of flows reported. The collector can also be instructed to start dropping or shedding loads or data from the compromised sensors, and protect the devices that sit behind the collector.

Collector High Availability

Summary

Sensors can send their data to a primary collector and a secondary collector, both of which collect and report the data from the sensors at all times. A centralized system can receive the data from the primary and secondary collectors and identify any duplicates in order to de-duplicate the data before sending it to the pipeline.

The current disclosure ensures that data is not lost during a transition of roles between primary and secondary collectors.

Detailed Description

For every flow, there can be a primary collector and a secondary collector. Every sensor sends the same data to two different collectors, a primary collector and a secondary collector. The different collectors can then send the data from the sensors to a centralized location which runs a de-duplicator that knows what data to keep and what data to ignore. The centralized location can then send the de-duplicated data to the pipeline for collection and analytics.

For example, a sensor can be instructed to send its data to a primary collector and a secondary collector. Some of this data will inherently be duplicate data. However, by sending the data to both a primary collector and a secondary collector, the sensor can ensure that its data is collected even in the case that a collector experiences a problem or fails to receive data from the sensor. Both collectors then report the data from the sensor to the centralized location. Accordingly, the centralized location is guaranteed to receive the data from the sensor even if one of the collectors experiences problems or fail to receive data from the sensor as previously noted. The centralized location can then deduplicate the data to remove any duplicate data reported from the primary and secondary collectors to ensure that unnecessary data is not ultimately reported to the pipeline.

To deduplicate the data, the centralized system can analyze the data it receives from the primary and secondary collectors to identify the respective sensors, flow IDs, and collectors associated with each received flow. The centralized system can compare the received flows, including the respective sensor, flow, and collector IDs of the received flows as well as the timestamps, to determine which flow it should keep. Any duplicate or redundant data can then be discarded by the centralized system. The deduplicated data can then be pushed to the pipeline for collection and analysis.

This mechanism can ensure that data is not lost if a collector goes down for any period of time or fails to receive data from a sensor. For example, in cases where high availability is performed using heartbeats or a zookeeper, data can be lost at specific time frames (albeit often small) between the time the active device experiences a problem and the inactive device takes over. On the other hand, this mechanism ensures that data is not lost when a collector experiences a problem because both collectors collect and report the sensor data at all times. The duplicate or redundant data can then be deduplicated by the centralized system.

The distribution of collectors to flows can be determined using a table with rows containing hash values calculated by applying a hash function to a flow key. Thus, each row is assigned a row in the table, and collectors are then assigned to each cell and row.

Identifying Bogon Address Spaces

Summary

Bogons are bogus IP addresses in a computer network. Bogons are also packets that claim to be from an IP space that is not reserved.

This disclosure can implement a crawler to listen to BGP route advertisements in the network to build a map of address spaces used in the network. The map of addresses spaces is pushed to collectors which collect data sensed from distributed sensors within the VMs, hypervisors, and switches on the network. The collects can use the mapping to identify and mark bogon flows as bogon.

This disclosure can provide an automated, dynamic, and intelligent mechanism for mapping address spaces in the network, identifying bogon address spaces, and detecting bogon packets.

Detailed Description his disclosure can utilize a crawler that contacts the BGP routers and serve as BGP listeners to identify all the addresses being addressed in the network. The crawler listens to BGP route advertisements and builds a map of the address spaces in the network. The bogon addresses are then identified based on the mapping of address spaces by combining the addresses identified in the BGP route advertisements and treating any addresses outside of the mapped addresses and ranges as bogon addresses.

The address mapping information is transmitted to collectors in the network. The collectors use the received mapping information to identify any bogon flows received from sensors in the VMs and hypervisors and mark such flows as bogon flows. The bogon flows can get discarded or ignored and any future bogon flows with similar characteristics (addresses or address spaces) can also be filtered or ignored.

The collectors in this context can be servers configured to receive data from sensors placed within VMs, hypervisors, and switches in the network. The sensors capture packets from their associated devices and report the captured packets to their assigned collector(s). This way, the collectors can collect and gather packets from the various, distributed components in the network, which can be used for analytics by an analytics engine, for example. See attached documents for further details about the sensor-collector topology used here.

Hierarchical Sharding of Flows from Sensors to Collectors

Summary

The data from a flow of two or more sensors assigned to different shards/collectors will be fragmented as different portions of the flow are received by different collectors. Accordingly, the collectors do not receive the complete flow from the multiple sensors.

This disclosure can perform hierarchical sharding of sensors to collectors for scaling by using at least two layers of sharding to ensure that flows captured by different sensors in a communication are mapped to the same layer 2 collector regardless of which two sensors are involved in the communication.

This disclosure can provide scaling without fragmenting flow data from different sensors in a communication. This can allow for accurate and efficient scaling of sensors to collectors without fragmenting flow data in scenarios where sensors involved in a communication are assigned to different collectors/shards.

Detailed Description

The hierarchical sharding can be performed in at least two layers.

Layer 1—This layer maps sensors to shards and collectors. This is done by sharding a large number of sensors to assign those sensors to a specific shard which can include a number of assigned collectors. For example, ten thousand sensors can be assigned to one shard. The shard for those ten thousand sensors can be assigned five collectors. A sensor from that shard can then select a specific collector from the five collectors to send its flow to by hashing a flow key.

Since the sensors involved in a communication can vary, some communications may involve sensors which are assigned to different shards. Thus, each of the sensors will send the data for that flow to different collectors. Accordingly, each collector will only receive a portion of that flow. We resolve this issue by creating a second layer of sharding as described below. When a collector receives a flow from a sensor, it can determine if it has also received the other end of that flow (e.g., the flow from the other sensor in the communication). If the collector has not received the other end of that flow, it can determine that the other sensor is assigned to a different shard. This can trigger the collector to send the flow from that sensor to a different collector on a layer 2 shard as below.

Layer 2—Here we assign another group of collectors to a second layer shard. Each collector can be assigned the same flow key and hash. Accordingly, a collector from a second layer shard will receive all of the data from the same flow. Thus, if a collector from layer 1 receives a flow and determines that it has not received the other end of the flow, it can then send that flow to the second layer collector assigned to the flow key and hash corresponding to that flow. The second layer collector will also receive the other end of that flow from the other layer one collector. This way, the second layer collector will be set to receive the complete flow from the layer one collectors. The second layer collector can then aggregate the data related to that flow.

Data Aggregator at Collector

Summary

Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

In this context, sensors can capture very large amounts of packets and data which may be hard to scale particularly in larger data centers. Moreover, sensors on hardware switches typically send data at very frequent intervals and very granular levels because of the limited memory capabilities at the hardware switch make it difficult to store larger snapshots or intervals of data. Accordingly, while the sensors on the hardware switches, and often other devices such as VMs and hypervisors, must capture and send data at frequent intervals and granular levels, it is extremely difficult to manage and scale this level and amount of information from the sensors. Therefore, it is necessary to implement a mechanism to help scale and manage this information.

This disclosure allows the collector to dynamically adjust the granularity of different subsets of data for improved scalability while maintaining accuracy. Here, some subsets of data can be maintained as an exact record of events, while other subsets can be aggregated, summarized, and/or sampled.

Detect environment of sensor placement automatically from analyzing captured network data. Detect relative placement of sensors automatically from analyzing captured network data by the sensor.

Elements of this disclosure can allow for management of large volumes of data by limiting the data collected and maintain in a manner where accuracy is not lost or impacted. Thus, this disclosure provides improved scalability while maintaining accuracy. This can be a very valuable benefit for handling large volumes of data particularly in larger data centers. No need to manually update sensor placement information. No need to integrate with and have environment specific integration with hypervisor management software to detect that new VMs have come up or that a VM has moved. Network hardware placement change can be tracked automatically. Sensor placement can be used for differential analysis in diagnosing missing packets, and malware flows.

This disclosure can be very valuable for handling large volumes of data while maintaining accuracy. This disclosure can be an important component for analytics in data centers.
Detailed Description In this disclosure, the collector identifies different subsets of data reported from sensors, and performs aggregation, sampling, summarizing, and exact reporting on the different subsets of the data based on characteristics of each of the subsets.

For example, the collector can identify a subset of data reported from the sensors that requires a high level of granularity. This subset can be the flow features, such as number of packets, packet count, byte counts, random packet number, etc. Since this subset of data requires high levels of granularity, the collector can maintain and collect the exact data as captured. The remaining subset of the data from the sensors requires a lower level of granularity and can be aggregated and summarized or sampled to avoid having to maintain the full set of data.

Thus, for example, if we receive 8 signals with flow features and 100 other signals, we can maintain the flow features from the 8 signals and for the 100 other signals, we can aggregate and summarize the data.

Accordingly, this disclosure allows the collector to dynamically adjust the granularity of different subsets of data for improved scalability while maintaining accuracy. Here, some subsets of data can be maintained as an exact record of events, while other subsets can be aggregated, summarized, and/or sampled.

The dynamic adjustment of granularity allows the collector to zoom in or zoom out on data as necessary. For example, if we want to observe additional details about a specific subset of data, the granularity of the collection and reporting of that data can be adjusted to provide increased details. Once the added granularity is no longer necessary, the collection and reporting for that specific subset can be dynamically re-adjusted to provide fewer details.
Description Processes or agents that run on a system to capture network data are referred to as capturing agents or simply "Sensors" in this document. Such sensors have ability to report metadata about the packets that is observed or report a subset of captured network data to a collection and aggregation entity that may be running on a different or same system. Apart from network data, the sensor may also capture additional information about the system it is running on. The additional data can consist of, but is not limited to data or metadata of active or previously active processes of the system along with metadata of files that are present on the system. The collection entity could be a single or a cluster of processes. A single collection entity or process is referred to as Collector in this document.

Sensors or network capture agents could be present and running inside multiple environments. We list three such possible environments— a. As a process or kernel module or kernel driver on a guest Operating System installed in a Virtual machine.

b. As a process or kernel module or kernel driver on the host operating system installed at the hypervisor layer.

c. As a process or a component in a physical network gear that is capable of routing or switching. The network gear could provide a way to install such an agent, or the network gear itself could act as such an agent. The network gear or its component would have to export metadata about the packets or flows it observed, to a Collector.

In each of the above scenarios where a sensor can be placed, the sensor has the ability to observe all packets that flow through the system, and it can talk to the Collector using an IP address. In a datacenter or a large deployment, there can be millions of Sensors running and reporting network information to Collector. Collector can perform a number of processing activities on the reported data ranging from network diagnostics to security related applications. Having the knowledge of whether the reported sensor data was from a sensor deployed inside a VM or from a sensor deployed inside Hypervisor or from a sensor deployed inside a networking gear is very important for a number of algorithms that do processing on the gathered data. The use cases of the algorithms will not be discussed in this disclosure.

The network data observed by a sensor A inside a VM is a subset of the network data observed by a sensor B inside the hypervisor on which the VM is running. Further, the network data observed by a sensor B running inside a Hypervisor is again a subset of the network data observed by a sensor C running either inside or as part of the networking gear to which the hypervisor or the physical machine is connected to. The relationship information about whether sensor B in placed in a hypervisor which contains the VM where sensor A is placed, is very important for a lot of algorithms that do analysis on the captured data. This relationship about sensor placement can be constructed manually by a person who has deployed the sensors. It might be possible to query the hypervisor environment using hypervisor specific APIs, and management interfaces provided by various hypervisor environments like Xen, Vmware, KVM, etc.

All sensors send information about the network traffic they have observed. This information is sent to Collector. Sensor knows the IP address and port number used to send information to the collector. All sensors periodically sends information about each and every flow they have observed to the Collector. The information sent contains a list of flows that were active between the current time and the time at which the last information was sent to the collector. The communication channel between the sensor and the collector also creates a flow in every interval. Let us denote this flow as CF or control flow. The information sent by a sensor will also contain information about the Control Flow since its also a valid flow in the system.

The following setup is for purpose of explanation—

1. Sensor S1 is deployed in a VM that is running inside a Hypervisor. IP address of the VM is IP1.

2. Sensor S2 is deployed in the hypervisor mentioned in 1 above. IP address of the hypervisor is IP2 which is different from IP1.

3. Sensor S3 is deployed in or as part of the physical network switch or NIC. The IP address of the switch is IP3. This network switch is placed such that all network traffic coming out and going into the Hypervisor mentioned in 2, go through this switch.

Based on above placement of sensors, the following holds true—

1. All flows seen and reported by S1 will also be seen and reported by S2.

2. All flows seen and reported by S2 will also be seen and reported by S3.

Thus, 1. flow F1 that is generated inside the VM and seen by S1, will be reported by S1, S2, S3 to collector. So, the control flow denoting the communication between S1 and collector will be seen and reported by S1, S2, S3 to Collector.

2. flow F2 generated inside the hypervisor will be seen and reported by S2, and S3 but not S1. So the control flow denoting the communication between S2 and Collector will be seen and reported by S2 and S3 to Collector.

3. flow F3 generated by switch will be seen only by the switch itself and reported to Collector by F3 alone.

At Collector, after collecting information from all sensors, we will have the following relation—

1. F1 reported by S1, S2, S3

2. F2 reported by S2, S3

3. F3 reported by S3.

Here is the algorithm that determined the relationship of one sensor to others.

1. For each flow emit get the list the sensors reporting it. Call this list L. List L contains sensor ids of all sensors that reported the flow.

2. For every id 'Si' in list L, do the following— a. emit a Tuple—{Si, Set of all sensors in L except Si}

3. Collect all the tuples at the end of Step 2.

4. For every sensor with id Si do the following— a. Get a list of all tuples where Si is the first element.

b. Take a intersection of the sets that are second element in the tuples gathered above. Call this intersection set 'Front sensors'. It represents the list of sensors that can see all flows that sensor Si can see. In our example, for S1, the set of Front sensors will be {S2, S3}.

c. Take a union of the sets that are second element in the tuples generated in Step a. Compute the difference between the union set and the intersection set. Call this 'Difference set' as the 'Rear sensors'. It represents the list sensors whose all flows can be seen by sensor Si. In our example, for S1, the set of Rear sensors will be empty set. For S2, the set of Rear sensors is {S1}

Using the above algorithm Collector or any process that analyzes the flow metadata exported by the sensors can determine the relation placement of a sensor with respect to each other.

Detecting a Compromised Collector

Summary

A configuration server can expect specific reports from each data collector mixed in with regular reports. If the specific report is not recorded by a data collector, then that data collector may be compromised.

Detailed Description

In a traffic monitoring system, sensors typically need to report their data to one data collector. If a collector becomes compromised with malicious software, it may incorrectly report traffic in order to hide or mask malicious traffic.

A technique to overcome this would be for sensors to periodically transmit synthetic traffic reports. One technique involves sending these synthetic reports to multiple data collectors. When the system analyses traffic reports on various collectors, it can look for the synthetic traffic and, if one data collector fails to report the synthetic traffic, the system can question the integrity of that data collector. The system can look at the data from other collectors as a way to know that synthetic data should be expected. For example, if two collectors report a traffic flow, but a third does not (but is expected to) then that collector may have been compromised. In another technique, a sensor is assigned to report to one data collector and periodically the sensor will duplicate its report and send it to a second data collector. The duplicate report can be flagged so that the configuration server can look into the reports passing through the first data collector to see if it correctly recorded the duplicated report.

Alternatively, a configuration server can direct a sensor to send synthetic data. The system can then verify that the collectors correctly report receiving the traffic flow.

A simple, but less secure approach, could be for the sensor to periodically send a heartbeat comprising synthetic data. If the data collector fails to report the heartbeat data, the configuration server can question the integrity of that data collector.

The synthetic data can comprise random values or be a function of: sensor ID, VM ID, time stamp, etc.

Detecting Compromised Sensors

Summary

If a collector is compromised, the data maintained by such collector can be compromised and the collector can even compromise the network.

Elements of this disclosure can collect data reported by a sensor at multiple collectors and compares the data then reported by the multiple collectors to determine if any of the collectors is compromised. To account for scenarios where a collector has modified the granularity of data, we can use more than two collectors to perform the comparison and make a determination based on a majority or some subset of the collectors.

This disclosure can be used to automatically identify compromised systems and collectors by simply analyzing the data reported by the systems or collectors.

Detailed Description

For fault tolerance, sensors, both hardware and software, can send each flow information to different collectors. In some cases, during a normal mode of operation, when no collectors or path from sensors and collectors are down, every flow can be summarized by two or more different collectors. The summaries of the collectors should match if the collectors are not compromised. In the pipeline, we can compare aggregated flow information from the multiple collectors to see which collectors are disagreement.

For example, consider three Collectors A, B and C. Sensors S1. Say S1 observes flows 1, 2 and 3 and has flow information F1, F2 and F3 respectively.

F1 is sent to A and B.

F2 is sent to B and C.

F3 is sent to C and A.

Say Collector B is compromised. It modifies F1 and F2 and sends to pipeline. The modified flow information can be called F1' and F2'.

When comparing flows reported by A and B. F1 reported by A does not match F1' reported by B. With this comparison it cannot be said who among A and B is compromised. However, comparing flows from B and C and C and A shows that A and C reported flow which is F3 matches. Hence, B is compromised.

If B decides to selectively modify flows; It modifies those flows that sent to A and B. Not those sent to B and C. In the example, Collector B reports F1' instead of F1 and it sends F2 as is. Then it cannot be concluded that B is compromised. In pipeline both F1 and F1' can be kept for analysis; marking them as untrusted data.

To cover for above limitation the same flow information can be sent to three Collectors (for a subset of flows). This subset can be compared to see if majority of Collectors agree. The first two Collectors that a flow is sent to based on HA policy. The third Collector can be randomly picked.

Directed Acyclic Graph of Down Services to Prioritize Repair

Summary

When multiple services fail, determining priorities in fixing services can be difficult.

Detailed Description

When multiple services go down, it is useful to determine the root cause of the failure. One way to predict the root cause of failure is to create a service dependency directed acyclic graph (DAG) that represents how services depend from each other. When multiple services fail, the system can try to fix the service that is highest on the hierarchy of down services. In other words, the system can create a new DAG that only represents the services that are down and focus on the root service. If multiple services are down, but there is not a clear root service, the system can focus on fixing the service that is highest on the DAG (meaning it has the most dependents, even if those dependents are currently functioning).

If services appear to be running normally but the system detects cascading anomalies (or events indicative of a problem), the system can use complex analysis to find the root cause of the anomalous behavior.

The system can determine the DAG by monitoring network data and discover what services rely on different services.

Synthetic Traffic Flows for Pipeline Health Check

Detailed Description

In order to do a health check of attack prevention systems, a system can initiate a dummy attack load and determine if the attack is correctly identified and flagged. A sensor, or combination of sensors, can report what should indicate an attack to data collectors. Another synthetic flow source can be from independent processes on machines specifically designed to create such flows. Once the attack as been identified, the system can determine if each stage in the detection process operated as expected. For example, some components should correctly identify the attack, while others take action to mitigate the damage and shut down the source. Because the system is initiating the dummy attack load, the system should be able to predict what occurs at each stage of detection and flag components that do not respond according to the system's expectations.

Enforcing Network Policies Using Sensors

Summary

The present technology enables sensors in a computing network to monitor network flows in and out corresponding nodes, determines non-complying network flows, and enforces suitable policies on demand.

Detailed Description

The present technology enables sensors in a computing network to monitor network flows in and out corresponding nodes, determines non-complying network flows, and enforces suitable policies on demand.

In some embodiments, sensors of a computing network may enforce suitable policies by allowing or limiting certain types of traffic, or controlling transmission speed for certain types of traffic flows.

Differential Analysis for Detecting Hidden

Summary

Various techniques are used to hide the presence of malware and the network traffic generated by malware. Network traffic generated by a malware or any agent that wishes to send data out of the system can do so by placing itself at various levels in the Operating System stack. Data can be sent out by various means, some of which can bypass the OS stack altogether. For example, a compromised network device driver or firmware can send data out without being detected by the OS (either Guest or Host OS in a virtualized environment). Sometimes, a compromised device or service can generate and send packets which hide a process used by the malware which may otherwise indicate the system is compromised (e.g., via the process). Network traffic can often be detected by analyzing packets on the wire or the physical medium. A packet analyzer system (hardware or software) placed on the wire can see all packets, but has no means for identifying a process in a packet if the process is hidden from the host OS, making it difficult to identify processes used or attacked by malware. Precisely, a packet analyzer cannot identify a hidden process when a portion of the flow associated with the process is hidden.

Elements of this disclosure can provide a method and system of detecting a hidden process in a packet by observing traffic from two or more reference points. One of the reference point is the system X where the traffic was generated and the other reference point is a system Y through which all network traffic of system X must pass. We detect such packets by collecting metadata of packets or the packet content itself that was seen at both reference point X and reference point Y, and computing the difference between them. We identify the hidden process by comparing the processes in the packets captured by system X with those captured by system Y.

This methodology and system can detect such packets in a datacenter having different kinds of compute workloads ranging from containers, virtual machines, hypervisors, switches, and bare metal servers.

Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

In a compute environment, detecting a hidden process in network flows coming out of that environment, by observing or doing packet analysis from two or more reference point with at least one inside and one outside the above mentioned compute environment.

Elements of this disclosure can provide an ability to pinpoint the system that generated any packets having a hidden process, and ability to predict the presence of malicious entities inside a compute environment because of the presence of a hidden process in a flow.

Detailed Description

Methodology and technique for observing and capturing information about network traffic in a datacenter is described below. Once placed on a physical network, packets will have to pass through the networking gear (switch, etc.) attached to the compute environment. We can leverage this to identify a hidden process in a flow. Note that for a packets coming out of a virtual NIC, the packets will have to always pass through a virtual switch or virtual bridge, or something similar based on the hypervisor technology. In all cases a network capture agent sitting outside the above mentioned compute environment, and observing packets on the interface which receives all the outgoing network traffic, can observe all packets including the ones that are hidden to an observer inside the compute environment or have any hidden processes. Using at least two observation reference points, out of which at least one is inside the compute environment being monitored and one is outside the compute environment being monitored, this disclosure can detect any hidden processes in network flows.

The goal is to detect a hidden process in a flow, and attribute it back to the compute environment generating such flows. Such a compute environment has a high chance of being infected by a malware which is trying to send traffic while hiding a process in the flow to go undetected.

Network traffic coming out of a compute environment (whether from a container, VM, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

Using the network data captured by sensors deployed at various levels and locations, our algorithm runs a comparison algorithm to solve the problem of detecting hidden processes in flows.

The algorithm performs a differential analysis of packets and processes detected and captured at two reference points along a path in order to detect the hidden processes in flows.

Once a hidden process in a flow has been identified, the system can take corrective actions and make adjustments to limit the harm caused by the malware or threat.

Differential Analysis for Detecting Hidden Flows

Summary

Elements of this disclosure can provide a method and system of detecting such packets by observing traffic from two or more reference points. One of the reference point is the system X where the traffic was generated and the other reference point is a system Y through which all network traffic of system X must pass. We detect such packets by collecting metadata of packets or the packet content itself that was seen at both reference point X and reference point Y, and computing the difference between them.

This methodology and system can detect such packets in a datacenter having different kinds of compute workloads ranging from containers, virtual machines and bare metal servers.

In a compute environment, detect hidden network flows or packets coming out of that environment, by observing or doing packet analysis from two or more reference point with at least one inside and one outside the above mentioned compute environment. Hidden flows or packets are those that originate from a system (VM, container, or physical machine) but cannot be seen by packet sniffers or tools like netstat running on that system or the OS itself on that system.

Elements of this disclosure can provide an accurate, efficient, and dynamic mechanism for analyzing traffic and identifying malware or other threats. This disclosure can provide a very effective mechanism to limit the harm and threat of malware and other harmful traffic and software.

Detailed Description

Methodology and technique for observing and capturing information about network traffic in a datacenter is described below. While most network traffic is legitimate, some network traffic is generated by malicious code for the purpose of data theft or for other malicious intent like communication with a remote command and control server. Malicious entities (eg rootkits, malware) have it in their best interest to hide these flows from administrators, firewalls, or IDS systems. Traffic can be hidden at multiple levels depending on the sophistication of the malicious code and level of infection. It is possible to send traffic out of a compute environment without being detected by any packet capture agent or the OS itself installed on that compute node. But once placed on the physical network, these packets will have to pass through the networking gear (switch, etc.) attached to the compute environment. Note that for a packets coming out of a virtual NIC, the packets will have to always pass through a virtual switch or virtual bridge, or something similar based on the hypervisor technology. In all cases a network capture agent sitting outside the above mentioned compute environment, and observing packets on the interface which receives all the outgoing network traffic, can observe all packets including the ones that are hidden to an observer inside the compute environment. Using at least two observation reference points, out of which at least one is inside the compute environment being monitored and one is outside the compute environment being monitored, there is mechanism to detect the flows that were hidden.

The goal is to detect such packets and flows, and attribute it back to the compute environment generating such flows. Such a compute environment has a high chance of being infected by a malware which is trying to send traffic without being detected by malware detection programs.

Network traffic coming out of a compute environment (whether from a container, VM, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

Using the network data captured by sensors deployed at various levels and locations, our algorithm runs a comparison algorithm described in the attached document to solve the problem of detecting hidden packets mentioned earlier in the problem statement of this disclosure.

The algorithm performs a differential analysis of packets detected and captured at two reference points along a path in order to detect the hidden packets.

Once the hidden flows have been identified, the system can take corrective actions and make adjustments to limit the harm caused by the malware or threat.

Late Data Detection in Data Center

Summary

Elements of this disclosure can provide a mechanism for calculating clocks and times of the different systems on the network by determining a difference between the timestamp of a reported event and the collector's timestamp upon receiving the reported event, and applying a calculated latency for the reported data. Detect environment of sensor placement automatically from analyzing captured network data. Detect relative placement of sensors automatically from analyzing captured network data by the sensor.

This disclosure can resolve the clock skew problem in data centers and can be applied in a wide variety of scenarios and applications which depend on time. (1) No need to manually update sensor placement information. (2) No need to integrate with and have environment specific integration with hypervisor management software to detect that new VMs have come up or that a VM has moved. (3) Network hardware placement change can be tracked automatically. (4) Sensor placement can be used for differential analysis in diagnosing missing packets, and malware flows.

Detailed Description

Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

Collectors can use the collected data from sensors to then calculate an accurate clock for each sensor/system as described below.

When a sensor reports data to a collector, the reported data will include the timestamp based on the clock at the system where the sensor resides. The collector can then compare the timestamp from the sensor's data with its own timestamp to identify the difference. Based on the difference, the collector can identify the clock of the sensor relative to the collector's clock. The collector can then identify an error margin based on a latency calculated for communications between the sensor and the collector. This latency can be calculated by sending a message from the collector to the sensor, receiving a reply, and calculating the latency based on the time the message was sent and the time of receipt. Using the latency and the calculated clock difference, the collector can determine a clock time for the sensor and its system.

The collector can perform this mechanism for the various sensors it receives information from. Thus, the calculated clocks for all of the sensors will be relative to the collector's clock and will account for latency (error margins). Accordingly, the collector will be able to get a true sense of the time of events reported by sensors, and will be able to identify which events happened when and which events happened before other events.

The collector can perform the calculation of sensor clocks on a continuous basis to ensure it maintains accuracy over time. The intervals of time for re-calculating clocks can be programmed based on settings, events, inputs, requests, etc.

In a Virtualized compute infrastructure, detecting the placement relationship of various components that can be used to capture packet or metadata of packets flowing through it. A packet inspection agent called sensor can be deployed on a Virtual machine, or on a hypervisor or inside a physical switch. All of the three types of sensors mentioned above can export information of the captured packets or flows to a central entity called Collector for processing. The sensor could read an externally maintained configuration file to figure out if it is deployed on a virtual machine or hypervisor or physical switch. Use of an external file to solve this problem requires either a person to update the configuration file each time new sensors are deployed or the same sensor moves to a different virtual machine. Detecting the placement relationship of sensor without external configuration file, based on just the packet or flow information that is being exported by the sensor is the problem that is solved in this disclosure.

Description

Automatically detecting the environment in which such a sensor is placed by collectively analyzing the data reported by all of the sensors is the new technique presented in this disclosure. Another new technique presented in this disclosure is automatically detecting the relationship of these sensors in terms of their placement.

Processes or agents that run on a system to capture network data are referred to as capturing agents or simply "Sensors" in this document. Such sensors have ability to report metadata about the packets that is observed or report a subset of captured network data to a collection and aggregation entity that may be running on a different or same system. Apart from network data, the sensor may also capture additional information about the system it is running on. The additional data can consist of, but is not limited to data or metadata of active or previously active processes of the system along with metadata of files that are present on the system. The collection entity could be a single or a cluster of processes. A single collection entity or process is referred to as Collector in this document.

Sensors or network capture agents could be present and running inside multiple environments. We list three such possible environments— a. As a process or kernel module or kernel driver on a guest Operating System installed in a Virtual machine.

b. As a process or kernel module or kernel driver on the host operating system installed at the hypervisor layer.

c. As a process or a component in a physical network gear that is capable of routing or switching. The network gear could provide a way to install such an agent, or the network gear itself could act as such an agent. The network gear or its component would have to export metadata about the packets or flows it observed, to a Collector.

In each of the above scenarios where a sensor can be placed, the sensor has the ability to observe all packets that flow through the system, and it can talk to the Collector using a IP address. In a datacenter or a large deployment, there can be millions of Sensors running and reporting network information to Collector. Collector can perform a number of processing activities on the reported data ranging from network diagnostics to security related applications. Having the knowledge of whether the reported sensor data was from a sensor deployed inside a VM or from a sensor deployed inside Hypervisor or from a sensor deployed inside a networking gear is very important for a number of algorithms that do processing on the gathered data.

The network data observed by a sensor A inside a VM is a subset of the network data observed by a sensor B inside the hypervisor on which the VM is running. Further, the network data observed by a sensor B running inside a Hypervisor is again a subset of the network data observed by a sensor C running either inside or as part of the networking gear to which the hypervisor or the physical machine is connected to. The relationship information about whether sensor B in placed in a hypervisor which contains the VM where sensor A is placed, is very important for a lot of algorithms that do analysis on the captured data. This relationship about sensor placement can be constructed manually by a person who has deployed the sensors. It might be possible to query the hypervisor environment using hypervisor specific APIs, and management interfaces provided by various hypervisor environments like Xen, Vmware, KVM, etc. A new way of figuring out this relationship from the captured flow data is presented in this disclosure. The technique is not dependent on a hypervisor environments or specific management solutions provided by various environments. The technique also enables detection of VM movements, and thus updating the relationship automatically.

All sensors send information about the network traffic they have observed. This information is sent to Collector. Sensor knows the IP address and port number used to send information to the collector. All sensors periodically sends information about each and every flow they have observed to the Collector. The information sent contains a list of flows that were active between the current time and the time at which the last information was sent to the collector. The communication channel between the sensor and the collector also creates a flow in every interval. Let us denote this flow as CF or control flow. The information sent by a sensor will also contain information about the Control Flow since its also a valid flow in the system.

Let us imagine the following setup for purpose of explanation—

1. Sensor S1 is deployed in a VM that is running inside a Hypervisor. IP address of the VM is IP1.

2. Sensor S2 is deployed in the hypervisor mentioned in 1 above. IP address of the hypervisor is IP2 which is different from IP1.

3. Sensor S3 is deployed in or as part of the physical network switch or NIC. The IP address of the switch is IP3. This network switch is placed such that all network traffic coming out and going into the Hypervisor mentioned in 2, go through this switch.

Based on above placement of sensors, the following holds true—

1. All flows seen and reported by S1 will also be seen and reported by S2.

2. All flows seen and reported by S2 will also be seen and reported by S3.

Thus, 1. flow F1 that is generated inside the VM and seen by Si, will be reported by S1, S2, S3 to collector. So, the control flow denoting the communication between S1 and collector will be seen and reported by S1, S2, S3 to Collector.

2. flow F2 generated inside the hypervisor will be seen and reported by S2, and S3 but not S1. So the control flow denoting the communication between S2 and Collector will be seen and reported by S2 and S3 to Collector.

3. flow F3 generated by switch will be seen only by the switch itself and reported to Collector by F3 alone.

At Collector, after collecting information from all sensors, we will have the following relation—

1. F1 reported by S1, S2, S3
2. F2 reported by S2, S3
3. F3 reported by S3.

Here is the algorithm that determined the relationship of one sensor to others.

1. For each flow emit get the list the sensors reporting it. Call this list L. List L contains sensor ids of all sensors that reported the flow.

2. For every id 'Si' in list L, do the following—
a. emit a Tuple—{Si, Set of all sensors in L except Si}
3. Collect all the tuples at the end of Step 2.
4. For every sensor with id Si do the following—
a. Get a list of all tuples where Si is the first element.
b. Take a intersection of the sets that are second element in the tuples gathered above. Call this intersection set 'Front sensors'. It represents the list of sensors that can see all flows that sensor Si can see. In our example, for S1, the set of Front sensors will be {S2, S3}.

c. Take a union of the sets that are second element in the tuples generated in Step a. Compute the difference between the union set and the intersection set. Call this 'Difference set' as the 'Rear sensors'. It represents the list sensors whose all flows can be seen by sensor Si. In our example, for S1, the set of Rear sensors will be empty set. For S2, the set of Rear sensors is {S1}

Using the above algorithm Collector or any process that analyzes the flow metadata exported by the sensors can determine the relation placement of a sensor with respect to each other.

Determining Causality of Events

Summary

This disclosure can determine the chronology and causality of events in a data center even when the events happened too close in time to accurately make this determination by comparing timestamps. In particular, this disclosure compares the events in view of other unrelated events from which we can extrapolate time and sequence information to allow us to indirectly determine the chronological ordering of the events in question.

Elements of this disclosure can allow us to determine the chronological ordering and causality of events even when dealing with events that happened too close in time to rely on time clocks. This information can be very useful for analytics and network management.

Detailed Description

Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

Event chronology and causality can be determined directly using timing calculated according to our mechanism for harmonizing time and clocks in the data center, as described below, and indirectly by analyzing related and unrelated events and relationships as well as timing information.

Direct Determination—

A direct determination can be ascertained by comparing timestamps between events. This mechanism can leverage our system for harmonizing time and clocks in the data center. Here, we use the time clock of a collector to harmonize the clocks of systems of those sensors reporting data to the collector. In particular, a sensor can report data to a collector and include a timestamp which corresponds to the sensor's (or rather the system where the sensor resides) clock. The collector can then compare the time reported by the sensor with the time on its own clock to determine the difference or discrepancy in time. The collector can also calculate a latency or error margin by sending a message to the sensor and calculating the time when the message was sent with the time when the reply was received and identifying the latency based on the difference in these times. The collector can perform this timing calculation for the other sensors in order to harmonize the time for all sensors. With the harmonized times, the collector can then determine which events occurred before other events by comparing the harmonized times.

However, this direct mechanism may not be sufficient in situations where the times are very close (e.g., within error margin). Thus, the current disclosure can also implement an indirect mechanism of comparing other events to infer causalities and chronologies indirectly. This mechanism is further described below.

Indirect Determination—

Indirect determinations can be performed by comparing events with other unrelated events. We can use unrelated events for which we can ascertain whether they occurred before or after the events in question to infer which event happened first. We can also use certain knowledge and inferences of other events, such as our knowledge that we can infer that a message send event at a sensor will necessarily happen before the message receive event at the destination sensor.

For example, say we have a process A at time 1 on sensor 1 and we want to determine whether process A at sensor 1 happened before or after process B at sensor 4. We can then observe other events happening at sensor 1 to use as a reference. To illustrate, say we know that message 1 was sent by sensor 1 at time 2 after process A happened at sensor 1 (i.e., after time 1) and message 1 was eventually received by sensor 4 before process B occurred at sensor 4, then we can determine that process A occurred before process B as follows. We can determine that message 1 was sent from sensor 1 at T2 to sensor 2 and received by sensor 2. Sensor 2 then sent message 1 to sensor 3 at T3. Sensor 3 then sent message 1 to sensor 4 at T4. Thus, since we know that sensor 4's receipt of message 1 must have happened after sensor 1's initial transmission of message 1 to sensor 2, then we can infer that T2 (when message 1 was sent to sensor 2) happened before T4 (when sensor 4 received message 1 from sensor 3). Moreover, since we know that message 1 was received by sensor 4 before process B occurred at sensor 4, then we know that T4 (when sensor 4 received message 1) occurred before process B. Accordingly, since we know that process A occurred before T1 and process B occurred after T4, and we know that T1 happened before T4, then we can determine that process A occurred before process B.

The above provides an example how we can determine between two processes which processed occurred first by comparing the timing of each process at each sensor with other unrelated events that occurred at each sensor and/or other sensors. The above example uses our ability to determine that a message must be sent before it is received. However, other types of inferences can also be used in other embodiments to make indirect correlations of time. For example, we can infer that a parent command occurred before the resulting command and use this time relationship in our determination. Other event relationships can also be used. For example, if a specific type of event must occurred by a subsequent event (for example a shutdown event must happen after a restart or initialization event or an event from an object must occur after the object is created), then we can use this relationship to perform our indirect calculation.

Custom Events Processor for Network Event

Summary

Elements of this disclosure can collect sensed data to generate a lineage of every network process. A statistical model can be implemented to then detect patterns based on the lineage of the process and identify any anomalies or malicious events.

This disclosure can provide a better understanding of processes, particularly with EPGs, and help to detect any anomalies or malicious events when a command or process is executed in the network. This disclosure can be implemented in a wide variety of contexts using statistical models.

Detailed Description

This disclosure can be implemented within an architecture for observing and capturing information about network traffic in a datacenter as described below.

Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

In this context, we can capture data from sensors and use the data to develop a lineage for every process. The lineage can then be used to identify anomalies as further described below.

Solution—Every process in a network can have some type of lineage. The current disclosure performs an analysis of commands and processes in the network to identify a lineage of a process. The lineage can be specifically important and relevant with endpoint groups (EPGs). The lineage can help identify certain types of patterns which may indicate anomalies or malicious events.

For example, the system can identify a process at system Y when command X is executed. Command X may have been observed to be triggered by command Z. We then know that the lineage for the process at system Y is command Z followed by command X. This information can be compared with processes and commands as they are executed and initialized to identify any hidden command-in-control or other anomalies.

To detect anomalies, other factors can also be taken into account. For example, factors which are inherently dubious can be used in the calculus. To illustrate, a process for running a scan on the network is inherently dubious. Thus, we can use the process lineage (i.e., lineage of the process for scanning the network) to determine if the scan was executed by a malicious command or malware. For example, if the scan follows the expected lineage mapped out for that process then we may be able to determine that the scan is legitimate or an accident/fluke. On the other hand, if the scan was triggered by an external command (i.e., command from the outside), then we can infer that this scan is part of an attack or malicious event. Similarly, if the scan does not follow the previously-established lineage (e.g., scan was started by a parent process that is not in the lineage), we can determine that the scan is part of a malicious event.

This disclosure can use a statistical model, such as markov chains, to study the lineage patterns and detect anomalies. The lineage patterns ascertained through the statistical model can be based on data collected by the sensors on the various devices in the network (VMs, hypervisors, switches, etc.). The statistical models and lineage information can be used in other contexts and may be applied with EPGs for understanding processes and anomalies.

The lineage information can be used to detect a command-in-control for a process and determine if the command is a hidden command or not. For example, if the command is not in the lineage, we can expect the command to be a hidden command. Hidden commands can be inherently dubious and more likely to be malicious. However, based on our statistical model, we can identify whether the hidden command may be a fluke or accident, or whether it is indeed a malicious event.

Spoof Detection Based on Distributed Topology Mapping and Traffic History

Summary

The current disclosure provides a spoofing detection mechanism which uses distributed sensors within VMs, hypervisors, servers, and switches (hardware and software) in the network to capture flows at each point or hop and based on the captured flows, building a map of the topology of the network, which can identify the network elements, connections, IP addresses, and subnets in the network. The map of the topology can provide a historical snapshot of traffic which can identify the sequence and order of network elements (VMs, hypervisors, switches) and addresses (IP addresses and subnets) along different communication paths. This information can be used to determine which elements, IP addresses, and subnets should be involved in a particular communication. Thus, a spoofed packet can be detected by comparing the actual elements, IP addresses, and subnets which handled the packet with those that are to be expected based on the historical information and the map of the topology.

Elements of this disclosure can use distributed sensors at VMs, hypervisors, servers, and switches to capture flows and build a historical map of the topology, communication paths, and addressing in the network. This map can then be used to detect spoofed packets by comparing actual sensed results for the packet with the historical map and detecting any deviations between the network elements, IP addresses, and/or subnets actually involved in the communication versus those that are expected based on the historical map.

This mechanism can provide an accurate and efficient solution for spoofing detection using a distributed sensor approach.

Detailed Description

This disclosure can be implemented within an architecture for observing and capturing information about network traffic in a datacenter as described below.

Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

This architecture is used to detect spoofing as described below.

Solution—The current disclosure provides a spoofing detection mechanism which uses distributed sensors within VMs, hypervisors, servers, and switches (hardware and software) in the network to capture flows at each point or hop and, based on the captured flows, building a map of the topology of the network, which can identify the network elements, connections, IP addresses, and subnets in the network. The map of the topology can provide a historical snapshot of traffic and communications which can be used to identify the sequence and order of network elements (VMs, hypervisors, switches) and addresses (IP addresses and subnets) along different communication paths. This information can be used to determine which elements, IP addresses, and subnets should be involved in a particular communication. Thus, a spoofed packet can be detected by comparing the actual elements, IP addresses, and subnets which handled the packet with those that are to be expected based on the historical information and the map of the topology.

For example, if the captured flows from the various sensors indicate that traffic handled by VM1 should flow to hypervisor 1, switch 1, and hypervisor 2 in order to reach VM2, we can identify a spoofed packet when there is an actual deviation. Thus, if a sensor at one or more of those points detects a packet which did not pass through the expected devices, we can identify that packet as a spoofed packet. Similarly, if the historical information indicates that packets from system X should have an IP address in subnet Y, when we detect a packet that has system X as its source but does not have an IP address in subnet Y, we can determine that such packet is a spoofed packet.

Determining Packet Loss at Different Points in a Distributed Sensor-Collector Architecture Summary Network traffic coming out of a compute environment (whether from a container, VM, hardware switch, hypervisor or physical server) is captured by entities called sensors which can be deployed in or inside different environments as mentioned later. Such capturing agents will be referred to as "Sensors". Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion. In actual deployment of datacenter scale, there will be more than just one collector, each responsible for handling export data from a group of sensors.

Collectors are capable of doing preprocessing and analysis of the data collected from sensors. It is capable of sending the processed or unprocessed data to a cluster of processes responsible for analysis of network data. The entities which receive the data from Collector can be a cluster of processes, and we will refer to this logical group as Pipeline. Note that sensors and collectors are not limited to observing and processing just network data, but can also capture other system information like currently active processes, active file handles, socket handles, status of I/O devices, memory, etc.

Problem—

A network will often experience different amounts of packet loss at different points within the path of a flow. It is important to identify the amount of packet loss at each point to fine tune and improve the network.

Elements of this disclosure can allow a centralized system to collect and aggregate data captured from sensors at each point within a communication path over a specific period of time and compare the information reported at each point to identify packet loss at each point.

Advantages include: This mechanism can be implemented in a live environment and can accurately and efficiently ascertain packet loss at each point within a network.

Detailed Description

The current disclosure implements sensors within VMs, hypervisors, servers, and hardware switches which capture data sent and received at each of these points and reports the data to a collector which can aggregate and maintain the reported, sensed data. The collector can transmit the collected data from each sensor to the pipeline (e.g., Traffic monitoring system engine), which can analyze the aggregated data and identify precise amounts of packet loss at each point.

The pipeline can identify packet loss at each point by comparing data or packets captured and reported by sensors at each point. This comparison can be performed per flow, per link, or on a host basis. Moreover, the pipeline can perform the comparison for data captured within a specific time window. For example, the pipeline can compare data from each point within a 30 minute time window. The pipeline can then identify packet loss at each point and determine if there is a problem at a specific point within the link, path, or flow.

For example, the pipeline can analyze an aggregate of data captured for a 30 minute window of communications from S1 to H1 to S2. Based on the aggregated data, the pipeline can determine that S1 reported 100% of the packets, H1 reported 90% of the packets, and S2 reported 80% of the packets. Here, the pipeline can thus determine that there is a 10% packet loss at each of H1 and S2.

Detecting Sensor-Collector Topology

Summary

Problem to solve: In a Virtualized compute infrastructure, detect the placement relationship of various components that can be used to capture packet or metadata of packets flowing through it. A packet inspection agent called sensor can be deployed on a Virtual machine, or on a hypervisor or inside a physical switch. All of the three types of sensors mentioned above can export information of the captured packets or flows to a central entity called Collector for processing. The sensor could read an externally maintained config to figure out if it is deployed on a virtual machine or hypervisor or physical switch. Use of an external file to solve this problem requires either a person to update the config each time new sensors are deployed or the same sensor moves to a different virtual machine.

Detecting the sensor-collector topology in a network for understanding the placement of sensors and collectors associated with a reported flow.

Advantages include: The topology and placement information ascertained through this disclosure drives the traffic monitoring system and is used by most of the features which rely on data captured by sensors and collected by collectors. This disclosure can be very important for the analytics performed by the traffic monitoring system.

Detailed Description

In a Virtualized compute infrastructure, detect the placement relationship of various components that can be used to capture packet or metadata of packets flowing through it. A packet inspection agent called sensor can be deployed on a Virtual machine, or on a hypervisor or inside a physical switch. All of the three types of sensors mentioned above can export information of the captured packets or flows to a central entity called Collector for processing. The sensor could read an externally maintained config to figure out if it is deployed on a virtual machine or hypervisor or physical switch. Use of an external file to solve this problem requires either a person to update the config each time new sensors are deployed or the same sensor moves to a different virtual machine. Detecting the placement relationship of sensor without external configuration file, based on just the packet or flow information that is being exported by the sensor is the problem that is solved in this disclosure.

Description

Processes or agents that run on a system to capture network data are referred to as capturing agents or simply "Sensors" in this document. Such sensors have ability to report metadata about the packets that is observed or report a subset of captured network data to a collection and aggregation entity that may be running on a different or same system. Apart from network data, the sensor may also capture additional information about the system it is running on. The additional data can consist of, but is not limited to data or metadata of active or previously active processes of the system along with metadata of files that are present on the system. The collection entity could be a single or a cluster of processes. A single collection entity or process is referred to as Collector in this document.

Sensors or network capture agents could be present and running inside multiple environments. We list three such possible environments— a. As a process or kernel module or kernel driver on a guest Operating System installed in a Virtual machine.

b. As a process or kernel module or kernel driver on the host operating system installed at the hypervisor layer.

c. As a process or a component in a physical network gear that is capable of routing or switching. The network gear could provide a way to install such an agent, or the network gear itself could act as such an agent. The network gear or its component would have to export metadata about the packets or flows it observed, to a Collector.

In each of the above scenarios where a sensor can be placed, the sensor has the ability to observe all packets that flow through the system, and it can talk to the Collector using a IP address. In a datacenter or a large deployment, there can be millions of Sensors running and reporting network information to Collector. Collector can perform a number of processing activities on the reported data ranging from network diagnostics to security related applications. Having the knowledge of whether the reported sensor data was from a sensor deployed inside a VM or from a sensor deployed inside Hypervisor or from a sensor deployed inside a networking gear is very important for a number of algorithms that do processing on the gathered data. The use cases of the algorithms will not be discussed in this disclosure.

The network data observed by a sensor A inside a VM is a subset of the network data observed by a sensor B inside the hypervisor on which the VM is running. Further, the network data observed by a sensor B running inside a Hypervisor is again a subset of the network data observed by a sensor C running either inside or as part of the networking gear to which the hypervisor or the physical machine is connected to. The relationship information about whether sensor B in placed in a hypervisor which contains the VM where sensor A is placed, is very important for a lot of algorithms that do analysis on the captured data. This relationship about sensor placement can be constructed manually by a person who has deployed the sensors. It might be possible to query the hypervisor environment using hypervisor specific APIs, and management interfaces provided by various hypervisor environments like Xen, Vmware, KVM, etc. A new way of figuring out this relationship from the captured flow data is presented in this disclosure. The technique is not dependent on a hypervisor environments or specific management solutions provided by various environments. The technique also enables detection of VM movements, and thus updating the relationship automatically.

All sensors send information about the network traffic they have observed. This information is sent to Collector. Sensor knows the IP address and port number used to send information to the collector. All sensors periodically sends information about each and every flow they have observed to the Collector. The information sent contains a list of flows that were active between the current time and the time at which the last information was sent to the collector. The communication channel between the sensor and the collector also creates a flow in every interval. Let us denote this flow as CF or control flow. The information sent by a sensor will also contain information about the Control Flow since its also a valid flow in the system.

Let us imagine the following setup for purpose of explanation—

1. Sensor S1 is deployed in a VM that is running inside a Hypervisor. IP address of the VM is IP1.

2. Sensor S2 is deployed in the hypervisor mentioned in 1 above. IP address of the hypervisor is IP2 which is different from IP1.

3. Sensor S3 is deployed in or as part of the physical network switch or NIC. The IP address of the switch is IP3. This network switch is placed such that all network traffic coming out and going into the Hypervisor mentioned in 2, go through this switch.

Based on above placement of sensors, the following holds true—

1. All flows seen and reported by S1 will also be seen and reported by S2.

2. All flows seen and reported by S2 will also be seen and reported by S3.

Thus, 1. flow F1 that is generated inside the VM and seen by S1, will be reported by S1, S2, S3 to collector. So, the control flow denoting the communication between S1 and collector will be seen and reported by S1, S2, S3 to Collector.

2. flow F2 generated inside the hypervisor will be seen and reported by S2, and S3 but not S1. So the control flow denoting the communication between S2 and Collector will be seen and reported by S2 and S3 to Collector.

3. flow F3 generated by switch will be seen only by the switch itself and reported to Collector by F3 alone.

At Collector, after collecting information from all sensors, we will have the following relation—

1. F1 reported by S1, S2, S3
2. F2 reported by S2, S3
3. F3 reported by S3.

Here is the algorithm that determined the relationship of one sensor to others.

1. For each flow emit get the list the sensors reporting it. Call this list L. List L contains sensor ids of all sensors that reported the flow.
2. For every id 'Si' in list L, do the following—
  a. emit a Tuple—{Si, Set of all sensors in L except Si}
3. Collect all the tuples at the end of Step 2.
4. For every sensor with id Si do the following—
  a. Get a list of all tuples where Si is the first element.
  b. Take a intersection of the sets that are second element in the tuples gathered above. Call this intersection set 'Front sensors'. It represents the list of sensors that can see all flows that sensor Si can see. In our example, for S1, the set of Front sensors will be {S2, S3}.
  c. Take a union of the sets that are second element in the tuples generated in Step a. Compute the difference between the union set and the intersection set. Call this 'Difference set' as the 'Rear sensors'. It represents the list sensors whose all flows can be seen by sensor Si. In our example, for S1, the set of Rear sensors will be empty set. For S2, the set of Rear sensors is {S1}

Using the above algorithm Collector or any process that analyzes the flow metadata exported by the sensors can determine the relation placement of a sensor with respect to each other.

Creating a Host Reputation Score

Summary

A system can assign a reputation score to each host from −1 to 1. As the host sends and receives data according to policies, its reputation can increase. If the host sends or receives data that is outside its policies or is characteristic of malicious activity, its reputation can decrease.

This approach provides a dynamic time-based scale to asses a host's reputation, which is superior to a binary one-time assessment.

Detailed Description

A system can monitor traffic sent and received by a host and, based on the characteristics of the traffic, determine a reputation score for the host. The reputation score can be a number from 1 (reputable) to −1 (not reputable) with 0 being a neutral starting point. The reputation can increase and decrease over time. Although the reputation would likely be determined by outgoing traffic, incoming traffic can influence a host's reputation as well.

Malicious activity can hurt a host's reputation while normal behavior can increase its reputation. Malicious activity can include serious activity such as that which comes from malware or results in a DDOS attack. It can also include less serious activity, like traffic that goes outside of the group policy for that host. The more serious an activity, the more the network host's reputation will be hurt. Some types of activity may harm the reputation for an extended period of time while other types can have a more transitory effect on reputation. Various activities may not be serious if analyzed independently, but in concert they can be seen as more serious. For example, a solitary connection attempt on a closed port may be an error, while a sequence of such attempts may constitute a "port knock"—a secret message to malicious code.

The reputation formula can fix a lower starting reputation for hosts from a certain geographical region, subnet, manufacturer, with a certain stack, etc. Host learning techniques can be used to determine which behaviors should increase or harm reputation. The system can also have a feedback mechanism. For example, if a host with a strong reputation sends traffic that is abnormal, the system can guess that the abnormal traffic is safe and when it sees similar traffic from another host, it can increase that host's reputation. Similarly, the type of traffic that comes from a host that has a poor reputation can be considered malicious; when it is seen coming from another host it can hurt that host's reputation. In other words, the more similar a host's traffic is to the reputable host's, the greater its reputation. In some cases, traffic from a reputable host will have no effect on that host even though the same traffic, if coming from a disreputable host, would harm that host's reputation.

A host's reputation can be artificially set or reset in accordance to various principles. For example, administrators can determine that it is reputable or has been cleaned of malicious code.

Using Host Reputation Data

Detailed Description

If a system is calculating reputation scores of various hosts, the system can determine resulting reputation scores associated with various policies, stacks, and hosts. When a new host or stack is provisioned, the system can recommend a policy scheme that will likely result in the most favorable reputation score. A favorable reputation should equate to stronger security. If multiple policies result in similar reputation scores, the least restrictive policy can be recommended.

Implementations of this system that are installed on various data centers can share reputation information about policies and their related reputation scores. If the system is sharing reputation data to systems outside of the secure network, it can remove proprietary or confidential information and share generic reputation data.

When a reputation score of a host falls below a certain threshold amount, the system can take action to isolate the host and remove it from the network. The system can then look at other traffic from similar hosts with increased scrutiny.

Policies, stacks, or hosts with extreme reputation scores can effectively white-list or black-list the policy, stacks, or host.

Determining Network Graph, and Annotating with Latency

Detailed Description

One or more statistical algorithms can be used to determine an average of communication latency between any two nodes of a computing network based upon time stamps of all packets between the corresponding two nodes. Packets between all nodes in the computing network can be tracked and collected. In some embodiments, bad flows between any two nodes of the computing network can be eliminated from calculations according to a communication graph and policies of the computing network.

In some embodiments, a communication graph of a computing network can be determined based upon an average latency between any two nodes in the computing network.

In some embodiments, headers of packets between nodes in a computing network can be inspected to determine attributes of the packets (e.g., types of packets, or sizes of the packets). One or more statistical algorithms can classify packets according to attributes of the packets. For packets with a particular attribute, the statistical algorithm can determine average communication latency between any two nodes of the computing network based upon time stamps of packets having the corresponding attribute between two corresponding nodes.

Detecting Network Anomaly/Faults Using Above Graph and Latency

Detailed Description

The present technology can determine an average of network latency between any two nodes of a computing network based upon time stamps of all packets between the corresponding two nodes. Packets between all nodes in the computing network can be tracked and collected. Anomaly or faults within the computing network may be determined based upon determined network latencies between nodes of the computing network.

In some embodiments, average network latency for a particular attribute can be determined based upon time stamps of all packets with such attribute between nodes of the computing network.

In some embodiments, average network latency between any two nodes of a computing network can be correlated to a communication graph of the computing network and used to identify abnormal links.

In some embodiments, an anomaly in network latencies can help identify abnormal activities and used to determine corrective actions.

Detecting Clock Offsets Nodes

Detailed Description

One or more statistical algorithms can be used to determine an average of communication latency between any two nodes of a computing network based upon time stamps of all packets between the corresponding two nodes. Based upon the average communication latency between any two nodes, clock offsets between a corresponding two nodes can be determined.

In some embodiments, headers of packets between nodes in a computing network can be inspected to determine attributes of the packets (e.g., types of packets, or sizes of the packets). One or more statistical algorithms can classify packets according to attributes of the packets. For packets with a particular attribute, the statistical algorithm can determine average communication latency between any two nodes of the computing network based upon time stamps of packets having the corresponding attribute between two corresponding nodes. Clock offsets between two nodes can be determined based up the average communication latency between the two nodes.

Detecting Application Latency

Detailed Description

The present technology determines an average of network latency between any two nodes of a computing network based upon time stamps of all packets between the corresponding two nodes. Packets between all nodes in the computing network can be tracked and collected. The present technology further distinguishes query packets from the packets between all nodes of the computing network and determines an application latency of a node based upon time stamps of query packets to the node and response packets from the node.

In some embodiments, attributes of query packets to a node and response packets from the node can be inspected. Average application latency for a particular attribute can be determined based upon time stamps of all query packets with such attribute to the node and corresponding response nodes with such attribute from the node.

Conditional Policies

Summary

Policies can be defined to take into account a host's behavior (i.e., "reputation" or "vulnerability index"). Suppose a host can be designated as "Good," "OK," or "Bad," and can move among these states over its lifetime. A policy can be established enabling connection to a certain EPG based on one of these states.

A host can move from one reputational EPG to another based on the host's behavior, and policies do not need to be manually updated to account for the changes to the reputation of the host.

Detailed Description

The traffic monitoring system introduces the concept of "reputation" or a "vulnerability index" for a host (discussed in detail elsewhere). Policies can be defined that can take into account a host's reputation (e.g., "Good," "OK," or "Bad"). For example, we can define "Good", "OK," and "Bad" EPGs. Host A can initially have a "Good" or "OK" reputation, and thus is a member of the "Good" or "OK" EPG. A policy P can be defined that allows members of the "Good" or "OK" EPG to access EPG B. According to this policy, A will be able to connect to B. Suppose that A is subsequently exposed to a malware attack resulting in A's reputation being reduced to "Bad," and its EPG membership changing from the "Good" or "OK" EPG to the "Bad" EPG. Because A is now in the "Bad" EPG, A cannot connect to B under policy P.

As another example, suppose that policy Q is a rule that allows members of the "Bad" EPG to access image update servers in EPG C. Under policy Q, A can access the image update servers in C to update its software so that A can be remediated.

As should be understood, there can be more or fewer classifications than "Good," "OK," and "Bad." Further, thresholds for the classifications can be configured by the user. For instance, a host may be designated as "Good" if it has a reputation between 0.7 and 1 (assuming a reputation scale of −1 to 1), "OK" if it has a reputation less than 0.7 but greater than 0, and "Bad" if it has a negative reputation.

Robust Host Reputation Based on External Sources

Detailed Description

The traffic monitoring system introduces the concept of "reputation" or a "vulnerability index" for a host (discussed in detail elsewhere). The reputation score or vulnerability index can be helpful for a variety of use cases, such as enabling conditional policies based on reputation/vulnerability, separating malicious versus non-malicious behavior, and determining effectiveness of policies, among other examples.

In an embodiment, a host can have a "Good," "OK," or "Bad" reputation, although there can be more or fewer classifications in other embodiments. Further, thresholds for the classifications can be configured by the user. For example, a host may be designated as "Good" if it has a reputation between 0.7 and 1 (assuming a reputation scale of −1 to 1), "OK" if it has a reputation less than 0.7 but greater than 0, and "Bad" if it has a negative reputation.

The reputation score can be calculated exclusively from analysis of network traffic in a data center. But we can also leverage external sources for further enhancing reputation scores. For example, we can crawl malware trackers which identify IP addresses that have been infected by particular malware. The reputation of a host in a data center can be reduced if that host has communicated with an external host that has been infected by malware.

We can also crawl who is to determine what IP addresses have been properly allocated to legitimate entities. If a host in a data center is communicating with an unallocated IP address, we can reduce the reputation of that host.

Policy Utilization (and Garbage Collection)
Summary

By including sensors at the various components of a data center (e.g., virtual machine, hypervisor, physical network gear), network traffic in the data center can be analyzed to determine which policies are being utilized (or not being utilized) and the extent (e.g., number of flows, number of packets, bytes, etc.) those policies are being utilized.

Advantages include:

i) Smart ordering of policies—policies can be ordered according to utilization. For example, higher-usage policies can be ordered higher in the policy rule set or higher-usage policies can be stored in memory of network gear)

ii) Garbage collection—those policies that are not being utilized can be removed (e.g., no flows, no packets, no IP addresses communicating on the connection)

Detailed Description

The traffic monitoring system policy pipeline is composed of four major steps/modules:

(1) Application Dependency Mapping

In this stage, network traffic is analyzed to determine a respective graph for each application operating in a data center (discussed in detail elsewhere). That is, particular patterns of traffic will correspond to an application, and the interconnectivity or dependencies of the application are mapped to generate a graph for the application. In this context, an "application" refers to a set of networking components that provides connectivity for a given set of workloads. For example, in a conventional three-tier architecture for application, the servers and other components of the web tier, application tier, and data tier would make up an application.

(2) Policy Generation

Whitelist rules are then derived for each application graph determined in (1) (discussed in detail elsewhere).

As an example of whitelist rule generation, suppose there is an edge of an application graph between E1 (e.g., endpoint, endpoint group) and E2. Permissible traffic flows on a set of ports of E1 to one or more ports of E2. A policy can be defined to reflect the permissible traffic from the set of ports of E1 to the one or more ports of E2.

(3) Flow Pre-Processing

After the application dependencies are mapped and the policies are defined, network traffic is pre-processed in the policy pipeline for further analysis. For each flow, the source endpoint of the flow is mapped to a source endpoint group (EPG) and the destination endpoint of the flow is mapped to a destination EPG. Each flow can also be "normalized" by determining which EPG corresponds to the client, and which EPG corresponds to the server.

(4) Flow Analysis

Each pre-processed flow is then analyzed to determine which policies are being enforced and the extent (e.g., number of packets, number of flows, number of bytes, etc.) those policies are being enforced within the data center.

This flow analysis occurs continuously, and the traffic monitoring system allows a user to specify a window of time (e.g., time of day, day of week or month, month(s) in a year, etc.) to determine which policies are being implemented (or not being implemented) and how often those policies are being implemented.

Policy Simulation
Summary

Policy changes and changes to endpoint group (EPG) membership can be evaluated prior to implementing such changes in a live system. Historical ground truth flows can be used to simulate network traffic based on the policy or EPG membership changes. Real-time flows can also be used to simulate the effects on network traffic based on implementation of an experimental policy set or experimental set of EPGs.

Advantages include:

i) Capable of determining impact on an application due to changes to policies or EPG membership.

ii) Capable of determining impact of future attacks to a data center based on policy or EPG membership changes.

Detailed Description

The traffic monitoring system policy pipeline is composed of four major steps/modules:

(1) Application Dependency Mapping

In this stage, network traffic is analyzed to determine a respective graph for each application operating in a data center (discussed in detail elsewhere). That is, particular patterns of traffic will correspond to an application, and the interconnectivity or dependencies of the application are mapped to generate a graph for the application. In this context, an "application" refers to a set of networking components that provides connectivity for a given set of workloads. For example, in a conventional three-tier architecture for application, the servers and other components of the web tier, application tier, and data tier would make up an application.

(2) Policy Generation

Whitelist rules are then derived for each application graph determined in (1) (discussed in detail elsewhere).

As an example of whitelist rule generation, suppose there is an edge of an application graph between E1 (e.g., endpoint, endpoint group) and E2. Permissible traffic flows on a set of ports of E1 to one or more ports of E2. A policy can be defined to reflect the permissible traffic from the set of ports of E1 to the one or more ports of E2.

(3) Flow Pre-Processing

After the application dependencies are mapped and the policies are defined, network traffic is pre-processed in the policy pipeline for further analysis. For each flow, the source endpoint of the flow is mapped to a source endpoint group (EPG) and the destination endpoint of the flow is mapped to a destination EPG. Each flow can also be "normalized" by determining which EPG corresponds to the client, and which EPG corresponds to the server.

(4) Flow Analysis

Each pre-processed flow is then analyzed to determine various metrics, such as whether a flow is in compliance with security policies, which policies and to what extent those policies are being utilized, etc.

This flow analysis occurs continuously, and the traffic monitoring system allows a user to specify a window of time (e.g., time of day, day of week or month, month(s) in a year, etc.) to determine the number of non-compliant events that occurred during that period.

In addition to evaluating policies actually existing in the data plane, the policy pipeline also enables "what if" analysis, such as analyzing what would happen to network traffic upon adding a new policy, removing an existing policy or changing membership of EPG groups (e.g., adding new endpoints to an EPG, removing endpoints from an EPG, moving an endpoint from one EPG to another).

In one embodiment, historical ground truth flows are utilized for simulating network traffic based on a "what if" experiment. This is referred to as back-testing. In another embodiment, real-time flows can be evaluated against an experimental policy set or experimental set of EPGs to understand how changes to particular policies or EPGs affect network traffic in the data center.

Policy Utilization (and Garbage Collection)

Summary

By including sensors at the various components of a data center (e.g., virtual machine, hypervisor, physical network gear), network traffic in the data center can be analyzed to determine which policies are being utilized (or not being utilized) and the extent (e.g., number of flows, number of packets, bytes, etc.) those policies are being utilized.

Advantages include:

i) Smart ordering of policies—policies can be ordered according to utilization. For example, higher-usage policies can be ordered higher in the policy rule set or higher-usage policies can be stored in memory of network gear)

ii) Garbage collection—those policies that are not being utilized can be removed (e.g., no flows, no packets, no IP addresses communicating on the connection)

Detailed Description

The traffic monitoring system policy pipeline is composed of four major steps/modules:

(1) Application Dependency Mapping

In this stage, network traffic is analyzed to determine a respective graph for each application operating in a data center (discussed in detail elsewhere). That is, particular patterns of traffic will correspond to an application, and the interconnectivity or dependencies of the application are mapped to generate a graph for the application. In this context, an "application" refers to a set of networking components that provides connectivity for a given set of workloads. For example, in a conventional three-tier architecture for application, the servers and other components of the web tier, application tier, and data tier would make up an application.

(2) Policy Generation

Whitelist rules are then derived for each application graph determined in (1) (discussed in detail elsewhere).

As an example of whitelist rule generation, suppose there is an edge of an application graph between E1 (e.g., endpoint, endpoint group) and E2. Permissible traffic flows on a set of ports of E1 to one or more ports of E2. A policy can be defined to reflect the permissible traffic from the set of ports of E1 to the one or more ports of E2.

(3) Flow Pre-Processing

After the application dependencies are mapped and the policies are defined, network traffic is pre-processed in the policy pipeline for further analysis. For each flow, the source endpoint of the flow is mapped to a source endpoint group (EPG) and the destination endpoint of the flow is mapped to a destination EPG. Each flow can also be "normalized" by determining which EPG corresponds to the client, and which EPG corresponds to the server.

(4) Flow Analysis

Each pre-processed flow is then analyzed to determine which policies are being enforced and the extent (e.g., number of packets, number of flows, number of bytes, etc.) those policies are being enforced within the data center.

This flow analysis occurs continuously, and the traffic monitoring system allows a user to specify a window of time (e.g., time of day, day of week or month, month(s) in a year, etc.) to determine which policies are being implemented (or not being implemented) and how often those policies are being implemented.

Policy Compliance

Summary

By including sensors at the various components of a data center (e.g., virtual machine, hypervisor, physical network gear), network traffic in the data center can be analyzed and compared to security policies to determine whether the traffic is in compliance with those policies.

Advantages include:

i) An auditor can query whether endpoint A was ever in communication with endpoint B, and compliance can be established for a specified period of time by showing no non-compliant events for the policy corresponding to A and B. But more generally, Traffic monitoring system is capable of providing real time compliance reports.

ii) A network admin can configure the system to provide notifications when non-compliant events occur.

Detailed Description

The traffic monitoring system policy pipeline is composed of four major steps/modules:

(1) Application Dependency Mapping

In this stage, network traffic is analyzed to determine a respective graph for each application operating in a data center (discussed in detail elsewhere). That is, particular patterns of traffic will correspond to an application, and the interconnectivity or dependencies of the application are mapped to generate a graph for the application. In this context, an "application" refers to a set of networking components that provides connectivity for a given set of workloads. For example, in a conventional three-tier architecture for application, the servers and other components of the web tier, application tier, and data tier would make up an application.

(2) Policy Generation

Whitelist rules are then derived for each application graph determined in (1) (discussed in detail elsewhere). As an example of whitelist rule generation, suppose there is an edge of an application graph between E1 (e.g., endpoint, endpoint group) and E2. Permissible traffic flows on a set of ports of E1 to one or more ports of E2. A policy can be defined to reflect the permissible traffic from the set of ports of E1 to the one or more ports of E2.

(3) Flow Pre-Processing

After the application dependencies are mapped and the policies are defined, network traffic is pre-processed in the policy pipeline for further analysis. For each flow, the source endpoint of the flow is mapped to a source endpoint group (EPG) and the destination endpoint of the flow is mapped to a destination EPG. Each flow can also be "normalized" by determining which EPG corresponds to the client, and which EPG corresponds to the server.

(4) Flow Analysis

Each pre-processed flow is then analyzed to determine whether a flow is in compliance with the policies generated in (2). A flow is not compliant when (a) a policy corresponding to the flow allows the flow but the flow is dropped or (b) a policy corresponding to the flow denies the flow but the flow is forwarded.

This flow analysis occurs continuously, and the traffic monitoring system allows a user to specify a window of time (e.g., time of day, day of week or month, month(s) in a year, etc.) to determine the number of non-compliant events that occurred during the specified period.

Network Vulnerability Quantification and Visualization

Summary

A vulnerability index can be calculated for various components of a data center (e.g., policies, EPGs, hosts, ports, etc.) based on historical flow attack data and other factors. Given a host that is determined to be vulnerable, we can map out other hosts to which the vulnerable host connects to/from and provide a GUI showing the vulnerability graph and the severity of the vulnerabilities.

Advantages include: Able to quantify vulnerabilities of network objects.

Enable visualization of network vulnerabilities, including one or more vulnerable hosts and a graph of other hosts to which a vulnerable host can connect.

Detailed Description

The traffic monitoring system includes an abstraction called "vulnerability" that can be applied to policies, EPGs, hosts, ports, etc. This is different from the concept of "reputation." Reputation is only applicable to hosts, and determines what actions a host can take based on reputation. Vulnerability, on the other hand, quantifies susceptibility of the above objects to network attacks. Historical flow attacks are analyzed with respect to each of these objects to determine a vulnerability index (between 1 and −1) for each object. For example, the vulnerability index for a policy can be calculated based on the historical number of attacks that occurred when the policy was in force relative to when the policy was not in force. Likewise, the differences between attacks when a certain port was open are compared to when the port is closed using historical flow attack data. The vulnerability index for that port would be calculated based on the number of additional attacks that occurred when that port was open versus when it was closed. Other factors that may affect vulnerability are policy compliance/non-compliance, whether a policy is a whitelist policy or blacklist policy, whether certain applications are being run in the data center, whether a certain OS is used by a host device, etc.

The other component of the disclosure can be the ability to provide a vulnerability graph based on vulnerability indexes. Given a first host that is determined to be vulnerable, we map out other hosts to which the first host can connect to and determine the vulnerability indexes for those other hosts. The severity of vulnerability can be indicated by color (e.g., red) intensity so that we end up with a graph indicating vulnerability and severability of vulnerability in this sit. For example, suppose that a host is an authentication server and its vulnerability index is severe. In this situation, the entire network topology would end up bright red because of the authentication server potentially connects to/from every other host in the network. On the other hand, suppose that a host is a log server. The vulnerability graph may only comprise of that host because the log server doesn't connect to any other hosts, and is merely a repository for logs.

In future releases, we can also provide A/B testing for vulnerabilities, such as determining a respective number of attacks occurring when a particular port is open versus when it is closed by analyzing historical flow attack data.

Flow Rank on a Flow Search Page

Summary

This disclosure can be directed to creating a ranking system to bubble up the more important search results after submitting a search request. First, the generated search results are based on relevance between the indexed data gathered from the traffic monitoring system layer and the search term used. Then a cross-ranking metric, business criticality (see above), is used to bubble up the more important search results first. A third criteria can be used to help break any ties of importance the search program encounters.

Detailed Description

This disclosure can be directed to creating a ranking system to bubble up the more important search results after submitting a search request. First, the generated search results are based on relevance between the indexed data gathered from the traffic monitoring system layer and the search term used. Then a cross-ranking metric, business criticality (see above), is used to bubble up the more important search results first. A third criteria can be used to help break any ties of importance the search program encounters. For example the redundancy metric can be used to break any ties of search results that are ranked equally business critical. Identifying redundancy is the identification of logical entities tied to redundant systems. Logical entities tied to redundant systems are ranked lower than logical entities not tied to redundant systems—as the logical entities not tied to redundant systems are more vulnerable. Therefore business critical logical entities not tied to redundant systems ranked higher than business critical logical entities tied to redundant systems.

In the search UI, for example, a user can search for a particular internet protocol (IP) address. Any flow, host or application with the IP address gathered from the indexed data from the traffic monitoring system layer. Next, application of the cross-ranking metric, business criticality, to bubble up the important host, flow or application. For instance, a dataflow can be bubbled up to the top 10 search results because infection of the flow with malware and the system has determined the dataflow in question is business critical due to the infection and the type of dataflow relative to the enterprise. However if two hosts determined to be equally business critical, then another metric, for instance redundancy, can be used to break the tie. For example, if one host communicates with several redundant servers, while the other host does not, the system will bubble up the host without any redundancy before the host with redundancy. Multiple searches can occur on one UI without leaving to another UI.

Additionally, the search UI is customizable to a specific datatype search. For example, the search query can be just for hosts, or just for flow, or just for applications. Depending on the searched data type, the UI can have a specific visualization tied to the datatype searched. For example, the host search will visually look different from the flow search and from the application search. This is to create immediate visual recognition of the searched data type. Furthermore datatypes can be filtered out after generation of the search results or as a parameter before the search results are generated.

Parallel Coordinate Charts for Flow Exploration

Summary

The disclosure can be directed to applying a parallel coordinate chart in the dataflow context. The parallel coordinate chart allows a user to search for a protocol and explore the various flows in the searched protocol. Exploration occurs by providing visualization of a searched protocol's data flow(s) to ascertain the typical from the atypical flow. Each flow has a record of many variables or dimensions. Displaying a dataflow in a parallel coordinate chart.

Detailed Description

The disclosure can be directed to applying a parallel coordinate chart in the dataflow context. The parallel coordinate chart allows a user to search for a protocol and explore the various flows in the searched protocol. Exploration occurs by providing visualization of a searched protocol's data flow(s) to ascertain the typical from the atypical flow. Each flow has a record of many variables or dimensions. Displaying a dataflow in a parallel coordinate chart.

Each data flow represented in a parallel coordinate chart is measured against various dimensions (parallel lines). Examples of dimensions consumer host, open source host, provider host, destination host, protocol, tags, packet counts, bit count, latency, etc. Furthermore, each flow is overlaid on top of each other.

Furthermore overlaying data flows in a protocol on top of each other, in the parallel coordinate chart, represents a concentration of flows. The concentration of flows allows a user to visualize, among other things, the relationship between the flows and observe typical flows. Additionally the user can filter specific dimensions (to observe joint distributions between a pair of dimensions—combined probabilities of what is occurring between two dimensions) or a specific window of time.

There is also an outlier view—flows that are atypical. The outlier view displays the outlier flows. The visualization of the outliers should be an easily consumable number of outliers (display the top 20 outliers, not the bottom 20% as that could be hundreds of flows). An outlier is calculated by calculating each distribution per dimension weighed against all the dimensions.

Again all the data needed to build the parallel coordinate chart stems from the data gathered from the traffic monitoring system layer. Furthermore, particular to the parallel coordinate chart, the flow's attributes are most important in mapping them to a parallel coordinate chart.

Flow Annotation

Summary

A flow can be tagged with metadata to provide additional information about the flow such that the flows are searchable based on tags, or flows having common tags can be aggregated to visualize flow data. Users can also define custom tags and rules by which flows should be tagged.

Advantages include: capable of searching flows based on tags; enable improved visualization of flows.

Detailed Description

Flow Annotation—

In the traffic monitoring system, a flow is a collection of packets having a same source address, destination address, source port, destination port, protocol, tenant id, and starting timestamp. But having only this key/signature may not be particularly helpful to users trying to understand this data and we would like to be able tag flows to enable users to search the flow data and to present the flow data more meaningfully to users.

A high-level overview of the traffic monitoring system pipeline with the key components for flow annotation is provided as the attached figure. Generally, flow data is collected by sensors incorporated at various levels of a data center (e.g., virtual machine, hypervisor, physical switch, etc.) and provided to a Collector. The Collector may perform certain processing on the raw flow data, such as de-duping, and then that data is stored in the HDFS. The Compute Engine processes the flow data in the HDFS, including annotating each flow with certain metadata based on specified rules in order to classify each flow. This enables the UI to present meaningful views of flows or allows users to search flows based on tags.

Default Rules—

Each flow is annotated according to certain default tags, such as Attack, Policy, Geo, Bogon, Whitelist, etc. Attack refers to whether a flow has been determined to be a malicious flow. Policy refers to whether a flow is compliant or non-compliant with policy. Geo refers to the geographic location from which the flow originated. This is determined based on IP address. Bogon refers to whether a flow corresponds to an IP address that has not yet been allocated by the IANA. Whitelist refers to a flow that has been determined to be a "good" flow.

Tagging can be hierarchical. For example, in addition to annotating a flow as an Attack flow, the traffic monitoring system can also specify the type of attack, e.g., malware, scan, DDoS, etc. As another example, the Geo tag can classify a flow according to country, state, city, etc.

Custom Rules—

The traffic monitoring system also enables users to tag flows based on custom tags according to rules that they define. The custom tags and rules can be input by users via the UI coupled to a Rules module. In an embodiment, the Rules module translates the user-defined tags and rules into machine-readable code (e.g., JSON, XML) to integrate the new tags into the HDFS. On the next iteration of the processing by the Compute Engine, the custom tags will be applied to the flows.

The rules can be managed according to a Rule Management module that enables users to perform tag-based analytics (e.g., rank custom tags based on usage), share rules and custom tags among different tenants, associate tags to a hierarchy (e.g., classify tags as associated with certain organizations, or classify tags as relating to networking, etc.), alias tags (i.e., same rules w/different names).

Overcoming an Attack on Ddos Detection Software

Summary

If the attack detection software is being attacked with a large number of spoofed IPs, it can then use a more generic identifier to monitor the traffic.

Detailed Description

Systems that monitor network traffic typically populate tables that represent data flows. As traffic is monitored, the tables grow in size and the system can run analyses on the data to detect anomalies. If the table becomes too large, such analyses can be unmanageable and slow down the system. This slowdown can be so dramatic that the system will be incapable of detecting any anomalous traffic. If the traffic monitoring system is disabled, the network can then be vulnerable to attacks that otherwise could be prevented or mitigated. Therefore, a malicious program might attempt to overcome the detection software and then attack the network. One method for overloading the detection software is repeated IP spoofing, which comprises sending traffic from a large number of random IP addresses.

The instant disclosure can be concerned with disregarding an unmanageably diverse identifier in order to focus on an aggregate identifier. For example, as the system is monitoring traffic, one identifier (like source IP address) may have so many distinct values that it could overwhelm the system, which could become a significant computational bottleneck. In effect, this could be a result of a malicious process attempting to overwhelm the system through IP spoofing (or similar). In order to overcome this possible vulnerability, the system could do its computations ignoring the problematic identifier and can even replace it with a more generic identifier that characterizes the diverse identifier (e.g., analyzing source virtual machine or VLAN instead of reported source IP).

Smart Enforcement of Policies
Summary

After detecting sources of undesirable traffic, a system can intelligently implement policies that will terminate the sources of undesirable traffic while keeping normal traffic running.

Elements of this disclosure can grant administrators (or an autonomous system) control of all network components down to a process level, so if an individual process is malfunctioning it can be shut down without a more extreme remedy that might disrupt other, functioning services.

Detailed Description
Smart Enforcement of Policies—

Detecting malfunctioning software or malicious activity within a private network can prove challenging. Although it is possible to implement rigorous security policies at every node in a network, such an approach is costly, complicated, and contributes to an undesirable amount of overhead. A system can be developed to monitor traffic as it flows naturally within the network, detecting and flagging irregular traffic.

The instant disclosure can be concerned with, once irregular traffic is detected and profiled, enforcing a policy to eliminate or at least mitigate illegitimate traffic. The system can block or disable an area of the network from which illegitimate traffic originates. For example, the system can tell a virtual machine to close a specific process, tell a hypervisor to shut down a virtual machine, tell a switch or router to block traffic from a certain hypervisor, etc. In some embodiments, the system can create policies that do not necessarily follow network topology. For example, the system can shut down virtual machines associated with a certain owner, processes associated with a particular publisher, etc.

This is possible because the system can have lightweight programs running on each network component (down to the VM-level) which can monitor traffic and kill sources of bad traffic if directed to.

Other policy enforcement regimes can be more involved. Because quarantining or shutting down illegitimate data sources may be over-inclusive and will likely take down legitimate resources, certain procedures can be implemented to preserve the functionality of legitimate resources. For example, if a healthy VM shares a hypervisor with malfunctioning VMs, it can be migrated before the hypervisor is shut down.

Before implementing a policy, the system can simulate the repercussions of the policy (based on discovered interdependencies). Based on specified criteria, the system can choose not to implement policies that would affect high-priority systems, favoring a less effective policy that would maintain functionality of the high-priority systems.

Intra-Datacenter Ddos Detection
Summary

A benefit of this system is that it does not require complicated rules and configurations; instead, it relies on establishing a baseline and comparing traffic to that baseline. Further, it has the ability to monitor and manage traffic at a process and virtual machine level.

Detailed Description

A distributed denial of service (DDOS) attack is where illegitimate traffic overwhelms a service, effectively shutting it down. Typically, these attacks come from a botnet or collection of botnets where each infected computer in the botnet is instructed to attack an individual machine or service. Various techniques are used to overcome these attacks, like using cloud-based services to accommodate the excess traffic, firewalls to filter requests related to improper ports or protocols, and "black holing" data by dropping all requests. These approaches are satisfactory for external traffic, but, because they are implemented on the periphery, are ineffective at combatting illegitimate intra-datacenter traffic. It would be too expensive to deploy firewalls throughout the datacenter and usually administrators want a way to solve the problem instead of weathering it.

The instant disclosure can be to monitor traffic at a process, virtual machine, hypervisor, top of rack, switch, etc. level, detect irregular traffic that might be indicative of a DDOS attack or a misconfigured machine, and take appropriate action. Irregular traffic can be discovered by developing a signature of normal traffic from a particular process/virtual machine/hypervisor/etc. and comparing it to current traffic. The signature can include packet count, byte count, service/host connection counts, TCP flags, port, protocol, port count, geo-location, user (of a process), process ID, etc. The signature can be created using statistics and analytics.

The signature can be a long-term distribution. For a given period of time (second, minute, hour, etc.) the system can record data pertaining to all of the above-listed parameters and include the data in a running distribution. Individual parameters can be analyzed independently, or aggregate values can be created by combining parameters. The system can then compare short term data to the long term distribution and determine how likely it is that the short term data describes illegitimate traffic. This determination can be calculated using a human created formula or through machine learning techniques. The system can present a system administrator with a confidence indicator that represents how likely it is that the traffic comprises illegitimate traffic.

When irregular traffic is discovered, a system administrator can be notified and presented with appropriate actions that should correct the irregular traffic. Actions can include shutting down the process or virtual machine, blocking traffic from the virtual machine (via the hypervisor), or blocking the port/protocol/subnet corresponding to the traffic. More advanced filtering can be applied according to the detected anomaly. For example, the system can detect that short packets sent to port X from subnet Y in China are anomalous traffic and can filter traffic that meets that criteria. The filtering criteria can be optimized to capture a limited percentage of legitimate traffic while capturing a high amount of illegitimate traffic.

The DDOS detection is done by running following three phases:

1. Typical traits—Stats during typical normal operations for EPG (manual configuration or derived through ADM), hosts, host pairs, flows, etc. The stats could, for example, include distribution of number of unique destination ports opened on a host/server in a fixed interval. We can keep (mean, variance), or hand-crafted buckets (for example, 1, 2-10, 11-100, 100+ for ports).

2. Anomaly detection—Detect when stats for a particular host, host-pair or flows are outside the normal range. For example, if a host typically has src ports in the 1 and 2-10 range, but the current batch saw src ports in 100+ range, this would be considered an anomaly.

3. DDOS detection through Aggregation—By aggregating anomalies from multiple hosts and host-pairs, we can detect a DDOS attempt.

Keys for the Table—

The table contains data for datacenter, EPG, host, host-pair and server-flows (src+dst+sr3port). We can use a single table for these. The idea is that we would aggregate anomalies from a lower granularity, along with stats to more confidently detect DDOS. For example, within an EPG, we would consider number of hosts reporting anomalies as well as stats for the EPG to detect that an EPG is under attack.

Values in the Table—

We would maintain a traits table in our BD pipeline, which would include following features: (1) packets: a. mean and std of num packets, looking at some flow stats, it appears that the distribution of log(packets) looks Gaussian, and hence we may keep the mean and std of log(packets), b. change in packets from last period; (2) bytes: a. mean and std of log(sent_bytes), log(receive4 bytes), b. change in bytes from last period; (3) number of client/server ports: a. Looking at stats from existing flows, it appears that distribution in the buckets (1, 110, 11100, 100+) would be interesting; (4) Connection rates: a. Number of unique connections in a unit time, b. Number of unique flows in a unit time; (5) number of unique hosts: a. Total number of unique hosts that given host communicates with; (6) Scan stats: a. Stats on stateless scans, b. Stats on stateful scans like SYN, RST, etc.

Network Vulnerability Quantification and Visualization

Summary

A vulnerability index can be calculated for various components of a data center (e.g., policies, EPGs, hosts, ports, etc.) based on historical flow attack data and other factors. Given a host that is determined to be vulnerable, we can map out other hosts to which the vulnerable host connects to/from and provide a GUI showing the vulnerability graph and the severity of the vulnerabilities.

Advantages include: able to quantify vulnerabilities of network objects; enable visualization of network vulnerabilities, including one or more vulnerable hosts and a graph of other hosts to which a vulnerable host can connect.

Detailed Description

The traffic monitoring system includes an abstraction called "vulnerability" that can be applied to policies, EPGs, hosts, ports, etc. This is different from the concept of "reputation." Reputation is only applicable to hosts, and determines what actions a host can take based on reputation. Vulnerability, on the other hand, quantifies susceptibility of the above objects to network attacks. Historical flow attacks are analyzed with respect to each of these objects to determine a vulnerability index (between 1 and −1) for each object. For example, the vulnerability index for a policy can be calculated based on the historical number of attacks that occurred when the policy was in force relative to when the policy was not in force. Likewise, the differences between attacks when a certain port was open are compared to when the port is closed using historical flow attack data. The vulnerability index for that port would be calculated based on the number of additional attacks that occurred when that port was open versus when it was closed. Other factors that may affect vulnerability are policy compliance/non-compliance, whether a policy is a whitelist policy or blacklist policy, whether certain applications are being run in the data center, whether a certain OS is used by a host device, etc.

The other component of the disclosure can be the ability to provide a vulnerability graph based on vulnerability indexes. Given a first host that is determined to be vulnerable, we map out other hosts to which the first host can connect to and determine the vulnerability indexes for those other hosts. The severity of vulnerability can be indicated by color (e.g., red) intensity so that we end up with a graph indicating vulnerability and severability of vulnerability in this sit. For example, suppose that a host is an authentication server and its vulnerability index is severe. In this situation, the entire network topology would end up bright red because of the authentication server potentially connects to/from every other host in the network. On the other hand, suppose that a host is a log server. The vulnerability graph may only comprise of that host because the log server doesn't connect to any other hosts, and is merely a repository for logs.

Microburst Detection

Summary

The disclosure can be directed to configuring the specification of an ASIC to have a faster granularity (100 milliseconds) for the detection of the max burst of the microbursts.

Detailed Description

The disclosure can be directed to configuring the specification of an ASIC to have a faster granularity (100 milliseconds) for the detection of the max burst of the microbursts. The generated flow report has a more detailed reading of the max burst of the microbursts generated in the network traffic detected by the ASIC, due to the higher granularity of the flow report.

Measurements Based on Sequence Number

Summary

This disclosure can be having a system detect a packet and determine, based on the packet's sequence number and payload size, what the sequence number of the acknowledgment should be.

Detailed Description

Processes can easily calculate a packet's round trip time (RTT) by measuring the time from when the packet is sent to when an acknowledgement is received. The present technology pertains to analyzing packets throughout the network to determine RTT and detect network degradation between two hosts. This can be accomplished without installing software on the sending or receiving machine, but by recording traffic at a hypervisor/slice/switch/router level.

Associating a sent packet with its acknowledgment can be difficult. The system can, by looking at the sequence number and packet size of the sent packet, determine the expected sequence number of the relevant acknowledgment. It can then calculate the time difference from the sent packet and received packet. If the acknowledgment is not detected or if the packet is resent, the system can determine that the packet was lost. The system can determine that a packet was resent if it observes a packet using the same sequence number.

It can be useful to have one device record when a packet is sent with a separate one recording when the acknowledgment is sent. Because it is difficult to communicate what acknowledgment to look for, acknowledgments can be recorded that cover the monitored sequence number. For example, if the last ACK number is An−1 and the current ACK number is An and the system is monitoring X, then it should record acknowledgments where An−1<=X<An.

In some cases, the system may see a series of sequence numbers that are well out of range. This may be indicative of a man-in-the-middle attack where a malicious program is "fishing" for the correct sequence number.

Although analyzing TCP sequence numbers will not account for all network traffic (other L4 traffic, like UDP will be ignored); TCP is a significant proportion of total traffic and the analysis should be representative. Based on RTT and packet loss rates, the system can develop an indication of network congestion and degradation.

Because analyzing every packet would be redundant and inefficient, the system can monitor every nth packet. For example, every 10,000th packet. Instead of counting packets to detect when the nth packet is sent, the system can choose a TCP sequence number or range and monitor the packet that includes that number. For example, the chosen packet can be greater than the packet's sequence number, but less than the packet sequence number+the number of bytes in the packet. Because the TCP sequence number space is 2^32, the system can increase the sampling rate by increasing the quantity of monitored numbers (i.e., the size of the range of sequence numbers).

Header Field Entropy

Summary

The disclosure can be to do entropy or pattern analysis on any of the packet's header fields. The header fields that have the most predictive patterns are the best to analyze and catalog. Therefore analysis of a packet that is outside the normal predictive header pattern gives an indication that the packet is a spoof and part of an attack.

Detailed Description

The disclosure can be to do entropy or pattern analysis on any of the packet's header fields. The header fields that have the most predictive patterns are the best to analyze and catalog. Therefore analysis of a packet that is outside the normal predictive header pattern gives an indication that the packet is a spoof and part of an attack.

An example of a predictive header variable is the ID packet. The ID packet is used to identify the packet. If the packet fragments, it can be put back together because each fragment has an ID packet. Furthermore the ID packet increments linearly. Given the packet is a part of the system, when the packet is traveling from the source to the destination, the ID packet behaves in a predictive pattern. The predictive pattern can be indexed. As such any received packet can be compared to the index to determine whether the packet has an ID packet outside the known pattern. Any ID packet outside a known pattern will raise notice about a potential attack.

Another example of a predictive header variable is the sequence number. The sequence number also increments linearly. So the system's packets all have a known predictive sequence number and can be indexed. As such any packet received packet can be compared to the index to determine whether the packet has a sequence outside a known pattern. Any sequence outside a known pattern will raise notice about a potential attack.

Ttl Changed

Summary

Detection of a change in TTL of a packet received is generally associated with an attack or potential attack. Indexing all known system TTLs can be used to determine any deviations of TTL in a packet.

Detailed Description

The disclosure can be directed to entropy or pattern analysis on any of the packet's header fields. The header fields that have the most predictive patterns are the best to analyze and catalog. Therefore analysis of a packet that is outside the normal predictive header pattern gives an indication that the packet is a spoof and part of an attack.

An example of a predictive header variable is the ID packet. The ID packet is used to identify the packet. If the packet fragments, it can be put back together because each fragment has an ID packet. Furthermore the ID packet increments linearly. Given the packet is a part of the system, when the packet is traveling from the source to the destination, the ID packet behaves in a predictive pattern. The predictive pattern can be indexed. As such any received packet can be compared to the index to determine whether the packet has an ID packet outside the known pattern. Any ID packet outside a known pattern will raise notice about a potential attack.

Another example of a predictive header variable is the sequence number. The sequence number also increments linearly. So the system's packets all have a known predictive sequence number and can be indexed. As such any packet received packet can be compared to the index to determine whether the packet has a sequence outside a known pattern. Any sequence outside a known pattern will raise notice about a potential attack.

In some circumstances, a detected packet with a header variable outside the known predictive pattern of the header variable almost always man an attack is or has occurred. In these circumstances the header variable is very predictable. There is no need for pattern analysis of the packet's header variables. Any detected deviations in these types of predictable header variables are generally associated with an attack or potential attack. One type of this predictable header variable is the time to live (TTL) header variable. Every packet has a limited life span and each of the known system's packets will each have their own TTL. Within the data flow between two logical entities, generally there will be a known type of packet. Indexing all known system TTLs can be used to determine any deviations of TTL in a packet. Any deviations of TTL will generally be associated with an attack or potential attack.

Profiling a Host Based on Sent Packets Histogram

Summary DETAILED DESCRIPTION

The present disclosure pertains to monitoring and identifying illegitimate traffic within a network. Specifically, a system can look at packet sizes and count how many packets of different size ranges a specific host has sent. As the system accumulates data, it can develop a signature for the host. Instead of keeping track of each piece of data, packet size lengths can be aggregated (i.e., 400 packets of size 0, 200 of size between 1-100, etc.). Once a host has been profiled, the system can compare the host's signature with a database of signatures and determine if the signature is similar to a malicious host's signature. For example, a malicious host may send a large number of empty or single byte packets while a legitimate host might send a larger number of large packets.

The system can also analyze the signature and predict what type of communication is taking place to better profile the host. For example, an even distribution of packet sizes may be indicative of one type of communication while a narrow distribution may be indicative of another type of communication. This approach is highly scalable because it does not need to account for every packet sent, just a sampling of them.

While packet size is one metric that the system can use to profile a host, other metrics are equally useful in developing a signature of a host. For example, TCP header option and receive window can also be monitored. Because TCP header option is typically only used by illegitimate traffic, the more it is used the more likely traffic is illegitimate. A reduced window can show congestion and can assist in performance and monitoring.

Flow Anti-Aliasing

Summary

Detailed Description

As discussed, a flow is conventionally represented as a 5-tuple comprising a source address, destination address, source port, destination port, and protocol. There are limitations to this conventional approach of representing flows because separate flows having the same 5-tuple may be created in quick succession such that the separate flows are identified as part of a same flow. Further, over time, separate flows having the same 5-tuple will be created such that separate flows may be indexed as part of a same flow when analyzing aggregate flows over a window of time. Traffic monitoring system resolves these issues by using a flow start time as part of a key of a flow. Thus, a flow key in Traffic monitoring system includes source address, destination address, source port, destination port, protocol, tenant id, and a starting timestamp to uniquely identify a flow. This solves the aliasing problem used by conventional approaches, such as Netflow, which aggregate packets having a same source/destination IP address, source/destination ports, protocol that are not necessarily part of a same flow.

The traffic monitoring system continuously collects flow data from all of the sensors in a data center and determines unique flows over a window of time.

For UDP flows, timeouts are used to distinguish between separate, successive flows that may have a same 5-tuple. Let us assume that the sensor data indicates that there is a first UDP flow with a particular 5-tuple. After a specified period of inactivity, the sensor data indicates that there is flow data corresponding to the particular 5-tuple. A second UDP flow is then instantiated using a new flow start time to distinguish from the first UDP flow.

In TCP flows, TCP hand-shake information is analyzed to distinguish separate, successive flows that may have a same 5-tuple. For example, the three-way hand-shake can be used to identify the start of the TCP flow, and the four-way hand-shake can be used to identify the end of the TCP flow.

Tcp State Tracking Outside of a Host Device
Detailed Description

The traffic monitoring system data pipeline does not receive every packet forwarded in a data center but instead receives summaries of flows that include information such as source/destination address, protocol, number of packets in a flow, number of bytes in a flow, TCP flags, etc. With only Summary views and even without packets, the traffic monitoring system data pipeline can nevertheless track TCP state, such as whether a particular TCP flow is a re-transmission or a new flow.

The traffic monitoring system pipeline receives a Summary view and locates within the Summary each TCP handshake to determine whether the handshake corresponds to a re-transmission or a new flow. This can be accomplished by analyzing traffic unidirectionally. That is, we track half of the TCP state based on TPC flags from egress traffic to a host, half of the TCP state based on TCP flags from corresponding ingress traffic to the host, and keep a reconciled view of the two half-states. These three different states are maintained for every flow for tracking TCP state via Summary views.

Flow De-Duplication
Summary

Advantages include: (1) multiple sources of flow data for a single flow are collected but de-duped/compressed/summarized such that the big data pipeline analyzes single flow data for the flow, potentially reducing the data to be analyzed by the big data pipeline by 1/6; (2) the flow data is aggregated based on the sensor data determined to be most reliable, therefore the big data pipeline analyzes the most accurate data for a flow.

Detecting use: product documentation, UI, claims that a product provides best flow data from multiple views.

Detailed Description

In the traffic monitoring system, sensors are placed at each VM, hypervisor, and switch of a network in order to monitor traffic. As a result, multiple sensors will report flow data on a same flow but from different perspectives (i.e., source/destination VMs, source/destination hypervisors, switches, etc.). We don't want to process all this redundant data, and therefore need approaches for de-deduping redundancies prior to feeding a single flow object to our big data pipeline.

In some embodiments, data for a single flow is collected from a sensor determined to be the "best sensor" for collecting data regarding the flow. The best sensor may be sensor that provides the best view (e.g., most packets sensed) of a flow.

In other embodiments, data for a single flow is reconciled at a packet level based on the multiple flow data collected for a single flow. For example, a single flow could be represented as any, non-duplicative packet sensed by all of the sensors collecting flow data for the flow.

Other reconciliation algorithms can also be used for consolidating a single flow data object for a flow.

Selective Packet Capture
Summary

Advantages include: (1) can capture packets based on contextual information that is not contained in packet data (e.g., host/machine information, flow attributes, policy compliance/non-compliance, etc.); (2) provides for event-based packet capture; (3) gives users the ability to define their own criteria for which packet capture should be invoked.

Detailed Description

The traffic monitoring system generally collects flow data but this Summary data may not necessarily provide sufficient information to troubleshoot a network anomaly. Thus, one of the features of the traffic monitoring system is to enable packet capture according to Traffic monitoring system-defined rules or custom rules. For example, suppose that a flow is recognized as a malware spoofer based on the flow corresponding to a particular traffic pattern. The user can then request that packets corresponding to the pattern be captured the next time the pattern appears in the network. In this case, the pattern is a Traffic monitoring system-defined algorithm/rule. However, the user can also define custom rules that invoke packet capture.

The traffic monitoring system UI also enables a user to invoke packet capture for a specific host or rules based on host/machine information, such as process string, user name, time of process, etc. Similarly, users can invoke packet capture based on other attributes of a flow collected by the traffic monitoring system, such as type of attack, geography, policy compliance/non-compliance, etc.

When packets are captured, the packets will be associated with a flow. The traffic monitoring system can then provide a more granular view of such flows, i.e., packets of a flow.

Unique Sensor Id Creation
Detailed Description

As a network system monitors traffic to detect security threats, the most effective attacks attempt to compromise the monitoring system first. In a system that contains multiple "sensors" reporting traffic flows from various nodes around the network, an attacker might attempt to create fake sensors to manipulate reports in order to mask illegitimate traffic or overwhelm the system with false reports.

After a sensor is installed on a virtual machine, the sensor can contact a control server with some of its attributes (hostname, MAC address, BIOS_UUID, etc.). The BIOS_UUID is part of the bios for the host VM. The control server utilizes a one-way hash function of the BIOS_UUID and a secret key; the result of this function is then sent to the sensor as a sensor ID.

Subsequent communications from the sensor utilize this sensor ID. The traffic monitoring system backend can verify that the sensor is valid if its ID matches the hash of the BIOS_UUID and the secret key.

For purposes of authentication, non-repudiation, and integrity, each sensor is assigned a unique key (signed certificate). The sensor can use a signed certificate for communications with the traffic monitoring system backend.

A system thus configured can easily migrate sensors around the network because they will remain the same virtual machine, and thus their sensor ID (which is a function of the VM bios) will remain the same. If the VM is cloned, it will have a new BIOS_UUID and the sensor will need to acquire a new ID.

Analyze Dhcp for Flow Analysis

Summary

The present technology collects additional information, besides source and destination IP addresses, source and destination port numbers and protocol, from network packets to conduct network traffic analysis. The additional information may include a transaction ID generated during a DHCP process, and MAC address (i.e., physical address of a corresponding node). Network traffic can then be uniquely identified for a meaningful analysis.

Detailed Description

The present technology collects additional information, besides source and destination IP addresses, source and destination port numbers and protocol, from network packets to conduct network traffic analysis. The additional information may include a transaction ID generated during a DHCP process, and MAC address (i.e., physical address of a corresponding node). Network traffic can then be uniquely identified for a meaningful analysis.

In some embodiments, uniquely identified network traffic can be analyzed for network management and security control.

Analyze Multicast for Flow Analysis

Summary

The present technology collects additional information from multicast packets from a group node to interested user nodes. The additional information may include unique IP address of a corresponding user node receiving the multicast packets from the group node. Network traffic can then be uniquely identified for a meaningful analysis.

Detailed Description

The present technology collects additional information from multicast packets from a group node to interested user nodes. The additional information may include unique IP address of a corresponding user node receiving the multicast packets from the group node. Network traffic can then be uniquely identified for a meaningful analysis.

In some embodiments, uniquely identified multicast packets can be analyzed for network management and security control.

Collapsing and Placement of Applications

Summary

The disclosure can be directed to an application dependency map visualized in a collapsible tree flow chart. The tree flow chart is collapsible and displays the policies/relationships between each logical entity that carries a multi-tier application. The collapsible multi-tier application UI displays the data flows of a multi-tier application.

Detailed Description

The disclosure can be directed to an application dependency map visualized in a collapsible tree flow chart. The tree flow chart is collapsible and displays the policies/relationships between each logical entity that carries a multi-tier application. The collapsible multi-tier application UI displays the data flows of a multi-tier application. A multi-tier application can have various aspects of the application running on various hosts. The UI displays the hierarchy and policies or dependencies between each logical entity running the application. The UI is collapsible allowing the user to drill down on any node/logical-entity representing hosts, databases or application tier. By making the UI collapsible, it allows for a more consumable UI.

The UI displays various nodes and interacting with a node will show an exploded view of that node. A node is any logical entity. For example, any application's tier of the multi-tier application, database tiers, and host tiers. The exploded view of the node will explode new nodes that have edges connecting the new nodes with the exploded node. The edges represent policies between the new nodes and between the new nodes and the exploded node. For example, the original node can be a host running the application. The exploded view displays new nodes. The new nodes represent all neighbors the host communicates with. The new nods are usually exploded right of the exploded node to demonstrate the hierarchy between the logical entities.

The collapsible tree flow chart uses the data gathered from the traffic monitoring system layer. Data used and made visible in the collapsible tree flow chart are (1) data flows from one logical entity to another logical entity; (2) the policies that govern the data flows from one logical entity to another logical entity; (3) what host the data flow came from; (4) what host group the data flow came from; and (5) what subnet the data flow came from.

The UI is customizable. User can select elements to adjust subnet groupings and cluster groupings. Additionally the user can upload side information. Examples of side information are DNS names, host names, etc.

Collapsing and Placement of Attack Neighbors

Detailed Description

The disclosure can be directed to provide visibility of an attacked logical entity's neighboring logical entities that have been attacked or vulnerable to attacks. Such a UI can help the user determine which neighboring logical entity to isolate or to closely monitor. Business criticality is a good indicator for which neighboring logical entity should be isolated and/or monitored more closely.

Business criticality is the best metric since it is enterprise adaptable. For example billing. In another example, for a finance enterprise, logical entities with dataflows of data including cadence files are less important than excel spreadsheet data files. Ideally business criticality can be determined not invasively to the enterprise (either for privacy issues or because the data is encrypted anyway). Inferring business criticality can be based on identifying the type of data, the source of the data, and the destination of the data. Identification of the type of data, the source of the data and the destination of the data flow can be done through analysis of data gathered from the traffic monitoring system layer. Traffic monitoring system analysis (through the software/code sensors) can map the host ports to to determine what process the flow is coming from to see what application the data stream is originating from. Furthermore, the traffic monitoring system layer can be analyzed to determine hosts the data flow came from, what host group the data flow, and what subnet the data flow game from, what host port the dataflow came from, what application the data stream is originating from, and the policies governing those flows. For example, spreadsheet data flowing from a server from a financial enterprise will be more important than sound data flowing from another server.

Business criticality is inferred, as such, it is an administrator who categorizes the enterprise and it is the analysis of the data in the enterprise that determines business critical logical entities. A logical entity carrying the application of interest and the application of interest are both ranked in terms of what is more business critical. Therefore sound data from a finance enterprise is ranked lower and so the host carrying that application is also ranked lower. Spreadsheet data from a finance enterprise is ranked higher and so the host carrying the application producing spreadsheet data is also ranked higher.

The UIs radial configuration can display the most important neighboring logical entities that require the users attention. For example, the radial layout can be of the 10 most vulnerable to attack or most severely attacked neighboring logical entities. Business criticality as the base metric of will bubble up the most important neighboring logical to monitor/isolate first. Additionally, other tie-breaking metrics can be applied when two business critical logical entities are ranked similarly in importance. Examples of tie-breaking metrics can be the vulnerability to attacks, redundancy, etc.

Currently, UIs of this nature has a radial configuration displaying the attacked or vulnerable neighbors and the logical entity of interest (patient zero of the attack) in the middle of the configuration. However given the number of logical entities that one logical entity communicates with, the UI can be very difficult to consume.

[1]

Geo with Network Database and Geo Visualization

Summary

The disclosure can be directed to mapping flow data and overlay it on a geographic map. Furthermore the geographical map can also display attacks and the flow of an attack from the source to a logical entity. The map additionally be accompanied with a pie chart relating to the attacks and intensity of attacks.

Detailed Description

The disclosure can be directed to mapping flow data and overlay it on a geographic map. The a part of the data gathered from the traffic monitoring system layer are attributes of a dataflow. One attribute of the data flow can be the geographic location or positioning of the flow of data traveling from one logical entity to another logical entity. Mapping this data on a geographical map shows visualization of data flowing from one logical entity to another. Furthermore the geographical map can also display attacks and the flow of an attack from the source to a logical entity. Intensity of the attack or counts of an attack can also be shown. The map additionally be accompanied with a pie chart relating to the attacks. The pie chart can show depth to represent the severity of the attacks. The pie chart can also be organized to show which attacked logical entity is ranked higher in importance.

Network Monitoring and Analytics System

Detailed Description

This network monitoring system can comprise sensors, collectors, an analytics module, and a presentation module. Sensors can reside on every node and component of the data center (e.g., virtual machine, hypervisor, slice, blade, switch, router, gateway, etc.). Sensors can monitor traffic to and from the component, report on environmental data related to the component (e.g., component IDs, statuses, etc.), and perform actions related to the component (e.g., shut down a process, block ports, redirect traffic, etc.). Sensors can send their records over a high speed connection to the collectors for storage. The collectors can be rack mounted servers placed on each row of the data center specially designed to handle large datasets and provide high throughput. By analyzing data stored in the collectors, the analytics module can determine network topology, detect dependencies, check network health, and detect anomalies. The presentation module can provide a UI wherein a user can intuitively navigate data from the collectors and the insights produced by the analytics module.

An Adm Pipeline to Generate Communication Graph

Summary

Flow data and process information for each node of a computing network is collected. Each node is then represented by one or more vectors using such data. Nodes in the computing network can be grouped into cluster based upon similarities between the nodes. The clusters can be used to generate communication graph.

Detailed Description

One advantage of generating communication graph is that it can help discover similar nodes. In order to generate communication graph, information needs to be collected, e.g., communication between nodes in a normal setting. In addition, the communication graph built from the network flow data has other uses: it provides visibility into the network, and makes the task of building application profiles substantially more efficient.

In some embodiments, a policy is built from a clustering as follows: for each observed edge (communication) from a node in cluster A to a node in cluster B, on server port C, a ('white-list') policy is introduced such that any node in cluster A can communicated with any node in cluster B on server port C.

The ADM pipeline from a high level can be: network and process data+side information→graph and vector construction→similarity computation and clustering→policy induction and UI presentation/interaction.

User feedback from the UI can repeat this process (ie, re-run the pipeline). User feedback is incorporated into the side information.

Generating Vectors for Nodes in a Computing Network

Summary

Flow information for each node of a computing network can be collected over a period of time. This information is used to generate a communication graph (where client and served nodes are connected via directed edges). One or more vectors can be constructed for each node based upon the communication graph.

Detailed Description

Machines (nodes) with sufficiently similar vectors (network/graph edges or neighbors) can be grouped into a cluster. A vector for a given node A can be constructed as follows.

If node B is a client of node A on port C, then create the feature (string) 'Serves_2on_port_C' (B and C can be IP addresses). If node A is a client of node D on port E, then create the feature 'Client_of_4on_port_E' (in general, create a unique string based on the IP and port combination). Each such string is dimension. Another node G has the same feature (eg 'Serves_2on_port_C') is similar in this respect (dimension) to node A. The value of a feature can be Boolean (0 or 1), or reflect 'persistence' (number of time snapshots the connection is seen) or amount of traffic seen on that link (e.g., log number of packets sent in the time span in which the flow data was gathered).

There are a number of variations. For example, vector types can be based solely on server ports, or solely based on destination addresses (IPs). The set of vectors can then be post-processed, such as (frequent) feature pruning, tfidf re-weighting, and l2-normalization. These steps can improve similarity computation.

Frequent feature computation: features that have a positive value in a large fraction of vectors (such as above 30%) can be dropped from all vectors (i.e., unless dropping them creates 0 vectors, they are sole features for some nodes). Similarity computation can be improved by pruning frequent features.

In some embodiments, standard tfidf re-weighting can be applied, and then the vector is l2 normalized.

In some embodiments, the encoding of neighbors together with server ports and persistence and/or amount of traffic can be used as weighted features. Post processing of the vectors, such as tfidf transformation and l2 normalization can be used to improve subsequent tasks (similarity computation and clustering).

Generate Vectors Based on Processes Running on Computing Nodes

Summary

Process information may include full paths of executables and their parameters, user ids and user names, and used to cluster nodes in a computing network. Features can be extracted from the corresponding process information, and turned into a vector.

Detailed Description

In some implementations, user name and process information (eg. executable path) can be concatenated. A machine with user name A and process /bin/P, may have the feature "1ran_bin/P".

In some embodiments, the encoding of ps (process) information, including process full path and user name, can be used as weighted features. The vector can be l2 normalized vectors, such as tfidf transformation and l2 normalization to improve subsequent tasks (e.g., similarity computation and clustering).

Improved Adm Pipeline

Summary

Information, such as subnet masks and load balancer (SLB), can be used to partition nodes of the computing network. The collapsing of different IPs to a common tag, such as a subnet mask, can improve similarity computation, and clustering accuracy. In some embodiments, bad traffic can be filtered out using classifiers and signature-based models (security based algorithms) to prevent such data from being imported into an ADM pipeline.

Detailed Description

Information, such as subnet masks and load balancer (SLB), can be used to partition nodes of the computing network. For example, nodes from different subnet masks may not be partitioned into the same cluster. Since similarity computation and clustering involve pair-wise and therefore O(n^2) computations (given n nodes), the subnet mask and SLB information can be used to substantially reduce the pipeline run-time, e.g., from hours to minutes, or days to hours and/or require significantly less computing resources.

Subnet masks and partitions can also be used to replace IPs with tags in feature encoding (e.g., vector construction). The collapsing of different IPs to a common tag, such as a subnet mask, can improve similarity computation, and clustering accuracy. The information can also be used to improve clustering accuracy which in turn affects policy induction (as policies are based on clusters).

Furthermore, many networks already contain unwanted traffic (e.g., in the form of DDoS attacks and port scans). It's desirable to avoid inputting such unwanted traffic into a pipeline to generate a communication graph. Otherwise, policies generated from the communication graph may allow such unwanted traffic. One solution is to filter out likely bad network traffic before such data is imported into the ADM pipeline. Bad traffic can be filtered out using classifiers and signature-based models (security based algorithms).

Generating an Optimized Number of Clusters Using a Minimum Description Length (Mdl) Approach Summary A suitable number of clusters of nodes in a computing network can be determined by using of the Minimum Description Length principle, or MDL. A MDL score can be determined based on a directed communication graph, which may include client nodes, server nodes and server ports, and an algorithm for MDL score optimizations in the presence of multiple partitions.

Detailed Description

An optimized number of clusters of nodes in a computing network can be determined by using of the Minimum Description Length principle, or MDL. A MDL score can be determined based on a directed communication graph, which may include client nodes, server nodes and server ports, and an algorithm for MDL score optimizations in the presence of multiple partitions.

According to MDL, an optimized theory (model) for a body of data is the one that minimizes the size of the theory plus the amount of information necessary to specify the exceptions relative to the theory.

In this example, an edge is a communication from source (client) node to destination (server) node using a (server) port.

Computing the MDL for a Clustering:
for all the observed edges (for the time-span in which a network was monitored and data was collected), find the assigned source cluster, src cluster, and dst (destination) cluster. (Note each node is belongs (or is assigned) a unique cluster in a clustering, where a cluster is simply a non-empty set of nodes).
for each src cluster*dst cluster*port combination:
Let obs=the count of unique src nodes*dst nodes (=number of observed edges)
Let unobs=the number of unobserved edges (number of nodes in the src cluster*number of nodes in the dst cluster—the observed edges)
the description length is the min of (obs, (1+notobs))
MDL of a clustering is the sum of the description lengths across all src cluster*dst cluster*port combinations (Note: in some implementations, the lower the MDL score is, the better the clustering in a computing network)
Handling choice of (best) clustering when there are multiple (node) partitions. [NOTE: this is a contribution too.]

In a computing network, there may be multiple node partitions (based on routing information, and subnet masks), where clusters cannot span multiple partitions, i.e., a cluster may not contain nodes that belong to different partitions.

However the choice with optimized clustering in one partition can affect the choice of best clustering in another, because nodes from different partitions communicate with one another, and the MDL criterion may depend upon the communications (edges).

The MDL scores (for example, the one given above), can be used to improve the number of clusters for each partition by using a randomized local search algorithm based upon local searches.

For the algorithm below, it can be assumed that each partition, for each k (1<=k<=number of nodes in partition), a clustering (e.g., via the kmeans algorithm) has been computed. n is total number of nodes.

Algorithm:
Assign an initial selected k, say k=n/3, for each partition.
  This choice of clustering for each partition is the 'current state'.
    calculate the MDL metric for the current state (current energy)
  Repeat for n iterations (or until the change in energy is smaller than a delta)
    in each iteration, go through the partitions in a random order
      for each partition, go through all clusterings (choices of k), compute MDL for it, and pick best k.
      assign the new state as the current state with this new value of k for this partition. Calculate the MDL score (new energy) given the new k for each partition.
  If new energy is better than current energy, then assign new state to current state and new energy to current energy.
NOTE: nodes that are not assigned a cluster (because they don't have edges) are assigned to their own 'singleton' clusters.

In some embodiments, a MDL score can be determined based on a directed communication graph (client nodes and server nodes and server ports), and an algorithm for MDL score optimization in the presence of multiple partitions.

Generating an Optimized Number of Clusters Using a Silhouette Score

Summary

An optimized number of clusters of nodes in a computing network can be determined by using a Silhouette score. A clustering can be determined via the kmeans clustering algorithm with a fixed k. The silhouette score of the clustering is the average silhouette of each node (defined next): 1/n sum_(node A) silhouette(A), where n is the total number of nodes.

Detailed Description

An optimized number of clusters of nodes in a computing network can be determined by using a Silhouette score. A clustering can be provided (e.g., via the kmeans clustering algorithm for some fixed k). The silhouette score of the clustering is the average silhouette of each node (defined next): 1/n sum_(node A) silhouette(A), where n is the total number of nodes.

Silhouette of a single node: Let sim=sim(node) be the average similarity score of the node to other nodes in its assigned clusters, and let sim'=sim'(node) be the average similarity score of a node to another closest cluster (the cluster with highest sim', i.e., average similarity value).

A similarity score between two nodes may be based on cosine similarity, jaccard similarity, and so on. Note that we assume a similarity matrix is provided. Then silhouette of the node can be defined as either:

$$\text{silhouette(node)}=(\text{sim}-\text{sim}')/\text{Max}(1-\text{sim},1-\text{sim}'), \text{ or} \qquad A.$$

$$\text{silhouette(node)}=(\text{sim}-\text{sim}')/\text{Max}(\text{sim},\text{sim}') \qquad B.$$

Remarks:
Choice A favors clusters that are cohesive while choice B favors clusters that are well separated. In some implementations, choice A is often favored in current network clustering applications.
A noise constant can be added in the denominator to down-weigh small similarity scores and small differences in silhouette.

The above definition is undefined for singleton clusters, i.e., clusters with a single node. Modeling singleton clusters is important as many partitions can be relative small and clusters with a single node in them can be common.

Such cases can either assign 0 silhouette for such nodes, or assign a positive silhouette equal to some certain percentile (e.g., 10 percentile) in pairwise similarity scores among nearest neighbors (for each node, collect the similarity score to its closest other node, and compute the p'th percentile in that population). A user can change the percentile to obtain and explore different number of clusters.

For a single cluster (when k=1) sim' is defined as 0.

In some embodiments, a 1—similarity can be used in the silhouette formula to obtain cohesive clusters, and generalize silhouette to singleton clusters, based at least upon the value of a singleton on a percentile of nearest similarity scores.

Extracting and Displaying Informative Summaries on a Ui

Summary

Nodes and clusters in a computing network can be summarized by displaying their 'attributes' in a ranked list. Each node can have one or more vector types. A tfidf computation can be performed to reweight attributes by a measure of their informativeness for a node. Each cluster can be represented by a single vector. A tfidf post-processing can be performed on the vector.

Detailed Description

Nodes and clusters in a computing network can be summarized by displaying their 'attributes' (features) in a ranked list. Each node can have one or more vector types, i.e. vectors extracted from network communications and/or process-based features. A tfidf computation (tfidf is an information retrieval technique) can be performed to reweight attributes by a measure of their informativeness for a node. A similar algorithm can be performed on clusters (each cluster can be represented by a single vector, then tfidf post-processing can be performed on such set of vectors).

By ranking and showing only the top few (tfidf-weighted) features, the most informative of a node's (or cluster of nodes') communications or processes (or user names, etc) can be displayed. The percentiled weight of the feature can also be displayed to provide more context on the informativeness of a feature.

A similar process of percentiling can be applied to node-pair similarities, when displaying the closest (most similar) neighbors of a node in the similarity space (similarity based on communications or processes).

When a user re-runs an ADM pipeline (after editing clusters, changing dates of data capture to run the pipeline on, etc), what has been changed in the final clusterings may be important for the user. Any two re-runs (their output clusterings) can be compared, where the two clusters are first matched by a matching algorithm (this can be done greedily, using matching scores such as Jaccard), and a Summary of changes in the clusters (nodes added/deleted), from one run to another, is shown in the UI.

Some embodiments extract an informative attributes from nodes and clusters and present the top few (or in ranked order) to a user as a means for summarizing an entity (node or cluster of nodes). In some embodiments, what has been changed in the clustering from one run to another run, can be summarized by matching clusterings and reporting a Summary of the changes.

Fusion of Multiple Signals for Clustering

Summary

The present technology can use multiple feature types and suitable algorithms to get better clustering accuracy in the network domain. For example, an algorithm can be applied based upon percentiles for fusing similarity matrices, or for intermediate clustering fusion.

Detailed Description

Clustering accuracy can be improved using various types of information collected in a computing network. The present technology can use multiple feature types and suitable algorithms to get better clustering accuracy in the network domain. For example, an algorithm can be applied based on percentiles for fusing similarity matrices, or for intermediate clustering fusion.

In some embodiments, 'early' fusion (i.e. create one vector, as a union of all vector types) can be performed. Early fusion may work well for feature families that are similar (e.g. TCP and UDP vectors, both being communication), but the signal may get weakened/lost if distant feature families (e.g. process-based features and communication-based features) are put together.

In some embodiments, two or more clusterings can be obtained using different signals and then fused to obtain a single clustering using certain ensemble clustering techniques. One ensemble technique would use a disjunction or a conjunction of pairs in different clustering in deciding whether a pair should be put into the same cluster. Disjunction can lead to large and few clusters, and conjunction can have an opposite effect.

In some embodiments, an 'intermediate' fusion can be performed by fusing a matrix of pair-wise similarities. Assume there are two or more pair-wise similarity matrices. The similarity scores can be mapped to percentiles, then the two or more matrices can be combined (e.g., averaged) to obtain a single pair-wise similarity matrix. A clustering algorithm, such as affinity propagation, can then be run on the combined similarity matrix. Percentiled conversion of scores can be useful since different matrices can have different similarity scores distributions (ranges), and simple averaging can under-perform. The percentiling may be used only on the top (nearest neighbor) similarity scores. A weighted averaging can also be used, in which weights may be user-specified (e.g. communication matrix may have more weight than process matrix) and are obtained from automated cluster evaluations, such as clustering silhouette scores.

Automated Naming of Clusters Generated in a Computing Network

Summary

The present technology automatically determines and assigns informative names to clusters in a computing network. A name of a cluster may be determined based at least upon one or more attributes shared among members of the corresponding cluster or source information. For example, the members of a cluster may share a substring in their host names or IPs. These sources of information can be used to automatically extract an informative name for the cluster. Informative names assigned to clusters may greatly enhance a user experience and improve a user-interaction efficiency and visibility to the computing network.

Detailed Description

The present technology automatically determines and assigns informative names to clusters in a computing network. A name of a cluster may be determined based at least upon one or more attributes shared among members of the corresponding cluster or source information. For example, the members of a cluster may share a substring in their host names or IPs. These sources of information can be used to automatically extract an informative name for the cluster. Informative names assigned to clusters may greatly enhance a user experience and improve a user-interaction efficiency and visibility to the computing network.

In some embodiments, a common long prefix from hostnames of members of a cluster can be determined using a computing algorithm. If the prefix satisfies certain criteria (e.g., a length or commonality among the members), the prefix can be extracted and used as a name for the cluster. If processing hostnames have failed to create a sufficiently long common prefix, the commonality among IP addresses of members of a cluster can be determined and used for naming the cluster.

In some embodiments, discriminative features in communication patterns or processes can be extracted and used as a source for naming or removing naming collisions.

Some embodiments resolve naming collisions for clusters that have identical names automatically extracted from attributes among members or source information. In some embodiments, a unique count can be added for each collision (increment the count) to remove collisions. In some embodiments, other discriminative attributes (from other feature types), possibly iteratively, can be used to remove collisions.

Re-Generate Adm Pipeline Incorporating User Feedback and Corrections

Summary

A user interface (UI) is provide with options for a user to adjust parameters in generating clusters (e.g., adding or removing nodes) in a computing network or changing dates for data collection, etc. An ADM pipeline can be re-generated by incorporating user feedback and/or other changes.

Detailed Description

A variety of options may be provided for a user to input a feedback. For example, an option can be provided for the user to preserve certain clusters when an ADM pipeline is re-generated. This may reduce computation of clustering when the ADM pipeline is re-generated since there are fewer nodes to be clustered. Further, similarity scores that are determined based on communications may be improved. During feature encoding, those preserved clusters preserved by the user can be treated identically. For example, if node A talks to C and node B talks to D, and both C and D are in the same preserved cluster, it can be concluded that A and B are similar in that respect. On the other hand, in non-preserved clusters, A and B would appear different in that respect.

There are a variety of options to enable a user to incorporate, influence and shape clustering of a communication graph in a computing network. For example, a knob may be provided on the UI for the user to select a desired number of clusters. Generalizations may also be a possible option for a user to add nodes to a cluster, but no node can be removed.

Server-Client Determination

Summary

The present technology extracts various features (e.g., attributes/properties) of both ends of a connection in a computing network to determine a machine learned classifier or a hard-coded rule. The machine learned classifier or the hard-coded rule can be used to determine which end of an IP and port pair is the server. Further, graph consistency techniques and historical data can be used to improve the accuracy of a server determination.

Detailed Description

Assume the degree of an IP-port pair is the number of unique IP-port pairs with which the pair participated in a communication. In some embodiments, a pair with a higher degree can be selected as a server pair for a given communication.

In some embodiments, the magnitude of a port (e.g., ports are positive integers) can provide an additional feature to improve the accuracy of a server determination.

In some embodiments, sensor timing information in a communication network can also be used to determine which end is likely the server.

In some embodiments, known connections (i.e., known server ports in these connections) can be used to train machine learned classifiers using features derived from these connections (e.g. magnitudes of ports or differences in degrees). For many TCP connections, labels can be provide by sensors in the computing network and used to manually label some connections.

Discovering Causal Temporal Patterns

Summary

The present technology determine causal temporal patterns in a computing network based upon various attributes of network flows, such as server port, packets sent, processes involved in the communications, and timing information when data is exchanged (e.g., flowlets) is recorded (per host).

Detailed Description

The present technology determine causal temporal patterns in a computing network based upon various attributes of network flows, such as server port, packets sent, processes involved in the communications, and timing information when data is exchanged (e.g., flowlets) is recorded (per host).

In some embodiments, event co-occurrences can be analyzed within time windows for each host to determine sequential patterns. For example, for requests from host A on a port of host D, host B either becomes a client of host D or host F for 50% of the requests.

In some embodiments, algorithms for determining temporal patterns can also be used to remove noise and co-incidences, be robust to non-deterministic relations, as well as discover and remove periodic events, and be scalable (both memory & time efficiency).

Ui-Adm: Parallel Collapsible Chord Chart for Adm

Summary

The disclosure can be directed to a user interface (UI) for an application dependency map (ADM) in the form of a collapsible core chart.

Detailed Description

The disclosure can be directed to a user interface (UI) for an application dependency map (ADM). The map is in the form of a chord chart. The chord chart uses the data gathered from the traffic monitoring system layer. Data used and made visible in the chord chart are (1) data flows from one logical entity to another logical entity; (2) the policies that govern the data flows from one logical entity to another logical entity; (3) what host the data flow came from; (4) what host group the data flow came from; and (5) what subnet the data flow came from. Visualizing flow data between logical entities can help determine adjustments needed to be made to the policies between the logical entities.

The chord chart displays bi-directional policies (relationships) between logical entities at various hierarchies. A logical entity can be a subnet, a cluster (a group of hosts) or an individual host. A user can interact with the chord chart to dynamically drill down various hierarchies of data flows between logical entities. By making the chord chart collapsible and expandable a large volume of information is more consumable. The chord chart is collapsible at the various levels of hierarchies (unless at the lowest level) and expandable (unless at the highest level). At the second and lowest level the expanded portions display indicators to inform the user of the previous (last highest level of hierarchy).

The hierarchies are based on similarities of hosts. The hierarchies are as follows: (1) at the highest level—subnet (groups of clusters of hosts); (2) at the second level—clusters (groups of hosts); and (3) at the lowest level—individual hosts.

Furthermore the chord chart is customizable. Users can select elements to adjust subnet groupings and cluster groupings. Additionally the user can upload side information. Examples of side information are DNS names, host names, etc.

There are chord chart type products out there already, however, they are not in the network context. For example, there is a chord chart that maps US Migration patterns of animals.

Business Criticality Based on Network Usage

Summary

The disclosure can be directed to creating a universally applicable metric to rank the logical entities in terms of importance. The goal is to bubble up the most important information for the user, to make it easier for the user to wade through the voluminous amount of information extracted from the traffic monitoring system layer. Business criticality is the best metric since it is enterprise adaptable.

Detailed Description

The disclosure can be directed to creating a universally applicable metric to rank the logical entities in terms of importance. The goal is to bubble up the most important information for the user, to make it easier for the user to wade through the voluminous amount of information extracted from the traffic monitoring system layer.

Business criticality is the best metric since it is enterprise adaptable. For example billing. In another example, for a finance enterprise, logical entities with dataflows of data including cadence files are less important than excel spreadsheet data files. Ideally business criticality can be determined not invasively to the enterprise (either for privacy issues or because the data is encrypted anyway). Inferring business criticality can be based on identifying the type of data, the source of the data, and the destination of the data. Identification of the type of data, the source of the data and the destination of the data flow can be done through analysis of data gathered from the traffic monitoring system layer. Traffic monitoring system analysis (through the software/code sensors) can map the host ports to determine what process the flow is coming from to see what application the data stream is originating from. Furthermore, the traffic monitoring system layer can be analyzed to determine hosts the data flow came from, what host group the data flow, and what subnet the data flow game from, what host port the dataflow came from, what application the data stream is originating from, and the policies governing those flows. For example, spreadsheet data flowing from a server from a financial enterprise will be more important than sound data flowing from another server.

Business criticality is inferred, as such, it is an administrator who categorizes the enterprise and it is the analysis of the data in the enterprise that determines business critical logical entities. A logical entity carrying the application of interest and the application of interest are both ranked in terms of what is more business critical. Therefore sound data from a finance enterprise is ranked lower and so the host carrying that application is also ranked lower. Spreadsheet data from a finance enterprise is ranked higher and so the host carrying the application producing spreadsheet data is also ranked higher.

Determining Application Disruption Likelihood Using Net Summary

The disclosure can be directed to a tie breaking metric to be applied to the universally applicable metric of business criticality to better rank the importance of the logical entities. The goal is to bubble up the most important information for the user, to make it easier for the user to wade through the voluminous amount of information extracted from the traffic monitoring system layer. Redundancy can be used as a tie breaking metric. Logical entities not tied to a redundancy system are more vulnerable to attacks. Therefore logical entities not tied to a redundancy system should be a higher priority for monitoring.

Detailed Description

The disclosure can be directed to a tie breaking metric to be applied to the universally applicable metric of business criticality to better rank the importance of the logical entities. The goal is to bubble up the most important information for the user, to make it easier for the user to wade through the voluminous amount of information extracted from the traffic monitoring system layer.

Business criticality is the best metric since it is enterprise adaptable. For example billing. In another example, for a finance enterprise, logical entities with dataflows of data including cadence files are less important than excel spreadsheet data files. Ideally business criticality can be determined not invasively to the enterprise (either for privacy issues or because the data is encrypted anyway). Inferring business criticality can be based on identifying the type of data, the source of the data, and the destination of the data. Identification of the type of data, the source of the data and the destination of the data flow can be done through analysis of data gathered from the traffic monitoring system layer. Traffic monitoring system analysis (through the software/code sensors) can map the host ports to determine what process the flow is coming from to see what application the data stream is originating from. Furthermore, the traffic monitoring system layer can be analyzed to determine hosts the data flow came from, what host group the data flow, and what subnet the data flow game from, what host port the dataflow came from, what application the data stream is originating from, and the policies governing those flows. For example, spreadsheet data flowing from a server from a financial enterprise will be more important than sound data flowing from another server.

Business criticality is inferred. As such, an administrator categorizes the enterprise and an analysis of the data in the enterprise determines business critical logical entities. A logical entity carrying the application of interest and the application of interest are both ranked in terms of what is more business critical. Therefore sound data from a finance enterprise is ranked lower and so the host carrying that application is also ranked lower. Spreadsheet data from a finance enterprise is ranked higher and so the host carrying the application producing spreadsheet data is also ranked higher.

Even with ranking a large number of logical entities based on business criticality, a large number of logical entities can be ranked similarly making consuming this information still difficult. Therefore a second metric can be applied to help differentiate the similarly ranked logical entities. The second, useful, metric is redundancy. Identifying redundancy is the identification of logical entities tied to redundant systems. Logical entities tied to redundant systems are ranked lower than logical entities not tied to redundant systems—as the logical entities not tied to redundant systems are more vulnerable. Therefore business critical logical entities not tied to redundant systems ranked higher than business critical logical entities tied to redundant systems.

This metric is especially helpful in circumstances where systems are infected or attacked where a determination needs to be made which logical entities to be addressed first. The logical entities without redundant systems are more vulnerable and generally will need to be addressed first.

The identification of redundancy is ideally done not invasively (not peering into the enterprises network itself for privacy or encryption reasons). Detecting redundancy can be achieved by detecting the replication traffic or occurrence of redundancy protocols in a network. Redundancy protocols are highly periodic and predictable with a well-known source index. With the mapped ports and applications from the traffic monitoring system analysis, a mapping of the replication back to the applications can identify where the redundancy systems are and whether the logical entities are tied to the redundancy systems. Additionally, from the business criticality analysis mentioned above, a determination of which business critical logical entities are not tied to redundant systems can be made.

What is claimed is:

1. A system comprising:
one or more processors; and
memory storing instructions which, when executed by the one or more processors, cause the one or more processors to:
obtain network data from sensor processes executing in a data center, the network data being at least partly based on operation system states associated with an operating system in the data center;
store connection data describing a connection between endpoints associated with one or more packets transmitted in the data center;
determine a status of the data center based on the network data and the connection data;
detect, based at least partly on the status of the data center, an indication of an attack within the data center; and
in response to the indication of the attack, modify a security policy based on the status of the data center.

2. The system of claim 1, wherein the network data comprises a respective indication of active or previously active processes on each of the operating system.

3. The system of claim 1, wherein at least one of a log or the network data identifies files present on the operating system.

4. The system of claim 1, wherein at least one of a log or the network data comprises data describing packets captured by the sensor processes executing in the data center.

5. The system of claim 1, wherein the operating system is a virtual machine or a hypervisor.

6. The system of claim 1, wherein detecting the indication of the attack comprises at least one of detecting a spike in an amount of resources used by at least one of the sensor processes or detecting spoofed packets.

7. The system of claim 1, wherein detecting the indication of the attack comprises detecting a hidden process embedded in traffic between two or more reference points.

8. The system of claim 1, wherein detecting the indication of the attack comprises detecting a scan of a network as initiated by a command from outside of the network or from an unexpected source inside the network.

9. The system of claim 1, wherein detecting the indication of the attack comprises detecting a packet that has a packet header field that differs from an expected header pattern.

10. A method comprising:
- obtaining network data from sensor processes executing in a data center, the network data being at least partly based on operation system states associated with an operating system in the data center;
- storing connection data describing a connection between endpoints associated with one or more packets in the network data;
- determining a status of the data center based on the network data and the connection data;
- detecting, based at least partly on the status of the data center, an indication of an attack within the data center; and
- in response to the indication of the attack, modifying a security policy based on the status of the data center.

11. The method of claim 10, wherein at least one of a log or the network data comprises a respective indication of active or previously active processes on each of the operating system.

12. The method of claim 10, wherein at least one of a log or the network data identifies files present on the operating system.

13. The method of claim 10, wherein at least one of a log or the network data comprises data describing packets captured by the sensor processes executing in the data center.

14. The method of claim 10, wherein the operating system comprises a virtual machine or a hypervisor.

15. The method of claim 10, wherein detecting the indication of the attack comprises at least one of detecting a spike in an amount of resources used by at least one of the sensor processes or detecting spoofed packets.

16. The method of claim 10, wherein detecting the indication of the attack comprises detecting a hidden process embedded in traffic between two or more reference points.

17. The method of claim 10, wherein detecting the indication of the attack comprises detecting a scan of a network as initiated by a command from outside of the network or from an unexpected source inside the network.

18. A non-transitory computer-readable medium having stored thereon computer-readable instructions that, when executed by one or more processors, cause the one or more processors to:
- obtain network data from sensor processes executing in a data center, the network data being at least partly based on operation system states associated with an operating system in the data center;
- store connection data describing a connection between endpoints associated with one or more packets transmitted in the data center;
- determine a status of the data center based on the network data and the connection data;
- detect, based at least partly on the status of the data center, an indication of an attack within the data center; and
- in response to the indication of the attack, modify a security policy based on the status of the data center.

19. The non-transitory computer-readable medium of claim 18, wherein at least one of a log or the network data comprises a respective indication of active or previously active processes on each of the operating system.

20. The non-transitory computer-readable medium of claim 18, wherein at least one of a log or the network data comprises at least one of information about files present on the operating system or information describing packets captured by the sensor processes executing in the data center.

* * * * *